US012811800B2

(12) United States Patent
Davies

(10) Patent No.: US 12,811,800 B2
(45) Date of Patent: Nov. 24, 2026

(54) DISTRIBUTED TRANSACTION PROCESSING AND AUTHENTICATION SYSTEM

(71) Applicant: KALYPTON INTERNATIONAL LIMITED, Giro's Passage (GI)

(72) Inventor: Lars Davies, West Sussex (GB)

(73) Assignee: Kalypton International Limited, Giro's Passage (GI)

( * ) Notice: Subject to any disclaimer, the term of this patent is extended or adjusted under 35 U.S.C. 154(b) by 238 days.

(21) Appl. No.: 18/054,383

(22) Filed: Nov. 10, 2022

(65) Prior Publication Data

US 2024/0235843 A1 Jul. 11, 2024

Related U.S. Application Data

(63) Continuation of application No. 16/315,879, filed as application No. PCT/GB2017/052004 on Jul. 7, 2017, now abandoned.

(30) Foreign Application Priority Data

Jul. 8, 2016 (GB) ...................................... 1611948

(51) Int. Cl.
*H04L 9/32* (2006.01)
*G06Q 40/02* (2023.01)
*H04L 9/06* (2006.01)

(52) U.S. Cl.
CPC ........... *H04L 9/3242* (2013.01); *G06Q 40/02* (2013.01); *H04L 9/0643* (2013.01); *H04L 9/3221* (2013.01); *H04L 9/3247* (2013.01)

(58) Field of Classification Search
CPC ... H04L 9/3242; H04L 9/0643; H04L 9/3221; H04L 9/3247; H04L 9/3218; H04L 9/3215; H04L 9/50; G06Q 40/02
See application file for complete search history.

(56) References Cited

U.S. PATENT DOCUMENTS

| | | | |
|---|---|---|---|
| 5,617,537 | A | 4/1997 | Yamada et al. |
| 6,026,474 | A | 2/2000 | Carter et al. |

(Continued)

FOREIGN PATENT DOCUMENTS

| | | | |
|---|---|---|---|
| EP | 2028794 | A1 | 2/2009 |
| EP | 2897051 | A2 | 7/2015 |

(Continued)

OTHER PUBLICATIONS

Australian Examination Report for Australian Patent Application 2017293405 corresponding to U.S. Appl. No. 16/315,879, mailed Aug. 30, 2021, 6 pages.

(Continued)

*Primary Examiner* — Techane Gergiso
(74) *Attorney, Agent, or Firm* — Lee & Hayes, P.C.

(57) ABSTRACT

A method of recording a data transaction comprising, at a device associated with a first entity, determining first seed data, generating a record of a first transaction between the first entity and a second entity, determining second seed data by combining at least the first seed data and the record of the first data transaction, generating a first hash by hashing the second seed data, the first hash comprising a history of data transactions involving the first entity and storing the first hash against the record of the first data transaction in a memory.

20 Claims, 22 Drawing Sheets

(56) References Cited

U.S. PATENT DOCUMENTS 8,250,640 B1 8/2012 Zhang et al.
9,241,004 B1 1/2016 April
9,436,923 B1 9/2016 Sriram et al.
10,318,753 B2 6/2019 Anton et al.
2002/0067832 A1* 6/2002 Jablon .................. H04L 9/0844 713/182
2004/0039962 A1* 2/2004 Ganesh ............... G06F 11/1474 714/E11.131
2005/0025091 A1 2/2005 Patel et al.
2006/0056621 A1* 3/2006 Ramzan ................ H04L 9/3257 380/28
2006/0085644 A1* 4/2006 Isozaki ................ H04L 63/061 713/171
2008/0077979 A1 3/2008 Jeffries et al.
2008/0104407 A1* 5/2008 Horne .................... G06F 21/33 713/178
2008/0307223 A1* 12/2008 Brickell ................ H04L 9/3268 713/158
2009/0070361 A1* 3/2009 Haber ................. G06F 21/6254 707/999.102
2009/0158413 A1* 6/2009 Gentry ................. G06Q 20/367 726/9
2009/0182667 A1* 7/2009 Parkes ...................... H04L 9/14 705/50
2010/0049975 A1 2/2010 Parno et al.
2010/0088517 A1* 4/2010 Piersol .................. H04L 9/3271 713/168
2010/0306531 A1 12/2010 Nahari
2011/0087885 A1* 4/2011 Lerner .................. H04L 63/065 713/168
2011/0093939 A1 4/2011 Barbour et al.
2011/0099277 A1 4/2011 Yao et al.
2011/0138454 A1* 6/2011 Mansour ............... H04L 9/3218 726/5
2012/0150750 A1 6/2012 Law et al.
2013/0046690 A1 2/2013 Calman et al.
2013/0232217 A1 9/2013 Kristiansson et al.
2013/0263255 A1* 10/2013 Wolf ....................... G06F 21/64 726/21
2014/0064490 A1* 3/2014 Wang .................... H04L 9/0819 380/278
2014/0100014 A1* 4/2014 Bennett, III ........ G07F 17/3241 463/17
2014/0143206 A1* 5/2014 Pittelko .................. H04L 67/10 707/634
2014/0270162 A1* 9/2014 Greiner ................. H04L 9/0662 380/46
2014/0379576 A1 12/2014 Marx et al.
2015/0058949 A1* 2/2015 Collinge ................. H04L 63/08 726/7
2015/0063565 A1* 3/2015 Ansari ................ G06F 12/1408 380/44
2015/0142650 A1 5/2015 Johnston et al.
2015/0149781 A1 5/2015 Logue
2015/0269570 A1 9/2015 Phan et al.
2015/0302400 A1 10/2015 Metral
2015/0371216 A1 12/2015 Olawale et al.
2016/0063100 A1 3/2016 Anton et al.
2016/0085955 A1* 3/2016 Lerner .................. H04L 9/0869 726/20
2016/0110403 A1* 4/2016 Lomet ................. G06F 16/2255 707/695
2016/0125416 A1* 5/2016 Spencer ............. G06Q 20/3829 705/71
2016/0330034 A1* 11/2016 Back .................... G06Q 20/065
2016/0337128 A1* 11/2016 Hamman ........... G03G 15/0812
2016/0342977 A1* 11/2016 Lam ................... G06Q 20/0658
2017/0005804 A1* 1/2017 Zinder .................. H04L 9/3239
2017/0147356 A1* 5/2017 Kotary .................... G06F 21/72
2017/0155634 A1* 6/2017 Camenisch ............. H04L 9/085
2017/0212781 A1 7/2017 Dillenberger et al.
2017/0228731 A1* 8/2017 Sheng .................... G06Q 20/36
2017/0331896 A1 11/2017 Holloway et al.
2020/0186355 A1 6/2020 Davies

FOREIGN PATENT DOCUMENTS

JP 2000-57271 A 2/2000
JP 2006-343790 A 12/2006

OTHER PUBLICATIONS

English Translation of Columbian Office Action for Columbian Patent NC2019/0001169 corresponding to U.S. Appl. No. 16/315,879, mailed on Mar. 22, 2021, Davies, "Distributed Transaction Processing and Authentication System", 11 pages.

Faculdade DeCiencias, et al.; "Universidade de Lisboa Securing USSD in Mobile Financial Transactions (A Prectical Proposal for M-Finance)" Dec. 31, 2011 (Dec. 31, 2011), XP055433720, Retrieved from the Internet: URL: http//repositorio.ul.pt/bitstream/10451/8707/1/ulfc104212_tm_Paula_Cravo.pdf [retrieved on Dec. 11, 2017] paragraph [0005]-paragraph [0009].

International Search Report and Written Opinion issued in PCT/BG2017/052004, mailed Jan. 17, 2018.

First office action for JP Patent Application 2019-521195 corresponding to U.S. Appl. No. 16/315,879 "Distributed Transaction Processing and Authentication System" Davies,L. 4 pages.

Machine translation Notification of Reason for Refusal dated Feb. 22, 2022 for KR Patent Application 2019-7003851 corresponding to U.S. Appl. No. 16/315,879, 11 pages.

Office Action for U.S. Appl. No. 16/315,879, mailed on Nov. 10, 2021, Davies, "Distributed Transaction Processing and Authentication System", 12 Pages.

Office Action for U.S. Appl. No. 16/315,879, mailed on Mar. 22, 2021, Davies, "Distributed Transaction Processing and Authentication System", 10 pages.

* cited by examiner

DISTRIBUTED TRANSACTION PROCESSING AND AUTHENTICATION SYSTEM

CROSS-REFERENCE TO RELATED APPLICATIONS

This application is Continuation of U.S. application Ser. No. 16/315,879, filed on Jan. 7, 2019, which is a 371 U.S. National Stage of International Application No. PCT/GB2017/052004, filed Jul. 7, 2017, and claims priority to Great Britain Patent Application No. 1611948.9 filed Jul. 8, 2016, the disclosures of which are herein incorporated by reference in their entirety.

FIELD

The present disclosure relates to systems and methods of performing transactions of all types in a single implementation at scale, securely and in near real-time.

BACKGROUND

Transaction processing involves a wide range of distributed computer based systems and multiple transactors carrying out transactions, particularly in respect of payments, but also to do with trade in other financial assets and instruments, physical access control, logical access to data, managing and monitoring devices that comprise the Internet of Things (IoT), etc.

When creating transaction processing systems today, engineers have to make difficult trade-offs. These include choosing between speed and resilience, throughput and consistency, security and performance, consistency and scalability, and so forth. Such trade-offs invariably lead to compromises that affect the overall system. Payment processing systems exhibit the effect of these trade-offs. They may need to handle between 600 and a few tens of thousands of transactions a second, but they can only do that by part-processing them and storing the details for further processing during a lull in the system's workload. This often leads to problems with reconciling missing records, duplicating transactions, exposure to credit issues where accounts have become overdrawn between the time of a transaction and the time of processing that transaction, and so on. The problems are not, however, limited to payments.

ACID (atomicity, consistency, isolation, and durability) is a consistency model for databases that states that each database transaction must succeed if the entire transaction be rolled back (atomicity), cannot leave the database in an inconsistent state (consistency), cannot interfere with each other (isolation); and must persist, even when the servers restart (durability).

This model is generally thought to be incompatible with the availability and performance requirements of large-scale systems, such as the existing banking payments networks and other 'big data' transactional systems. These systems instead rely on BASE consistency, (basic availability, soft-state, and eventual consistency). This model holds that it is enough for the database eventually to reach a consistent state. Banking systems operate in this mode, which is why they often need to pause any transaction processing and run reconciliation checks to reach a consistent state. This notion that trade-offs have to be made in high volume transaction processing is enshrined in the CAP theorem, which in its basic form states that it is impossible for a distributed computer system to provide all three of (C)onsistency, (A)vailability and (P)artition tolerance at the same time. Current best practice solutions contain too many limitations and trade-offs to satisfy emerging and current requirements.

The issue of how to reconcile data that is generated by the Internet of Things is beginning to come to the fore, an issue that arises due to the effects of the trade-offs that engineers believe they have to make when constructing the networks and transaction processing systems. One of the effects has been a lack of security for the communications between devices and servers that together comprise the Internet of Things. Another is the inability to guarantee that data gathered by a device actually relates to a specific event detected by that device.

Cloud-based information storage systems also exhibit the effects of these trade-offs, which often result in a huge number of servers and systems that can guarantee only eventual consistency.

There is therefore a need to provide ACID consistency with large-scale systems that in known systems can only benefit from BASE consistency.

SUMMARY

According to an aspect, there is provided a method of recording a data transaction comprising, at a device associated with a first entity, determining first seed data, generating a record of a first data transaction between the first entity and a second entity, determining second seed data by combining at least the first seed data and the record of the first data transaction, generating a first hash by hashing the second seed data, the first hash comprising a history of data transactions involving the first entity, and storing the first hash against the record of the first data transaction in a memory. According to another aspect, there is provided device associated with a first entity, the device configured to perform the method. According to another aspect, there is provided a computer readable medium comprising code portions that, when executed, cause a computing device to perform the method.

According to another aspect, there is provided a license device configured to receive a first hash from a device associated with a first entity, the first hash comprising a history of data transactions involving the first entity, combine the first hash with a license hash to provide a license input, generate a second license hash by hashing the license input, and store the second license hash in a memory.

According to another aspect, there is provided a directory device configured to receive a first hash from a device associated with a first entity, the first hash comprising a history of data transactions involving the first entity combine the first hash with a directory hash to provide a directory input, generate a second directory hash by hashing the license input, and store the second directory hash in a memory.

According to another aspect, there is provided a method of accessing a first service from a device comprising providing an identifier of the device to a request server, authorising the device to request access to the first service based on the identifier, enabling the device to access the first service from a first host server at which the first service is located, the access being via the request server. According to another aspect, there is provided a device configured to perform the method. According to another aspect, there is provided a computer readable medium comprising code portions that, when executed, cause a computing device to perform the method.

According to another aspect, there is provided a method of migrating data comprising providing a request to switch first data from a first data store to a second data store, determining, from a directory server, an identifier of the first data store based on an identifier comprised in the request, migrating the first data from the first data store to the second data store. According to another aspect, there is provided a device configured to perform the method. According to another aspect, there is provided a computer readable medium comprising code portions that, when executed, cause a computing device to perform the method.

According to another aspect, there is provided a method of communication comprising sending a first communication from a first entity to a second entity, the first communication comprising two or more data fields, each field comprising a respective label, and sending a second communication from the first entity to the second entity, the second communication comprising the two or more data fields, wherein the order of the fields in the second communication is different from the order of the fields in the first communication. According to another aspect, there is provided a device configured to perform the method. According to another aspect, there is provided a computer readable medium comprising code portions that, when executed, cause a computing device to perform the method.

According to another aspect, there is provided a method of communicating via unstructured supplementary service data "USSD" comprising opening a USSD session between a first device and a second device, generating a cypher text for a communication in the session at the first device, encoding the cypher text at the first device, transmitting the encoded cypher text from the first device to the second device for decryption at the second device. According to another aspect, there is provided a device configured to perform the method. According to another aspect, there is provided a computer readable medium comprising code portions that, when executed, cause a computing device to perform the method.

According to another aspect, there is provided a method of communication between a first device associated with a first entity and a second device associated with a second entity comprising, at the first device, generating a first PAKE session between the first device and the second device using a first shared secret, receiving a registration key and a second shared secret from the second device, hashing the first shared secret, the registration key and the second shared secret to provide a third shared secret for generating a second PAKE session. According to another aspect, there is provided a device configured to perform the method. According to another aspect, there is provided a computer readable medium comprising code portions that, when executed, cause a computing device to perform the method.

According to another aspect, there is provided a method of accessing a service comprising providing a credential and a context for the credential, authenticating access to the service based on the credential and the context. According to another aspect, there is provided a device configured to perform the method. According to another aspect, there is provided a computer readable medium comprising code portions that, when executed, cause a computing device to perform the method.

According to another aspect, there is provided a method of communicating between modules in a computer system, the method comprising conveying a shared memory channel from a first module to a proxy, conveying the shared memory channel from the proxy to a second module, wherein the proxy comprises a hand-off module configured to transmit data between the first module and the second module by bypassing the kernel of the computer system, transmitting data from the first module to the second module. According to another aspect, there is provided a computing device configured to perform the method. According to another aspect, there is provided a computer readable medium comprising code portions that, when executed, cause a computing device to perform the method.

The first seed data may comprise a starting hash. The starting hash may be the result of hashing a record of a previous data transaction involving the first entity. The starting hash may comprise a random hash. The random hash may comprise at least one of a signature from the device, the date and/or the time that the random hash was generated.

Providing second seed data may further comprise combining a first zero-knowledge proof and a second zero-knowledge proof with the first seed data and the record of the first data transaction, wherein the first zero-knowledge proof may comprise proof that the starting hash may comprise the true hash of the previous data transaction involving the first entity, and the second zero-knowledge proof may comprise proof that a second hash may comprise the true hash of a previous data transaction involving the second entity. Providing second seed data may further comprise combining a third zero-knowledge proof with the first seed data, the record of the first data transaction, the first zero-knowledge proof and the second zero-knowledge proof. The third zero-knowledge proof may be generated from random data. The third zero-knowledge proof may be a repeat of the first zero-knowledge proof or the second zero-knowledge proof. The third zero-knowledge proof may be constructed using a second record of the first data transaction that corresponds to the second zero-knowledge proof.

The first data transaction may comprise at least two stages and providing second seed data may comprise combining the first zero-knowledge proof with a record of the first stage of the first data transaction, and combining the second zero-knowledge proof with a record of the second stage of the first data transaction. Providing second seed data may comprise constructing a third zero-knowledge proof from the record of the second stage of the first data transaction, and combining the second zero-knowledge proof and the third zero-knowledge proof with the record of the second stage of the first data transaction. The first data transaction may comprise at least three stages and providing second seed data may further comprise combining the first zero-knowledge proof with a record of the third stage of the first data transaction, and combining the second zero-knowledge proof with the record of the third stage of the first data transaction.

The first data transaction may comprise at least three stages and providing second seed data may further comprise combining the first zero-knowledge proof with a record of the third stage of the first data transaction, and combining the second zero-knowledge proof with random data. The first data transaction may comprise at least three stages and providing second seed data may further comprise combining the first zero-knowledge proof with a record of the third stage of the first data transaction, and combining the second zero-knowledge proof with a record of a fourth stage of the first data transaction wherein the fourth stage of the first data transaction may be a repeat of the third stage of the first data transaction.

The first data transaction may comprise at least three stages and providing second seed data may further comprise combining a third zero-knowledge proof with a record of the third stage of the first data transaction.

The first zero-knowledge proof may be constructed by the device associated with the first entity and the second zero-knowledge proof may be constructed by a device associated with the second entity.

Constructing the first zero-knowledge proof and the second zero-knowledge proof may comprise using a key exchange algorithm. The key exchange algorithm may comprise a PAKE algorithm.

The method may further comprise sending the first hash to a device associated with the second entity receiving a second hash from a device associated with the second entity, wherein the second hash may comprise a hash of a previous data transaction involving the second entity, and generating a record of a second data transaction between the first party and the second party, determining third seed data by combining the record of the second data transaction with the first hash and the second hash, generating a third hash by hashing the third seed data, the third hash comprising a history of data transactions involving the first entity and a history of data transactions involving the second entity, and storing the third hash against the record of the second data transaction in the memory.

Providing third seed data may further comprise combining a third zero-knowledge proof and a fourth zero-knowledge proof with the record of the second data transaction, the first hash and the second hash, wherein the third zero-knowledge proof may comprise proof that the first hash may comprise a true hash of the first data transaction, and the fourth zero-knowledge proof may comprise proof that the second hash may comprise the true hash of the previous data transaction involving the second entity. The previous data transaction involving the second entity may be the first data transaction.

The method may further comprise associating each of the hashes with an identifier of the first entity and/or the second entity. The method may further comprise recalculating the first hash, and comparing the generated first hash to the recalculated second hash to determine a match. The method may further comprise cancelling further data transactions if the comparison may be unsuccessful. The method may further comprise generating, at a system device, a system hash corresponding to the first data transaction.

Providing second seed data may further comprise combining the system hash with the first seed data and the record of the first data transaction. The system hash may be the result of hashing a record of a previous data transaction on the system device.

Providing second seed data may further comprise receiving a license hash from a license device, and combining the license hash with the first seed data and the record of the first data transaction to provide the second seed data.

The method may further comprise, at the license device receiving the first hash, combining the first hash with the license hash to provide a license input, generate a second license hash by hashing the license input.

Providing second seed data may further comprise receiving a directory hash from a directory device, and combining the directory hash with the first seed data and the record of the first data transaction to provide the second seed data.

The method may further comprise, at the directory server, receiving the first hash, combining the first hash with the directory hash to provide a directory input, generate a second directory hash by hashing the directory input.

Providing second seed data may further comprise generating a key hash from an encryption key for the first data transaction, and combining the key hash with the first seed data and the record of the first data transaction to provide the second seed data. The encryption key may comprise a public key or a private key.

Combining the first seed data and the record of the first data transaction may be performed as soon as the first data transaction may be complete. The memory may be located on a remote device. The method may further comprise comparing, at the remote device, the first hash with corresponding hashes received from other devices. The method may further comprise notifying other devices to which the device may be connected to expect to receive the first hash.

The method may further comprise storing a chain of hashes in the memory. The method may further comprise sending the chain of hashes to a second memory located on a device configured to limit access to the hash chains it has been sent. The method may further comprise amending or deleting a hash in the hash chain by regenerating a subject hash in the hash chain, confirming that the record has not been amended, recording the regenerated hash, amending or deleting the record, generating a new hash for the record by hashing a combination of the subject hash and the amended/deleted record, and recording the new hash. The method may further comprise generating a system hash using the new hash.

The device may comprise a server. The device may comprise a user device. The device may comprise at least one of a personal computer, a smartphone, a smart tablet or an Internet of Things "IoT" enabled device. The user device may be configured to store the first hash in a memory on the device. The user device may be configured to store the first hash in a memory on the device only when it may be off-line from a corresponding server. The device may further be configured to send the first hash to a device associated with the second entity. The device may further be configured to send a signed, encrypted copy of the record of the first data transaction to the device associated with the second entity, wherein the signature may comprise an indication of a destination server for that record. The device may be configured to sign the record with a specific off-line public key. The device may be configured to sign the record with a key belonging to the device. Only the destination server may be able to decrypt the encrypted copy of the record of the first data transaction. The device may be configured to send the encrypted records of its off-line data transactions and the associated hashes to its corresponding server when the device regains connection with its corresponding server. The device may be further configured to send copies of records of data transactions involving other entities that it holds to its corresponding server for transmission to servers corresponding to the other entities. The transmission may comprise notifying all servers to which the records apply to expect to receive the records. The device may be configured to create a unique internal transaction number to identify its part in the first data transaction.

The authorising may comprise confirming that the user device may be authorised to access the first service based on the identifier. The confirming may comprise confirming that the user meets at least one criteria based on the identifier. A first criterion may be stored at the first host server or the request server, and a second criterion may be located at a different server. The authorising may comprise verifying a signature on a communication between the request server and the first host server.

The authorising may be performed at the request server. The authorising may comprise determining, at the request server, that the device was previously authorised to access the first service.

The authorising may be performed at a directory server. The authorising may comprise the request server requesting authorisation for the device from the directory server. The enabling may comprise the directory server sending an identifier for the first host server to the request server. Data that authorizes the identifier may be stored only on the directory server.

The method may further comprise requesting access to a second service, authorising the device to access the second service based on the identifier, enabling the device access to the second service via the request server. The second service may be located at the first host server. The second service may be located at a second host server.

Authorising the device to access the first service may be performed at a first directory server, and authorising the user device to access the second service may be performed at a second directory server.

The method may further comprise requesting access to a third service, authorising the device to access the third service based on the identifier, enabling the device access to the third service.

The second service may be located at the first host server, the second host server or a third host server. Authorising the device to access the third service may be performed at a third directory server.

Providing an identifier may comprise the device communicating with the request server via an encrypted tunnel. The method may further comprise caching data received at each respective server. Each host server may offer more than one service.

The device may comprise at least one of a personal computer, a smartphone, a smart tablet or an Internet of Things "IoT" enabled device.

The migrating may comprise, at the directory server assigning a start timestamp for the data at the second data store, and assigning an end timestamp for the data at the first data store.

The method may further comprise instructing a requesting server that attempts to access the data via the first data store after the end timestamp to look up the user at the second data store via the directory server. The data at the first data store may comprise a first account registration with a first account provider, and the data at the second data store may comprise a second account registration with a new account provider. The migrating may comprise sending information regarding the first account registration from the current account provider to the new account provider. The information may comprise at least one of registrations, balances, configurations and/or payment instructions. The migrating may comprise confirming an authentication code indicating that the first registration should be switched from the current account provider to the new account provider. The first account registration may comprise a first user credential, and the second account registration may comprise a second user credential. The first user credential may be registered at a first server and the second user credential may be registered at a second server. The method may further comprise receiving, by the first account provider, a communication directed to a user using the first user credential, routing the communication to the second account provider using the second user credential. The method may further comprise reversing a data transaction made with the first registration provider using the first credential to the second registration provider using the second user credential. The method may further comprise determining that the user used the first user credential at the time of the data transaction. A server sending the communication may need to be approved to access the second user credential. The first user credential and the second user credential may be the same.

The device may comprise at least one of a personal computer, a smartphone, a smart tablet or an Internet of Things "IoT" enabled device.

The method may further comprise adding a random field to the second communication. Each field may comprise two or more characters, the method further comprising mixing cases of characters in at least one field.

The method may further comprise decrypting and ordering, by the second entity, the fields in the second communication before processing the second communication. The method may further comprise discarding, by the second entity, fields that it cannot process. At least one of the first entity and the second entity may comprise a server. At least one of the first entity and the second entity may comprise a personal computer, a smartphone, a smart tablet or an Internet of Things "IoT" enabled device. The device may comprise at least one of a personal computer, a smartphone, a smart tablet or an Internet of Things "IoT" enabled device.

The encoding may comprise encoding the cypher text as a 7-bit or 8-bit character string. The method may further comprise, if the length of the cypher text is longer than the allowed space in the USSD session cutting the cypher text into two or more parts, and transmitting the two or more parts individually. The decryption may further comprise reassembling the parts into the whole cypher text at the second device.

The method may further comprise authenticating the first and second devices. The authenticating may comprise using an algorithm that provides privacy and data integrity between two communicating computer applications. The authenticating may comprise using transport layer security "TLS". Using TLS may further comprise generating a first session key.

The method may further comprise using the first session key to encrypt a PAKE protocol negotiation to generate a second session key, and encrypting further communications in the session between the first party and the second party using the second session key.

The method may further comprise authenticating the first entity and the second entity. The authenticating may comprise using an algorithm that provides privacy and data integrity between two communicating computer applications. The authenticating may comprise using TLS. The method may further comprise generating a second PAKE session between the first device and a third device using a fourth shared secret. The fourth shared secret may comprise an authentication code generated by the third device for the first device.

The first shared secret may comprise an authentication code generated by the second device for the first device. The authentication code may be sent to the first device together with an identifier for the first device. The identifier may comprise a telephone number or serial number the first device. The first shared secret may comprise a personal account number "PAN" of a bank card associated with the first entity. The first shared secret may comprise an encoded serial number of a bank card associated with the first entity.

The device may comprise at least one of a personal computer, a smartphone, a smart tablet or an Internet of Things "IoT" enabled device.

The authenticating access to the service may comprise authenticating access to part of service based on the credential and/or the context. The credential may comprise a first credential associated with a device and a primary user of the device. The credential may further comprise a second credential associated with a device and a secondary user of the device. The authenticating access to the service based on the credential may comprise authenticating access to different services for the primary user and the secondary user based on the first credential and the second credential respectively. The device may comprise a bank card and the different services are different spending limits for the primary user and the secondary user. The credential may be selected based on the context. The service may comprise a plurality of services selected based on the context. An administrator or user may be able to amend, add to, or cancel the context or credential. The credential may comprise at least one of a password, PIN, and/or other direct authentication credential. The context may comprise at least one of a device providing the credential, an application on the device, a network to which the device may be connected, the geographic location of the device and/or the service being accessed.

The device may comprise at least one of a personal computer, a smartphone, a smart tablet or an Internet of Things "IoT" enabled device.

The method may further comprise batching a plurality of requests into a batched message in a buffer memory of the first module, queueing the batched message to be sent to the second module, setting at least one system flag that authorizes a system function, checking the at least one system flag at the second module, and processing the batched message at the second module.

The method may further comprise establishing at least one shared memory channel between the first module and the second module. The method may further comprise the second module responding to the first module via the at least one shared memory channel. The at least one shared memory channel may receive and assembles the batched message and hand ownership of the memory to the second module. The at least one shared memory channel may receive batched message via a network stack of the computer system. The at least one shared memory channel may comprise an HTTP gateway. The HTTP gateway may be used as a web service.

Communications may use a password authenticated key exchange protocol. The method may further comprise using zero-copy networking in a network stack of the computer system. The method may further comprise using user-mode networking in a network stack of the computer system.

The method may further comprise serializing data such that the components of the data transmission from the first module are combined as a single data stream and then separated into the components at the second module. The serialization may be abstracted at the edge of each module.

A buffer memory of each module may have a configurable threshold of buffering. The first module and the second module may be located on the same computing device. The first module and the second module may be located on different computing devices.

The data transmitted from the first module to the second module may carry a version ID. The method may further comprise verifying that the version ID may be current for the data transmitted form the first module to the second module. The method may further comprise, if any of the data are updated, re-verifying the version ID as being current. If the version ID is not verified, the data transmission may fail.

At least one of the first module and the second module may comprise at least one data service module, wherein each data activity within the computer system may be executed via the at least one data service module. The at least one data service module may be configured to communicate with a data store that may be implemented by a core database store. The at least one data service module may be only component of the computer system with direct access to the data store. The core database store may comprise at least one distributed database. The at least one distributed database may have separate read and write access channels. The data store may provide an interface to at least one heterogeneous database. The data store may provide a plurality of interface types. The plurality of interface types may comprise at least one of a Structured Query Language "SQL" interface, a cell and column interface, a document interface and a graph interface layer above the core data database store. All writes to the data store layer may be managed by a single shared module that controls all or part of one or more data transactions.

The method may further comprise operating at least one redundant backup of the shared module. All data changes may flow through the single shared module in a serial rapid sequence. The single shared module may use a hot backup redundancy model that presents itself as a data transactor cluster, wherein the data transactor cluster may be a set of modules in a hierarchy and each module may be configured to control data transactions if a master module fails. The method may further comprise partitioning data across modules or data stores based upon rules configured by domain. The method may further comprise hashing targeted data of a record of a data transaction or of a record of a parent data transaction. The hashing may have cardinality equal to the number of data partitions. The method may further comprise hashing targeted data by at least one of enumerated geographical area, last name and/or currency.

The method may further comprise performing at least one data transmission via the at least one data service module across multiple data partitions. The method may further comprise completing at least one data transmission via the at least one data service module by multiple modules. The method may further comprise persisting at least one data transmission on the at least one data service module on multiple data storage nodes in the data store.

The computer system may comprise a plurality of data service modules and each data service module hosts an in-memory/in-process database engine, including cached representations of all of the hot data for that instance. The computer system may comprise a plurality of data service modules and each data service module may comprise a plurality of heterogeneous or homogeneous database engines.

The method may further comprise using a Multiversion Concurrency Control "MVCC" versioning system to manage concurrency of access to the data store, such that all data reads are coherent and reflect corresponding data writes exactly. The method may further comprise using pessimistic consistency to manage concurrency of access to the data store, such that a data record must be written to the data store and confirmed as having been written before any subsequent data transaction can access the data record.

The computer system may further comprise an application layer and wherein the application layer cannot proceed with a data transaction until the at least one data service module confirms that it has written the record and completed the data transmission.

All optional features of the 1st to the 26th aspects relate to all other aspects mutatis mutandis. Variations of the described embodiments are envisaged, for example, the features of all the disclosed embodiments may be combined in any way.

BRIEF DESCRIPTION OF THE DRAWINGS

Embodiments of the present disclosure will now be described, by way of example only, with reference to the accompanying drawings in which like reference numerals are used to depict like parts. In the drawings.

OVERVIEW

Figure 1:
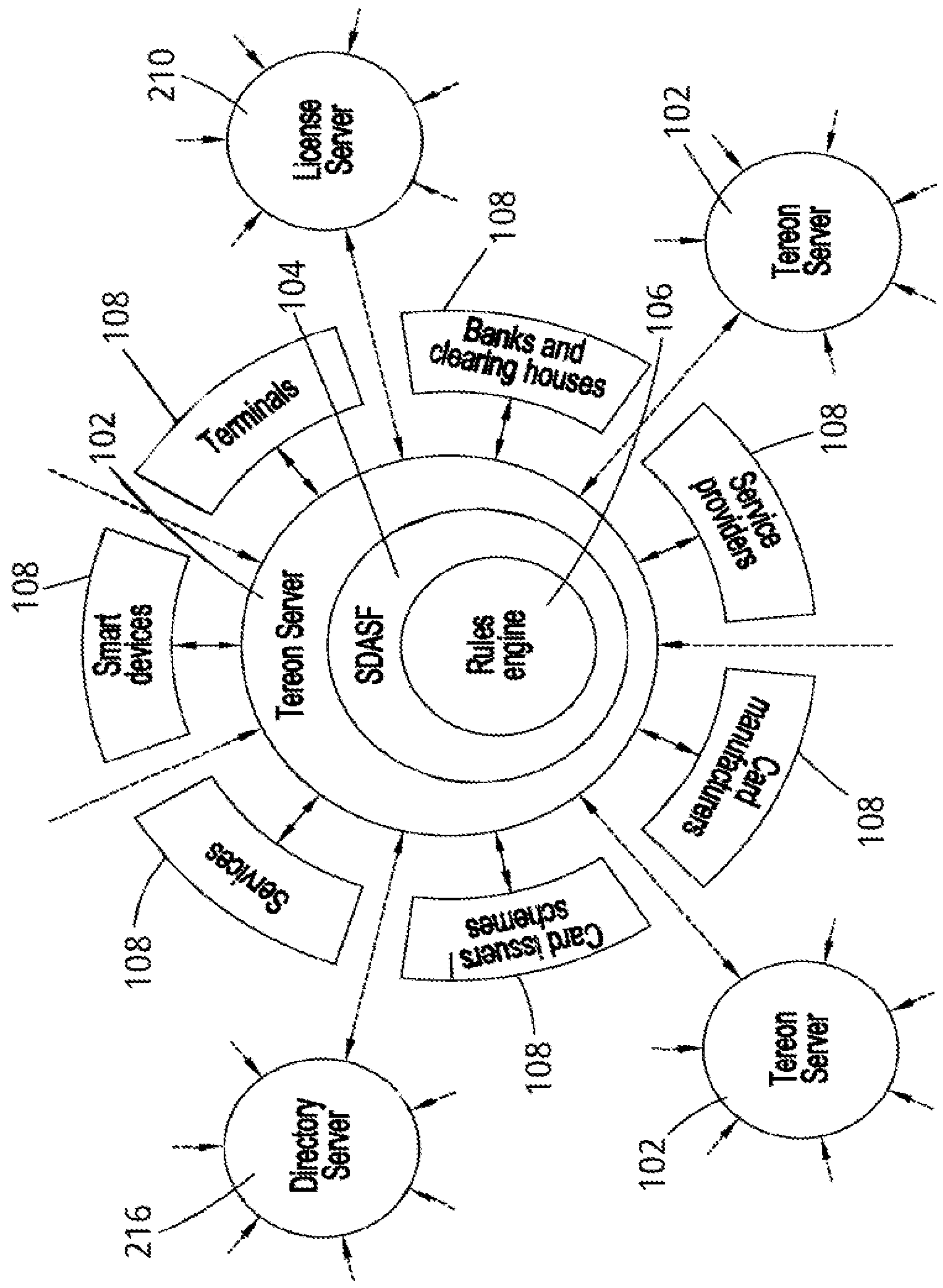
FIG. 1 illustrates the modular concept behind Tereon.

The present disclosure relates to a new method of processing transactions that does away with the need to consider or be constrained by present trade-offs as described above. This disclosure provides a method of authenticating and processing transactions in real-time at a rate several orders of magnitude greater than is possible with existing systems, and settling, or processing and completing, those transactions in real time.

The real-time settlement would not just apply to financial transactions. It would apply to any transaction that required, or would benefit from, some or all of immediate authentication, authorisation, processing, and completion. These could range from access control, through to records validation, records and document exchange, command and control instructions, and so forth.

This method comprises seven main areas:

- A method for writing ACID compliant transactions at extremely high scale to any database product
- A hash chain implementation that delivers authentication of records across multiple private ledgers with full mathematical proof within the bounds of a single real-time session and at extremely high scale.
- A directory service that supports a mesh network of transaction service providers rather than implementing a "hub and spoke" architecture that creates major scalability challenges.
- An extensible framework that allows a merchant or user device to update the application (or app) it uses to process transactions over the air and from one transaction to the next.
- A data services layer that acts as a translation matrix between apps supporting various different transaction types and a common database structure.
- A method for assembling and presenting an ad hoc set of credentials that enables a service or device to access a set of services or functions.
- A method for creating secure real-time communications in any protocol including NFC (Near Field Communications) and USSD (Unstructured Supplementary Service Data).

Uniquely amongst processing methods, the system of the present disclosure provides a method to achieve real time transaction processing and completion with zero incremental cost as the number of transactions increases.

DETAILED DESCRIPTION

Tereon is an electronic transaction processing and authentication engine. It may be implemented as a mobile and electronic payments processing system. It can also be used in other implementations, for example as part of an IoT communications system.

Tereon provides transaction capability with any IP (internet protocol) enabled device, and any devices that can interact with such an IP-enabled device. All that is required is that each device has a unique ID. Tereon's use-cases range from IoT devices, to medical records access and management, through to payments with something as commonplace as a mobile phone, a payment terminal, or an ATM (Automated Teller Machine). In an initial example implementation, Tereon supports mobile phones, cards, point-of-sale terminals, and any unique reference ID. Tereon provides the functionality necessary to enable consumers and merchants to make payments, receive payments, transfer funds, receive funds, make refunds, receive refunds, deposit funds, withdraw funds, view account data, and view mini-statements of past transactions. Tereon supports cross-currency and cross-border transactions. Thus a consumer might hold an account in one currency, but make a payment of transfer in another, for example.

In Tereon's initial implementation, whether an end-user can carry out a particular transaction depends on the application that he is using at the time. Merchants or merchant terminals can initiate some transactions, while a consumer device can initiate others.

Where Tereon is used to process payments, the transactions can be segmented into the following modes: make and receive payments, mobile consumer to mobile merchant, mobile consumer to on-line merchant portal, mobile consumer to mobile merchant where the customer is not present, consumer account to merchant account from within the account portal, NFC-Tereon card consumer to mobile merchant, NFC or other card consumer to card merchant, transfer and receive funds, consumer account to consumer account from within the account portal, mobile consumer to mobile consumer peer-to-peer, mobile consumer to card consumer peer-to-peer, card consumer to mobile consumer peer-to-peer, card consumer to card consumer peer-to-peer, mobile consumer to non-user peer-to-peer, card consumer to non-user peer-to-peer, non-user to non-user peer-to-peer, non-user to mobile consumer peer-to-peer, and non-user to card consumer peer-to-peer. Non-user can refer to someone not previously registered with the payment service, such as an unbanked recipient of a remittance.

System Architecture

Internally, a Tereon server comprises two main components, the Tereon Rules Engine and the Smart Device Application Services Framework (SDASF).

The SDASF allows Tereon to manage any number of different devices and interfaces. It does so by allowing Tereon to use and link a series of abstracted layers to define how those devices and interfaces operate and so interlink to Tereon.

For example, all banking cards will use a basic card abstraction layer. The magnetic stripe abstraction layer will apply to cards with a magnetic stripe, the NFC layer to cards with an NFC chip, and a microprocessor layer to cards with a chip contact. If a card uses all three, then Tereon will define that card with the main card abstraction layer and the three interface layers. The NFC layer will itself will not just apply to cards. It will also apply to any device capable of supporting NFC, including mobile phones. The SDASF uses these abstraction layers to create modules for each of the devices or interfaces.

Externally, each service and each connection to a device or network is a module. Thus services such as the peer-to-peer payments service, the deposit service, and the mini-statements are all modules. So too are the interfaces to card manufacturers, banks, service providers, terminals, ATMs, and so on. Tereon's architecture can support any number of modules.

Modular View

FIG. 1 illustrates the modular concept behind Tereon. Essentially, Tereon is a collection of modules, most of which themselves comprise modules. The modules are defined by the contexts and functional domains within which they operate, and by the business logic that determines the functions that they are required to perform. These functions can be any type of electronic transaction, such as, for example, to manage the operation of and communications between IoT devices, to manage and transact electronic or digital payments, to manage and construct identification or authorisation credentials on demand, or to manage and operate any other form of electronic transaction or device.

Tereon Server

The modules that make up the Tereon server 102 as shown in FIG. 1 can be viewed at two levels: the SDASF 104 and the rules engine 106. The rules engine 106 itself defines the functional domains and contexts of each of the modules 108 (some of which are illustrated in FIG. 1; these include the modules that define the services, the protocols (not illustrated), the smart devices, the terminals, etc.), and these modules 108 then define the structure of the SDASF 104. The SDASF 104 and the resulting services and interfaces that it supports then define the system protocols that are available to Tereon. These protocols then define the rules and services that Tereon can support, for example smart devices, terminals, etc., which themselves define the functional domains and contexts that Tereon provides. This circular or iterative approach is used to ensure that the definitions of the modules and the functions or requirements that they support are consistent with each other. This allows the modules to be updated, upgrades, and replaced in situ without limiting the operation of the system.

The blocks and modules interface to each other using abstracted application programming interfaces (APIs), which themselves define the functional domains and contexts that Tereon provides. Where possible, they communicate with each other using bespoke semaphore hand-off modules, an example of which is set out in FIG. 4*a* and which will be explained later, that can also make use of shared memory. In this way, the internal operation and functions of the blocks and modules can be updated or replaced without compromising the operation of the system as a whole.

Framework Infrastructure Components

The infrastructure components are also modular. In the case of the SDASF, this component itself comprises modules.

Multiple Interfaces

Each interface is constructed as a separate module that connects to the core server. Tereon's modular structure thus enables it to support multiple interfaces, including back offices and core systems, cards, clearing houses, merchants, mobile telephones, services, service providers, storage, terminals, SMS (Short Message Service) gateways, HLR (Home Location Register) gateways, etc.

The database interfaces support both Structured Query Language (SQL) entry and graph analysis of the stored data. The interfaces also support access control to separate fields within the databases. Different user roles and levels of authorisation may access defined data sets and fields. The access is controlled by a variety of security measures. The access, authentication, and authorisation can be delivered via a range of industry standard approaches that include ACLs (access control lists), LDAP (lightweight directory access protocol), and custom role-based access, such as cell and row security, and access interfaces that are restricted to individual roles.

E-Commerce Portals

Tereon can support ecommerce portals via an API, so that an operator of the portal can create a plug-in for that portal.

Rules Engine

The rules engine 106 allows new services to be built by knitting together the various abstracted components for a transaction or to support a new device. The rules define the business logic for the deployed services, and the service provider can tailor these services to individual users.

The rules can be defined in UML (Unified Modelling Language) or in a code that is similar to plain English. The engine will parse the rules and create the services from the abstracted components.

The abstracted nature of the components allows new service or device modules to be created quickly. This enables Tereon to support new services or devices as the need to do so arises.

Tereon's internal interfaces are protocol agnostic so that external protocol modules can be interchanged without affecting the functionality. For example, in order to interface to a banking core system, a custom data interchange protocol might be used with one part of an organization, and an ISO 20022 protocol module with another.

The SDASF 104 enables Tereon to support multiple smart devices and protocols. The idea of the SDASF 104 is to abstract the entities into device types and protocols. The SDASF 104 defines multiple protocols, with each device calling whichever protocol it requires for a particular service or function.

The SDASF 104 can be extended by adding new modules to existing installations without affecting that installation's operations. It enables all the services to be defined at a back-office server using whichever method is preferred. Once installed on the merchant terminals, the Tereon terminal applications communicate with the SDASF to provide the services to the customer.

Figure 2:
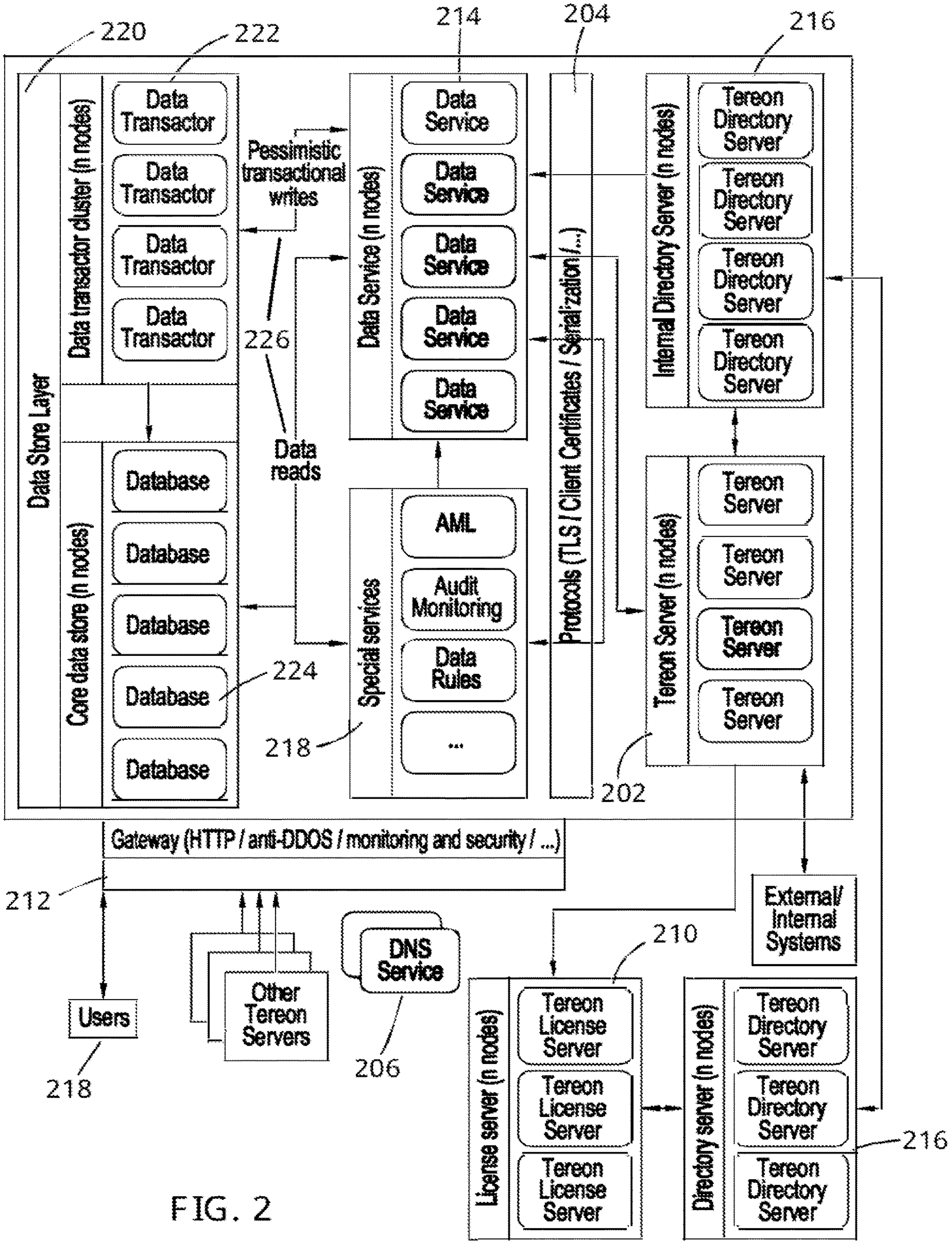
FIG. 2 illustrates an example of the Tereon system architecture.

FIG. 2 sets out the Tereon system architecture 200. Where the diagram and narrative refers to a particular component via a particular solution then this is simply because these are the components or languages that are chosen in an embodiment. Bespoke systems may be built to replace these components, or use other languages and systems where those would prove to be more efficient.

The Tereon Server

The Tereon Service 202 is a logical construct that is identified as a monolithic artefact. In reality, it can exist as a set of isolated microservices, each of which can differ by function and scope.

The Communications Layer

Figure 3:
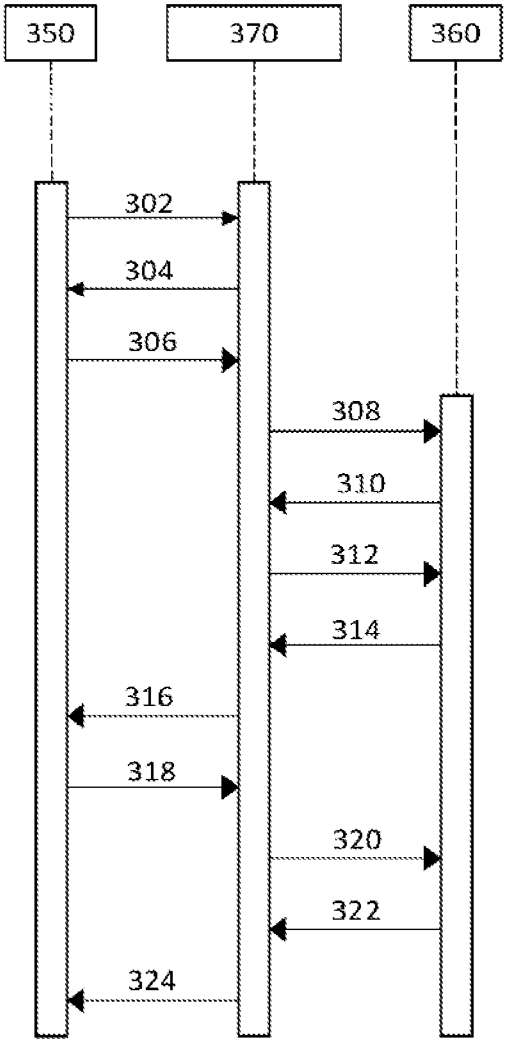
FIG. 3 depicts communications initiated over TLS connections through an intermediary proxy.

The communications layer 204 is initiated over TLS (transport layer security) connections through an intermediary proxy. This is also shown in FIG. 3. TLS is a cryptographic protocol that provides communications security over a computer network, usually a TCP/IP (Transmission Control Protocol/Internet Protocol) network. Each component has an ACL (access control list), which specifies which users or systems processes can access or connect to a system, object, or service. This ensures that only the intermediary can establish an incoming, original connection, heightening intrinsic security and reducing the threat profile. In this example, the proxy uses an HTTP gateway platform known in the art with specialized Tereon customizations.

Private DNS Network

DNS 206 is used as the foundation for the directory service 216. The directory service 216 is highly redundant and replicated across geographic locations. However, its structure and capabilities are far in excess of anything that the existing DNS services can offer, as set out below.

Abstractions

Figure 2A:
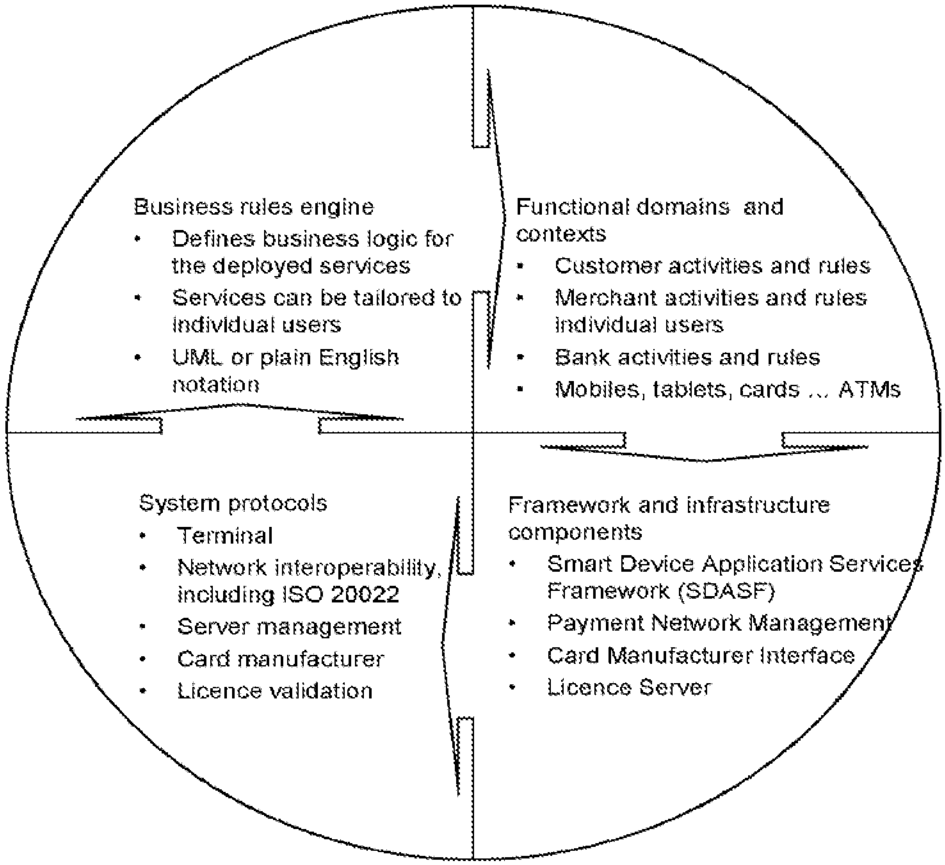
FIG. 2*a* illustrates how Tereon abstracts its services and devices into functional domains and contexts, devices, components, and protocols.

FIG. 2*a* illustrates how Tereon abstracts its services and devices into functional domains and contexts, such as customer or consumer activities and rules, merchant activities and rules, bank activities and rules, transport activities and rules, device functionality and rules, etc. FIG. 1 illustrates how Tereon gives effect to these abstractions by abstracting the components and services of the system into functional blocks or modules.

Tereon modules are constructed from these abstractions. Each device, each interface, and each transaction type is abstracted into its domains and contexts. These abstractions are reusable, and can, where meaningful or allowed, interface to others. For example, charge card, credit card, debit card, and loyalty card modules will each use a number of common abstractions. So too will the payment and funds transfer modules.

Protocols

Each of the protocols 204 and 212 that Tereon supports is itself implemented as a module. Tereon makes these modules available to those services or components that require them.

Legacy systems struggle to process simultaneous transactions in the 100s or 1,000s before they have to add hardware. Rather than update their systems, banks have relied on periodic settlement systems that require reconciliation accounts and high costs to cover the credit exposure up to the point of settlement. Tereon does away with the credit exposure and so the need for such accounts. It renders highly affordable systems that are now called on to process 100,000s of transactions per second. Tereon is designed to build in resilience, support 1,000,000s of transactions per second per server, and operate on high-end commodity hardware rather than rely on expensive hardware. Tereon also supports horizontal and vertical scaling in a near-linear fashion without compromising on the ACID guarantees or its real-time performance.

The Licensing Subsystem

The Tereon Licensing Server 210 allows components of the system to ensure that they are communicating with legitimate, authorised, licensed peer systems, both within a single deployed instance—where microservices of a single instance are engaged in inter-process communications on a single machine, regardless of whether the machine is, for example, a physical machine, a logical machine, a virtual machine, a container, or any other commonly used mechanism for containing executable code, and across any number or type of machines—and across deployment instances (e.g. separate customer platforms communicating with each other). The licensing platform is implemented via a certificate authority structure known in the art.

When components are installed to the system, they communicate their installation details (organization, component type and details, license key, etc.) along with a certificate signing request to the license server over a secure, authenticated connection at prescribed, configurable intervals (e.g. monthly, with a one-week lead time).

The certificate server compares those details with its authorised component directory, and on a match, grants the device initiating an installation request a new certificate, signed with an isolated, secured signing key (generally via a hardware security module) in an internal certificate authority hierarchy, usable for a prescribed period of time (e.g. one month). All of the clocks in the connected systems are synchronized.

The caller can then use the certificate as a client certificate when initiating communications with other modules, and as a server certificate when acting as the recipient of connections. The license server, having never received the private key, does not hold details that would allow any other party to impersonate this certificate, even if compromised. If preferred, the caller can request two certificates, a client certificate and a server certificate, from a license server.

Each component can validate that the server and client certificates have been signed by an agent of the trusted, authorised certificate authority, and can communicate with significant confidence that they are not subject to man-in-the-middle attacks or surveillance, and that the counter-party is who it says it is. Each certificate is granted with usage code metadata that limits how each module can present itself; for instance, as a lookup server for a specific organization. The organization is assured that all parties are operating licensed, legally valid instances.

Most certificates simply expire and are never renewed, having been granted for a fixed term. However, in the rare instance that a certificate is compromised, or a license terminated or suspended, a revocation list is used and asynchronously distributed to proxy services as needed. An active certificate directory is always maintained, usable for periodic auditing.

In addition to the two-way validation benefits (that the client is who they say they are, and the server in each connection is who it reports it is), this implementation allows components to intercommunicate securely without each connection build-up requiring communications with remote license servers, securely communicating without potentially reducing overall reliability of the platform.

Site to Site Communications

Site to site communications is facilitated through an identified, exposed HTTP gateway instance 212, running the custom zero-copy and optional user-mode functionality. This is the platform through which mobile devices, terminals, and other external parties communicate with instances, in addition to site-to-site connectivity. This accommodates industry standard intrusion detection, rate limiting and DDOS (distributed denial-of-service) attack protection, hardware encryption offloading, and so on. It is functionally the logical instance proxy mechanism writ large, and supports all of the same functionality, including client/server certificates and validation, while also using an externally recognized certification authority to outside parties.

The Tereon Data Service

One of the key features of the Tereon system is that it is able to handle significantly more transactions (in terms of throughput) than previous systems.

This is due to a unique design that implements a highly concurrent, fast, and scalable processing network, which can process data and transactions, and an extremely efficient data services layer as well as algorithms and bespoke modules that minimize the processing overhead.

The performance characteristics described are primarily targeted at scaling up—doing more on a given piece of computing hardware, so leading to significant reductions in running costs and power consumption. However, the design is not restricted to a single system; the Tereon system is capable of scaling out both vertically and horizontally to an enormous degree, with each service capable of running concurrently on a large number of devices.

To achieve high levels of performance on a single system or server, the system preferably minimizes its processing overhead by avoiding unnecessary serializations, avoiding unnecessary stream processing, avoiding unnecessary memory copies, avoiding unnecessary transitions from user to kernel mode, avoiding unnecessary context switches between processes and avoiding random or unnecessary I/O. When a system does so correctly, it becomes possible to achieve extremely high levels of transactional performance on that system.

In a traditional model, server A would receive a request. It would then build and serialize a query to server B, and immediately send that query to server B. Server B would then decrypt (if necessary), deserialize, and interpret that query. It would then generate a response, serialize and, if necessary, encrypt that response, and then transmit that response either back to server A or to another server. The kernel and process context switches occur in the dozens per message, the single message is cast in various forms a number of times, and memory copied between a number of work buffers. These kernel and process context switches impose a huge processing overhead per message processed.

Communications Architecture

Tereon achieves its throughput by restructuring the traditional way data and communications are handled by the system. Where possible, Tereon bypasses the operating system kernel to avoid the processing overhead imposed by the kernel, and to avoid the security issues that often arise with standard data management models.

Each data activity within the system is executed via a data services instance 214. This is a scaled out service-oriented data service layer that is the only component of the system with direct data platform access. Thus all data activities on the system must pass through it.

The data service layer 214 communicates with a data store layer 220 via separate dedicated read and write access channels 226. The data store layer 220 is implemented over a core database store 224, which itself comprises at least one distributed database. These databases do not need to offer ACID guarantees; this is managed by the data store layer.

All writes to the data store layer 220 are managed by a single shared transactor, through which all data changes flow in a serial rapid sequence to preserve causality. The transactor design uses a hot backup redundancy model that presents itself as data transactor cluster 222. If one transactor fails or stalls for any reason, then one of the other transactors will take over immediately.

While the data platform supports partitioning for all data domains, that support is not shown in a figure. If in any case a single data store layer (backed by unlimited data nodes) was found prohibitive or if there were regulatory reasons to do so, data can be partitioned through imperative or declarative means to store to different data clusters using different transactors. For instance, a site may have four data platforms, partitioning customers by geographic or jurisdictional criteria, or for accounts starting with 1-5 to go in one, 6-0 in another. There are processing ramifications to this, but this is supported by the platform.

FIG. 3 shows communications over the communications layer 204 that routes communications to and from the data services layer 214. When a module 350 needs to communicate with another module 360, it first initiates a connection with a proxy 370, passes its client certificate to authenticate at step 302, and then checks that the proxy certificate is valid and trusted on build-up at step 304. The module 350 passes the message at step 306 to the proxy 370. The proxy 370 establishes a correlating connection with the target module 360 at step 308; it first authenticates itself at 308 and validates that the module's certificate is valid and trusted at step 310. The proxy 370 then passes the confirmed details of the initiator (module 350) at step 312, before it receives the module's response at step 314. The proxy 370 returns details of the target (module 360) and its response at step 316. This establishes a communications channel between module 350 and module 360 via the proxy 370, with both modules authenticated and identified to each other to a high degree of confidence, and, where necessary, with all communications and data encrypted. The proxy 370 relays the messages from module 350 at step 318 to the target module 360 at step 320, and relays the target module's response at step 322 to module 350 at step 324.

These connections use keep-alive and session sharing based upon the details of the caller's and the recipient's certificates (e.g. the module 350 can "close" the connection to the target module 360, via the proxy 370, and reopen it without actually building a new end-to-end connection. The connection would never be shared for any other circuit). The communication proxy 370 may be an HTTP gateway, or some other suitable module or component.

Such an architecture traditionally comes at a significant performance cost with heavy use of memory. For the module 350 to communicate with target module 360, traditionally it would need to serialize the payload, encrypt the payload, stream it to the proxy 370, where the proxy 370 would decrypt the payload, deserialize and interpret the content, reserialize the payload, and encrypt it for the target module 360, before passing it to the target module 360. The target module 360 would then decrypt the content, deserialize, and interpret the content.

Tereon uses several techniques to reduce average and maximum latency, to reduce memory loading, and to improve single-platform performance on commodity hardware. This achieves monolithic, in-process performance while maintaining all of the security, maintenance, and deployment benefits of microservices. It does so without compromising the high levels of security and control that such a system must provide.

Tereon can use a batched messaging model over the communications layer as set out in FIG. 3. Each message passed, such as the message passed from module 350 to the proxy 370 at step 306 could be a batch of messages. Tereon can, however, go much further than this.

Figure 4:
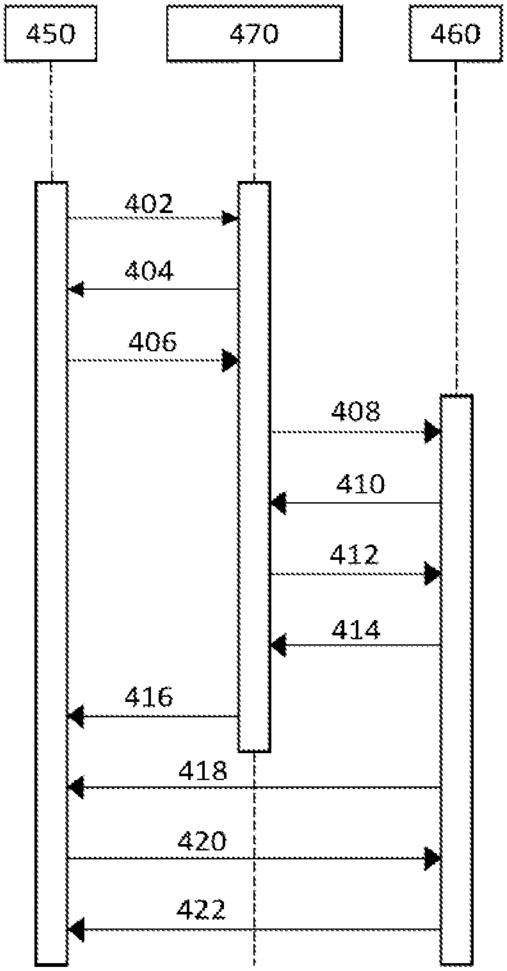
FIG. 4 illustrates the use of shared memory and message passing to proxy memory.

In addition to batched messaging, FIG. 4 shows how two servers of modules can communicate with each other via a proxy module (the bespoke hand-over module) to negotiate a shared memory channel between them. Steps 402 to 412 are analogous to the steps 302 to 312 in FIG. 3 with the addition that, if necessary, the attributes of the service are checked to confirm that they match the client request, something that can also occur in steps 302 to 312.

The module 450 to the module 460 instance can use TLS, or traditional TLS HTTPS, optimally with the HTTP gateway's user-mode and zero copy for the caller transactions as well.

If the source module 450 and the destination module 460 are local, then after establishing the connection via the proxy 470 from steps 402 through to 412, the caller and recipient may optionally request direct connectivity with each other via shared memory, and it is here with this optional request that this method diverges from the method set out in FIG. 3. If the caller and recipient request direct connectivity with each other then, after negotiations, a shared channel is conveyed from module 460 at step 414 to the proxy 470, and from the proxy to module 450 at step 416, and the two modules from that point on use a direct to direct process mechanism that again uses semaphores and shared memory. This is illustrated by the messages between module 450 and module 460 in steps 418, 420, 422 and so on.

In the Tereon model, server 450 batches a plurality of requests in native memory buffers as optimal for the task, queues the message for server 460, and trips a semaphore. Server 460 checks the flags, processes the directly shared memory, and responds in shared memory. The connection uses keep-alive and shared memory based on the details of the caller's and the recipient's certificates, and shared memory and semaphores for communication.

By using the method above, the communication can circumvent the overhead of serialization and streaming (given that it is contained within a machine), to a secure, ACL-controlled, single-caller destination. It does not need encryption; the connection has been validated, authenticated, and authorised on setup and cannot be usurped, and, where appropriate, processes can share wholesale, proprietary memory structures where appropriate.

Both the proxy 470 and the Tereon code modules (450 and 460) support zero-copy networking and user-mode networking where possible (when compiled with the requisite TCP/IP library, an HTTP proxy can provide a solution that avoids the significant cost of kernel context switches for network packets). This is facilitated via network driver specific code that the proxy 470 and the Tereon code modules can use. This minimizes memory usage for small packet requests and responses; these comprise the vast bulk of Tereon operations, where most operations can fit in a single TCP packet.

Figure 4A:
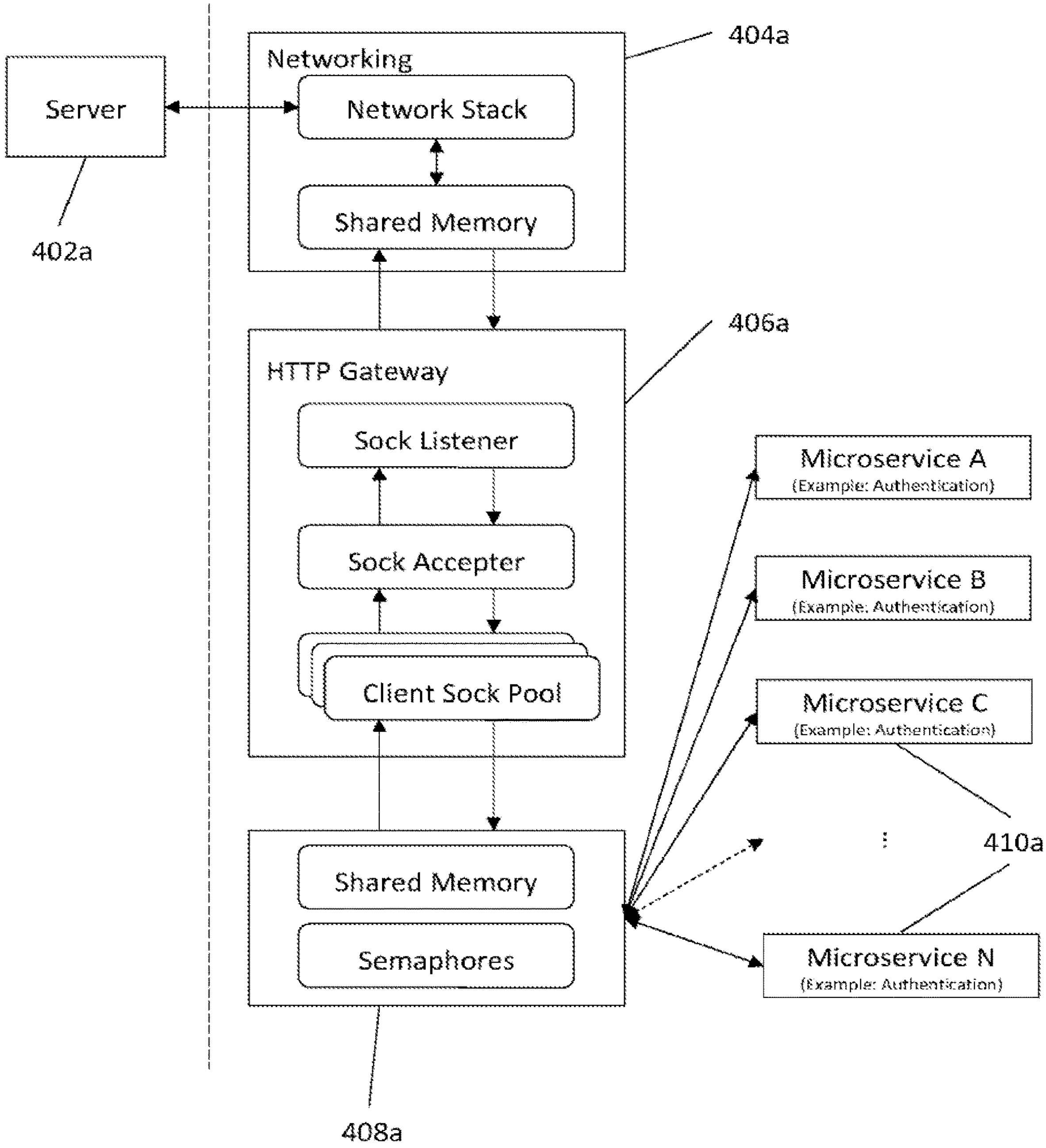
FIG. 4*a* illustrates a shared memory and semaphore hand-over module.

FIG. **4*a* illustrates how the Tereon system implements a set of bespoke semaphore hand-off modules 408*a*, which can also make use of shared memory, that are used to exchange data efficiently between any two components of the Tereon system (such as the HTTP gateway 406*a* and the microservices 410*a* that provide the functionality within Tereon). In FIG. 4*a*, the data services layer 214 is embodied by microservices 410*a***. However, the microservices could represent any sort of service module.

The network stack **404*a* (including a loopback virtual device) receives and assembles the request from a connecting server 402*a* and, instead of then copying it into user-mode target memory, it simply hands ownership of the memory grant to the recipient, in this case the HTTP gateway 406*a***. This is primarily beneficial under a very heavy load (e.g. millions of requests per second) where memory bandwidth saturation starts occurring.

A custom Tereon upstream HTTP gateway module **406*a* allows local instances (relative to the HTTP gateway instance, where generally there is an HTTP gateway instance on each container or on each physical, logical, or virtual machine) the option to use shared memory and message passing to proxy memory from the gateway to the module, and vice versa for that upstream connection. Instead of the HTTP gateway 406*a* serializing a request and passing it via traditional mechanisms, when configured for a shared memory upstream provider the HTTP gateway 406*a*** uses shared memory that it passes to the recipient.

In this case, the shared memory may have been set up using another HTTP gateway, HTTP gateway instance or other element as a proxy. Using an HTTP gateway can be particularly efficient.

Instead of using communications hooks provided by the operating system kernel, each data exchange module bypasses the kernel; this increases the throughput of the system by avoiding the kernel overhead, and addresses areas of insecurity that can occur when data is passed to and from the services provided by the kernel. Within Tereon, a module is used, for example, to exchange data efficiently from a system component straight to the data services layer 214 and from the data services layer 214 to a system component.

Another example of the advantage that this architecture brings is the improved efficiency of the HTTP gateway **406*a*, which is achieved by using the hand-off module 408*a* that allows the HTTP gateway 406*a* to hand over all of the incoming data to microservices 410*a*, such as the data service layer 214 or other components, and all of the outgoing data from the microservices 410*a* or the data service layer 214, to the HTTP gateway 406*a*. Instead of using the default HTTP gateway's data and messaging hand-off, which itself is efficient, the semaphore handoff module, which can also use shared memory, allows the data to be handed straight to the data layer 214 and from the data layer 214 to the HTTP gateway 406*a***, bypassing the kernel. This not only increases the throughput of the system; it has an added advantage in that this secures one of the common areas of vulnerability in systems that use HTTP gateways.

Either the module that provides the shared memory channel or the module that communicates with the shared memory channel can batch and serialize or deserialize and separate the requests. Which module performs that task will come down to the function of that module and the processing overhead that the module incurs in its normal operation. For example, in one case, a module that itself is receiving a large number of messages (which may or may not be requests) may pass its messages to a shared memory module that itself will batch and serialize those messages for the recipient module, as the overhead of batching and serializing may prevent that module from otherwise processing messages efficiently and at load. In another case, a module may batch and serialize its messages to a particular recipient before passing that batch to that recipient via a shared memory channel.

In yet another case, a module passing messages to a recipient module may rely on the module that provides the shared memory channel to batch and serialize the messages, but the module that receives the batched messages may itself deserialize and separate the messages. The question of which module carries out the task of batching and serializing, or deserializing and separating comes down to which choice provides the optimum performance level for the functions that the modules perform. The order of batching and serializing will itself depend on the message type and the functions provided by the communicating modules.

Tereon uses an HTTP gateway 406*a* to masquerade as a web service and so avoid potential issues with network operators blocking non-standard services. Tereon can, of course, masquerade as any other service if necessary, and so can therefore work with well-known network security configurations with ease.

Following this design, the system carries on this modular approach throughout the entire architecture, where the system uses modules designed to exploit the available resources, and to avoid kernel overhead where possible. An additional example is the networking system, where Tereon makes use, where possible, of modules that support user-mode networking or zero-copy networking in the network stack 404*a*. This avoids the heavy overhead of using the kernel for networking. The modular design also allows Tereon to operate on multiple types of systems, where similar bespoke modules provide similar functionality and can be customized for each operating system or hardware configuration.

Using an intermediary in the manner depicted in FIG. 3 and FIG. 4 allows a centralized point of control for all communications, whether intra- or extra-machine. It is a single point of control for rate and security controls, monitoring and auditing, and for specialized rules or re-directions. This allows flexibility in deploying systems, even while those systems are operational, without incurring downtime or significant risks. It also easily facilitates load-balancing and redundancies without any client awareness or complexity.

If the module 350 of FIG. 3 wants to talk to the target module 360, the use of an intermediary allows for the target module 360 to be load-balanced across "n" machines, and to be moved across any number or type of machines without reconfiguring all potential clients, instead simply reconfiguring the intermediary.

The system uses a PAKE (password authenticated key exchange) protocol that was created to provide two communicating parties with the ability to mutually authenticate their key exchange. This is impossible with other well-known public key exchange protocols, such as the Diffie-Hellman key exchange protocol, which renders those protocols vulnerable to a man-in-the-middle attack. The PAKE protocol, if used correctly, is immune to man-in-the-middle attacks.

Where Tereon communicates with external systems, such as an external device or server, it adds an additional layer to the communications system. Many key-exchange protocols are theoretically susceptible to man-in-the-middle attacks. Once a connection is established, using the certificates and signed messages to confirm that the communication is between two known entities, the system uses the PAKE protocol to establish a second secure session key and so render the communications impervious to a man-in-the-middle attack. Thus the communications will use the TLS session key and then the PAKE protocol's session key to encrypt all communications.

Where communication is with devices that have an inviolable identity string, TLS can be dispensed with if necessary and the PAKE protocol used as the main session key protocol instead. This may, for example, occur where the devices are small hardware sensors that form a set of the components of the Internet of Things.

Communication Methods

The Tereon data service 214 is based upon a key-value store with graph functionality that offers n+1 or greater redundancy and optional multi-site replication, and which offers full ACID guarantees via a coordinating transactor (a device or module that carries out, manages, or controls, all or part of one or more transactions). The data service 214 is encapsulated in a data-domain service that, aside from shared-memory functionality, additionally offers zero-copy functionality and unlimited read scaling, in-memory caching, and extremely high levels of write performance. This is persisted in a variable sized data cluster, with heavy memory caching. In highly unique circumstances, the data service can be circumvented for direct use of the key-value stores.

The data service 214 offers both high performance traditional SQL style functionality, along with graph processing to support functions such as money flow analysis. The data service 214, coupled with the very high performance module communications architecture (which provides the efficiency and performance of the platform), provides an extremely efficient design that has exceeded 2.8 million transactions per second in tests on commodity server hardware (with bonded 10 Gbps networking).

By implementing the following architectural priorities, the system can dramatically reduce the number of kernel and process context switches necessary to process the messages transmitted within the system and between systems:

a) Zero-copy networking is available to minimize transport costs from the network edge to services.

b) User-mode networking is available to minimize transport costs from the network edge to services.

c) Where serialization is necessary (primarily when crossing machine or server boundaries), high efficiency serialization is used, e.g. protocol buffers or Avro, as opposed to a high overhead serialization such as Simple Object Access Protocol (SOAP). This is abstracted at the edge of each server such that a given server can as easily talk over the Internet to a peer server on another continent, albeit at a lower performance and efficiency level.

d) Servers have a configurable threshold of buffering where they will attempt to batch requests to minimize process context switches, and to maximize cache coherency for any given server. If server A has 10,000 requests arrive within a 20 ms period, to give an example, and the platform is targeting a 20 ms buffer window, and it needs the assistance of server B for those 10,000 requests, then it will gather the 10,000 requests into a single request, and then queue the asynchronous message for server B, flagging the semaphore. Server B can then rapidly process the 10000 requests, providing a single response to server A. This is configurable based upon optimizing efficiency versus maximum response time.

In practice, reducing the number of kernel and process context switches has yielded enormous improvements in the performance level of the platform. Rather than incur a number of kernel and process context switches per message, the Tereon model incurs that number of kernel and process context switches per block of messages, due to the batching of messages being communicated. Tests indicate that by using this model, the performance difference between the traditional model and the Tereon model is 1:1000 and more for many workloads The modules and their benefits are not, however, restricted to single systems. Even where server A and server B exist, for example, on separate machines, the Tereon system will still use efficient serialization and batching. Regardless of whether this is then coupled with optional zero-copy or user-mode networking, the Tereon model dramatically improves the network and processing performance.

Tests have shown that these design elements have demonstrated local server to server operations in the tens of millions of message request and response round trips per second (in batch, shared memory mode), and in the low millions per second over a high speed network wire (e.g. bonded 10 Gbps).

Since all of these transactions can be handled in real-time and reconciled immediately, there are lots of advantages—particularly for banking, IoT, medical, ID management, transportation, and other environments that require accurate data processing. Specifically, such systems do not currently reconcile transactions in real-time. Instead, the transactions are reconciled after a period of time, sometimes in batches. That is why, for example, financial transactions are usually processed in batches with separate reconciliation processes run after hours. By using the Tereon system, it is possible for the banks to reconcile all financial transactions in real time in a manner that was not previously possible. It then becomes possible to avoid the need for banks to have reconciliation accounts to cover financial transactions that are not yet reconciled, or that cannot be accurately reconciled as, by definition, all transactions will have been reconciled when they are processed.

Transactions and Data Partitioning

All atomic activities in the Tereon system are transactions—they succeed as a whole, or fail as a whole, as is a fundamental requirement of any system backing ACID guarantees for transactions. This section briefly explains how this is accomplished, and sets out the details of the approach that Tereon has taken to transactions and data partitioning in order to mitigate the effects of partitioning on achieving ACID guarantees for transactions.

As has been mentioned above, each data activity within the Tereon platform is executed via a Tereon Data Service instance 214, which itself can operate as a set of microservices 410*a*. This is a scaled out service-oriented system that is the only component of the system with direct data platform access, and thus all data activities must pass through it. These data services are scaled out such that parallel transactions within the system can be accomplished via different data service instances, using instance cached data MVCC (Multiversion Concurrency Control) to always have coherent read data.

Data activities occur via atomic messages to a data service instance, with the message containing the entirety of the data job; for example, a job might involve reading several correlated records and attributes, or updating or inserting data based upon dependent data, or a combination of tasks. The data service instance executes the job as a two-phased commit transaction across all backing, transactional data stores.

The Tereon model guarantees data consistency via the following techniques:

a) Any set of read data carries a version ID.

All writes (updates and dependent inserts) verify that this version ID is current for all relevant data as an optimistic transaction. This means that if a source reads three records to obtain various account attributes (e.g., permissions, balance, and currency data), then this cluster of data has a coherent version ID. If any of those values are then updated, or dependent data is written (e.g., a financial transfer), the version ID is again confirmed as current and if it differs—say the currency assumptions changed, or exchange rates were modified—the write, as a whole, fails completely. The downstream service re-reads, if appropriate, and assesses whether the data changes the transaction in any material way. If not then the transaction is submitted anew. If, again, the transaction fails, it is repeated until the configurable number of retry attempts is exceeded and a hard failure is emitted. A hard fail would be extremely unlikely in normal circumstances.

In the vast majority of real-world scenarios, a failed optimistic transaction would never occur, even across enormous transaction volumes and account diversity. And in the rare case that one did, then data is never compromised, and there is minimal processing overhead. This MVCC/optimistic model is fully protective for deleted records as well, given that the platform that is used is a perpetual history database (beyond regulatory deletes that may be required in exceptional circumstances).

b) Writes to the platform, for a given data partition (which is a separate concept from the horizontal scaling of the data services).

Many data service instances can write to and read from one data partition, and a single data service instance can all store to and read from multiple data partitions. All reads and writes occur through a single master transactor instance 222 with one or more redundant operating backup as necessary. However, only a single instance is ever active. This guarantees that the transactional and causal validity is maintained under all circumstances (e.g. no skew during a network split, for instance, or during brief communication delay). This transactor confirms all optimistic transactions as valid or not, and is continually refreshing the cache managers in the data service instances with updated and current information as contextually important to that instance.

c) Optional data partitioning

Being constrained to a single transactor could potentially limit scalability for very large Tereon instances (understanding that a single organization could manage multiple Tereon instances by region, etc.). Data partitioning is the notion that a Tereon Data Service cluster can partition data across transactors 222 or data stores 224 based upon configured Tereon rules by domain. The Tereon platform supports the following partitioning rules currently, as a heterogeneous, multi-component hashing strategy:

i) Hashing targeted data of a given element or of any superior element (e.g. details hash according to the parent record). The high performance hashing has cardinality equal to the number of partitions.

The system does not currently provide for rebalancing, so in the current implementation hashing has to be up front, though rebalancing will be provided for in a future implementation (though partitions can still be added currently, using a multi-part rule that includes hashing by origin date and time).

ii) Data configured hashing of targeted data of a given element or of any superior element e.g. by enumerated geographical area. By last name A-K or L-Z, etc. By currency. Etc.

The data targeted hashing supports alphanumeric, Unicode, and other character code ranges, integer ranges, floating point ranges, and enumerated sets.

iii) Combinations of the above.

In an implementation, for example, the two letters, A and B can refer to two separate data sets that are common across a whole geographic region, with the numbers 1 and 2 referring to two divisions of that region. A single partition rule can support, for instance, partitioning between the top level partitions 1AB and 2AB via a data rule, such as a geographic region, and then further partitioning between the A and B sub-partitions via an account number hash.

d) A single job accomplished via a single data service instance can cross multiple data partitions, be completed by multiple transactors and be persisted on a large number of data storage nodes.

This presents obvious data integrity complexities. The integrity of the data, however is guaranteed as all components of the transaction are bound in a single two-phased commit wrapper. The entirety of the transaction, against all persistent nodes and actors, completes or fails as a whole, and provides all of the same versioned guarantees.

The end result of this confluence of architectural designs is that the system is completely transactionally secure, highly redundant, and highly scalable, both vertically and horizontally. While write transactions (which in most scenarios encompass a small percentage of the activity) can be limited by the transactional necessity of a single transactor per partition, the addition of rule-based partitioning, especially of superior data elements, provides enormous flexibility to expand the system to a conceptually unlimited degree, before even considering bifurcating instances.

The Tereon Data Store Implementation

The Tereon infrastructure is capable of handling over 1,000,000 ACID guaranteed transactions per second. This is achieved by abstracting or otherwise implementing a data store layer 220 on top of a distributed database or databases 224, using a high performance key/value distributed database for the storage tier (this can be at any level of depth, from an abstraction via the Tereon Data Service, through to direct database use to the storage tier), with separate read and write access channels 226. Tereon's use and configuration of the data store is unique.

The data services layer communicates with the data store layer via its bespoke data exchange modules. The databases themselves do not need to offer any ACID guarantees at all—that is handled by the data store layer 220. Nor do they need to offer graph capabilities, as those slow down the write processes significantly. The data store layer 220 provides the interface to the heterogeneous data layers and provides the interface functionality that the different parts of the system require. Thus the write functionality provides a fast cell and column structure, whilst the read interface provides a graph interface to enable it to traverse the distributed data store in micro seconds.

The data store layer provides the SQL interface and the graph interface layer above the core data store databases 224, and provides a number of significant architectural advantages that set Tereon apart. Each client instance (the Tereon Data Service instances 214) hosts an in-memory/in-process database engine, including cached representations of all of the hot data for that instance. In effect, the instance hosts the database engine and the cached representations of all of the current transactional data, the status of each current transaction, and all other information that relates to that instance's current state within its portion of the RAM or other fast memory of the machine or machines in which that instance is operating.

This allows the Tereon Data Service to facilitate most read-oriented tasks at an enormous rate (millions of discrete queries per second, per instance, where the hot, relevant data is cached locally), magnitudes above the performance levels that would be achieved were it to serialize and make external or off-machine requests to external database systems. When data is not in the in-process cache it is retrieved from the key value store.

An MVCC versioning system is used to manage concurrency, and an attribute of the data layer is that data is never deleted (outside of forced deletes for regulatory compliance)—the system retains the entire history of every record change for the life of the data system. This makes trivial operations such as "as of" querying, and auditing any platform changes.

The write implementation of the data layer uses a single shared transactor through which all data changes must flow, processed in a serial, rapid sequence. This ensures that transactions are valid, consistent, and minimizes change concurrency overhead, which is an onerous weight on most database platforms. The transactor design uses a hot backup redundancy model. As the transactor processes changes, it notifies all active query engines (which in this case exist in the Tereon Data Service) and they update their in-memory caches as appropriate.

The design provides micro-second latency for reads, writes, and searches, irrespective of the size of the data store. It also provides a modular construction that allows components to be upgraded and replaced without affecting its operation. This data store is abstracted from the underlying implementation, and can be substituted with other stores in the Tereon Data Service.

If the data store layer is set to operate with pessimistic ACID guarantees 226, that is to put in an extra step to confirm that it has written a record before moving on to the next transaction, then this adds a short delay, but provides an absolute guarantee of ACID consistency and data integrity.

The advantage of this design is that it provides ACID guarantees, as the application layer cannot proceed until the data layer confirms that it has written the record and completed the transaction.

This means that, for instance, in banking, payments, and other transaction types that must preserve causality, problems caused by eventual consistency are removed. By designing in ACID guarantees, any need for reconciliation accounts to cover any shortfall when the bank systems discover mismatched processes is also removed. The real-time processing means that the time-delay that reconciliation processes incur on eventual consistency systems is also removed.

The design of this platform offers very high levels of redundancy and reliability on commodity hardware, and extraordinary scalability (both vertically and horizontally). Theoretical concerns about possible limits of the transactor system did lead to building a partitioning platform into the data service to overcome those limits, but under the vast majority of scenarios it would never be necessary to use that platform.

Lookup/Directory Service

The Tereon system has a directory service 216 that is a directory of the credentials and information in the system that identifies which server a user or a device 218 is registered to, or which server offers a particular function, resource, facility, transaction type, or other type of service. The directory service enables multiple methods of authentication of a user 218 to take place, since it stores a number of different types of credentials relating to that particular user. For example, a user 218 may be authenticated using their mobile number, email address, geographic location, PANs (primary account numbers), etc., and caches that data so that it is not necessary to authenticate each time.

The directory service 216 provides a layer of abstraction that separates the user's authentication ID from the underlying services, servers, and the actual user accounts. This provides abstraction between the credentials that a user 218 or merchant may use to access a service and the information that Tereon requires to perform the service itself. For example, in a payments service the directory service 216 would simply link an authentication ID, such as a mobile number, and perhaps a currency code with a server address. There is absolutely no way to determine whether the user 218 has a bank account, or which bank that user 218 banks with.

The system architecture enables Tereon to provide several novel services or features that are simply beyond the scope of existing systems.

The Tereon system architecture is useful because it allows scalable and redundant systems. Bank core systems tend to offer modules dedicated to individual channels e.g., card management, e-commerce, mobile payments. This reinforces the silos and increases the complexity of their IT systems. That complexity is one of the reasons why banks fail to update their services and systems regularly.

Tereon is designed to support all devices and all use cases with a modular architecture that renders it highly configurable and customizable. The heart of this is the SDASF 104 discussed above, and the business rules engine 106, together with a high level of abstraction. It is this together with the extensible framework that enables Tereon's flexibility.

Tereon enables an operator to use standard carrier-grade systems to provide and support numerous transaction types. Tereon will support any transaction, whether or not that transaction requires authentication.

Special Processes

Special processes 208 ideally leverage the functionality of the data services. However, there may be instances where a unique requirement does not justify changing or extending the core data service, such that the data library is leveraged within the special process to draw from the data directly. This may, for example, include graph-functionality processes such as AML (anti-money laundering), CRM (customer relationship management), or ERP (enterprise resource planning) functions.

Multiple Services

As each service is a module, Tereon's modular structure enables it to support multiple types of services and devices. In payments, for example, this structure enables Tereon to support a plurality of payment types and devices, including banks, charge cards, credit services, credit unions, debit services, employee schemes, ePurse, loyalty schemes, membership schemes, microfinance, prepayment, student services, ticketing, SMS notifications, HLR lookups, etc.

Multiple End-Point Devices

Tereon's modular structure enables it to support almost any end-point device that it can communicate with, either directly or indirectly, including magnetic stripe cards, smart cards, feature phones, smart phones, tablets, card terminals, point of sales terminals, ATMs, PCs, display screens, electronic access controls, e-commerce portals, wrist bands and other wearables, etc.

Multiple Databases

The modular architecture has another benefit in that the system is not limited to one database. Instead, several databases can be connected, each with a module specific to the database in question, and so use specific data-bases for specific purpose, or use a combination of data records across multiple heterogeneous databases.

The implementation of a licensing subsystem 210 is novel in its use of certificate authorities for licensing purposes in addition to the authorisation and authentication benefits that it provides. Instead of each module either trusting one another's claims, using simple authentication with a shared database, or endlessly delegating to a separate license server on each connection build-up (with the performance and reliability overhead that entails), which are the most common implementation patterns for such distributed, module based systems. In Tereon, the licensing subsystem ensures that connections between modules are intrinsically secure, and have trusted, validated metadata about the actors, with minimal performance and reliability overhead.

The implementation also limits the scope of potential vulnerability in the instance of a license server compromise: In a traditional deployment such a compromise would merit a scorched-earth rebuilding of all components. In the Tereon model, there is a time-based exposure that would demand a new intermediate signing certificate (if it was not protected by a hardware security module). All existing certificates, granted pre-compromise, would be grandfathered in and could be renewed on the normal schedule. New certificates would be granted under the new authority, and any other rogue certificates would be rejected as post compromise. This exposure window control benefits worst-case scenarios. The data held by the license server is, outside of the signing certificate private key that ideally is held on a hardware security module, completely non-privileged information.

Tereon's design also leads to the option of combining an end-point device, such as a mobile phone or an IoT device with a miniaturized Tereon server that will communicate with other Tereon servers as part of a network of such servers. They will still communicate with a Tereon Licence Server 210, and perhaps one or more operator-run Tereon Servers to collate data and co-ordinate activities. Nevertheless, the distinction between an end-point device and a Tereon server can be an abstract one, where any distinction depends only on the use-cases to which the devices and servers are put.

Hash Chains

One of the big drawbacks with blockchains is that the blockchain stores an audit of all of the previous transactions (i.e. it is possible to determine the transaction history in the blockchain, which is then used for authentication purposes).

This means that the blockchain approach is not infinitely scalable since the size of the block chain eventually becomes too large to manage in a realistic time frame, while the size of each block limits the maximum transactions per second that the blockchain can register.

A second drawback is that the transactional history is available to anyone who can access the blockchain, and so provides them with the ability to ascertain who the parties to a transaction are. This presents significant privacy and regulatory challenges to using blockchain in any meaningful activity where privacy and/or confidentiality are paramount requirements.

Another drawback is that the blockchain can only hash the result or final record of a transaction, and cannot validate the actual processes or the steps of the transaction themselves.

The hash chain disclosed herein seeks to overcome these problems by using a specific hashing approach in order to keep the records private between the transacting parties, and yet provide a distributed authentication network that encompasses all users of Tereon, irrespective of whether they operate on open or private networks.

This is achieved by the continuous construction of a distributed chain of hashes that operates in real-time across both public and private networks, without revealing to any third party the contents of the underlying communications. This contrasts directly with the standard model of a distributed hash or ledger, where every party has to see and accept the content of every communication, irrespective of whether or not they are party to that communication.

When the hash chain uses a protocol that includes a zero knowledge proof, then it can authenticate each of a transaction's steps and the information or outcome generated by those steps.

The implementation can either result in the parties to a communication generating the same intermediate hash, or they can generate unique intermediate hashes for the same communication. The structure also allows the parties to migrate to new hash algorithms as existing algorithms are deprecated, without affecting the integrity of the hash chain. This contrasts directly with the difficulty of updating or upgrading the algorithms used in existing live solutions, such as the blockchain.

Tereon creates a hash audit chain for each side (account) of a transaction, where:

- Tereon generates a hash associated with a record and stores the hash against that record. Tereon will generate that hash as soon as the action that generates the record is complete, as it uses the steps that generates the record and the information or outcome that arises from those steps;
- Tereon uses the hash for the previous record as part of the data for the current record; and
- the first hash in any record chain will be a random hash with the server's signature, the date and time that Tereon generates that hash, and, if required, a random number.

If the record is of an action that involves two or more parties and each party should have a record of its side of the action, then for each of the parties in an action Tereon will:

- share each party's hash of the record with the other party or parties;
- use that hash to form part of the recipient party's record for which Tereon will create the record hash;
- create an intermediate hash of the record that includes the hash from the other party or parties.
- share that intermediate hash with the other party or parties, so that each party thus has a hash that encapsulates the other party's part in the action (if the parties use the correct protocol then there is no need to share their intermediate hashes as these will be exactly the same);
- include that intermediate hash in the record of the action;
- generate a final hash that it will store against the action and use as part of the next record; and
- associate each of the transferred hashes, or the intermediate hash generated with the protocol using the zero knowledge proof, against the transferor's ID or Tereon number.

Tereon can provide the ACID guarantees and the real-time session transaction and processing speed that are required for this, as will be explained below. Furthermore, the prevalence of the blockchain has meant that developments in this area have not been considered.

The blockchain can only hash a record of a transaction once that transaction has been completed. There is no guarantee that the record passed to the blockchain is actually the genuine record of the transaction itself. The blockchain is limited in this way as its underlying hash structure is designed for static collections of data, not dynamic, real-time transactions, and it relies on the majority of its operators acting honestly. The blockchain itself presents yet a further limitation in that it can only offer eventual consistency; not ACID consistency determined by the chronological order of the transactions, but by the order in which those transactions are incorporated into blocks, and by the consensus model to manage forks in the blockchain when two or more blocks that contain slightly different transaction sets are discovered more or less simultaneously.

Figure 5:
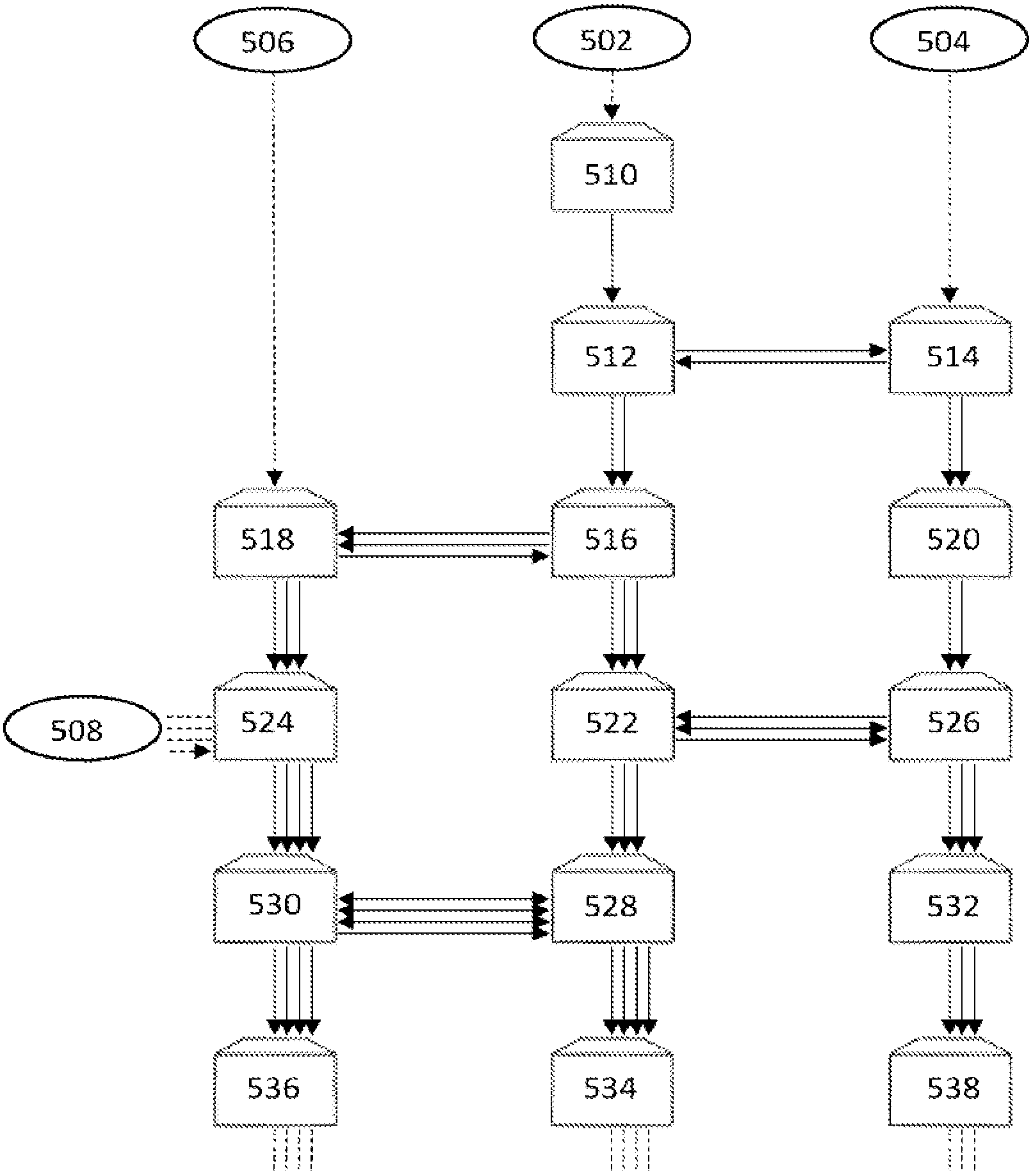
FIG. 5 illustrates a hash chain that involves four accounts.

FIG. 5 illustrates the dendritic nature of a hash chain that involves four accounts 502, 504, 506 and 508. The accounts may be on the same server, or they may be on separate servers. Each system may support one or more server, and each server may support one or more accounts. Where the accounts reside is irrelevant. FIG. 5 also illustrates five transactions that occur between pairs of accounts. There are two transactions that occur between accounts 502 and 504, two transactions that occur between accounts 502 and 506, and one transaction that occurs between account 506 and 508. In the figure, each box is a step that relates to the account at the top of the column. Each step involves an unseen action or transaction, such as a search within that account, or a transaction between that account and another unseen account or a system. What those transactions or actions are is irrelevant. All that matters is that they involve something that a Tereon system records in its audit.

At step 510, the Tereon system takes h(502), the previous hash for this account. As discussed above, the first hash is a random hash with the server's signature, the date and time that Tereon generates that hash, and, if required, a random number. Tereon adds this hash to the record for the transaction or action that occurs at step 510, and then uses this as the seed to calculate h(512), the hash for this transaction. The record at this stage contains h(502) and h(512).

At step 512, the system exchanges the hash, h(510), with the server holding the account 504. It adds the hash h(504), the hash for this transaction for account 504, to the record, generates an intermediate hash h($\mathbf{512}_i$), adds this to its record, and then exchanges this for the intermediate hash h($\mathbf{514}_i$) from account 504 (generated at step 514, as explained below). It then adds this hash to its record and generates the hash h(512).

This hash h(512) now contains information that validates the chain of hashes for account 502 up to step 512, and for account 504 up to the intermediate stage of step 514. The record contains h(510), h(512$_i$), h(514$_i$), h(504), and h(512).

At step 514, the system exchanges the hash, h(504), with the server holding the account 502. It adds the hash h(510) from account 502 to the record, generates an intermediate hash h(514$_i$), adds this to its record, and then exchanges this for intermediate hash h(512$_i$) from account 502. It then adds this hash to its record and generates the hash h(514).

This chain now contains information that validates the chain of hashes in account 502 up to step 512 and for account 504 up to step 514.

This procedure is carried out for further transactions between accounts 502, 504, 506 and 508 in order to generate hashes for each transaction in exactly the same way as set out above. For example, at step 534, the system takes h(528), the previous hash for account 502 generated at step 528, adds this to the record for the (unseen) transaction or action that leads to an audit record, and generates h(534), the hash for this transaction. This chain now contains information that validates the chain of hashes in account 502 up to step 534, for account 504 up to step 526, for account 506 up to step 530, and for account 508 up to the intermediate hash from account 508 that was used to generate h(530) at step 530. The record contains h(534) and h(528). Tereon generates the hash h(528) at step 528 from a record that included h(530$_i$), which itself was generated from h(524) at step 530. The hash h(524) contains information that validated account 508 up to the intermediate hash from account 508 that was used to generate h(524) at step 524.

Reconciliation

In order to ensure that a transaction cannot take place if a fraudster has altered the record of the previous transaction, reconciliation can be performed over the last 'N' transactions first. Thus, for example, before Tereon carries out the transaction represented by step 522, it can first recalculate the hashes for step 516, and perhaps step 512 and so on, up to the preceding 'N' transactions for account 502. The audit trail will have sufficient information to recalculate the final hash values for the transactions. Likewise, the system holding the account 504 can recalculate the hashes for step 526, step 520, etc. Tereon does not need to recalculate any of the hashes for account 506 for the step 522 transaction.

In a hash chain, if any of the recorded hashes do not match the recalculated hashes then this means that a record has been altered without authorisation, and the operator can immediately investigate the issue or block further transactions.

System Hash Chain

A system hash can also be added to each record. This will be a hash of the record where the seed will be the hash of the previous action on the system, irrespective of whether or not that action relates to the account to which the record being hashed belongs. If the system hash is added then a hash chain within each account, and a hash chain of the system as a whole, is provided.

Figure 6:
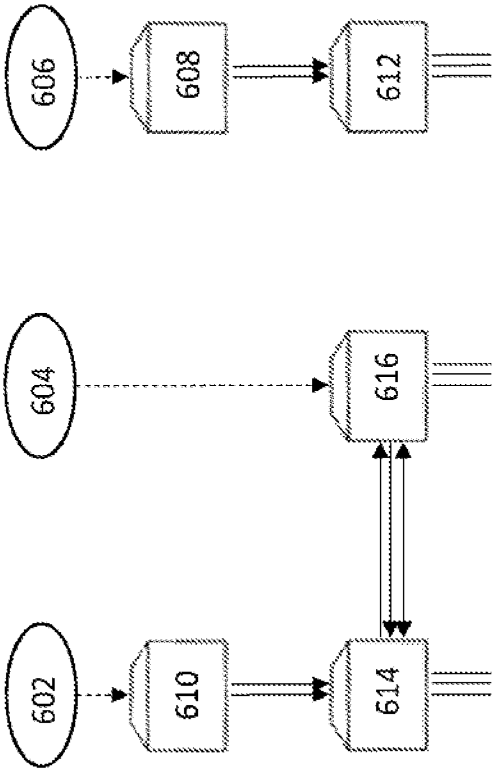
FIG. 6 illustrates a hash chain that involves two accounts on the same system.

FIG. 6 illustrates the dendritic nature of a hash chain that involves two accounts 602 and 604 on the same system, whose 'system account' that records all system events is 606. The system creates a new hash of a record for every action that results in a record, irrespective of where that record resides. These are the system hashes, h(606), h(608), h(612) etc.

Administrative functions also result in records that the system assigns to the administrative accounts, regardless of whether those functions involve human input or whether they are automated functions.

At step 608, Tereon creates a hash of the record of an unseen action or transaction in account 602 that triggers an entry in the system's audit record (the record for account 602 includes the hash h(602), the previous record hash for that account), and uses h(606) for that new system hash h(608). The system then records this hash against the record for the transaction and calculates the hash h(610) for account 602 at step 610.

If the system's computing performance allows, then it can use a stronger variation for the system hashes that mirrors the operation of account hashes.

At step 610, Tereon exchanges the hash, h(602), with the system account 606 for the hash h(606). It adds the hash h(606) from the system account 606 to its record and generates an intermediate hash h(610$_i$). It generates this after it has completed the unseen action or transaction in account 602 that triggers an entry in the system's audit record and adds the hash to its record. Tereon then exchanges this intermediate hash for the intermediate system hash h(608$_i$). It then adds this and h(608) to its record and generates a new account hash h(610).

At step 612, Tereon exchanges the hash, h(608) generated at step 608, with accounts 602 and 604. It adds h(610) generated at step 610 and h(604) to its record and generates an intermediate hash h(612$_i$). It exchanges this with accounts 602 and 604 for their intermediate account system hashes h(614$_{si}$) and h(616$_{si}$), and intermediate hashes h(614$_i$) corresponding to account 602 and h(616$_i$) corresponding to account 604. It then generates a new system hash h(612). The system then records this hash.

At step 614, Tereon exchanges the hash, h(610) generated at step 610, with the system account 606. It adds the hash h(608) from the system account 606, generated at step 608, to its record, generates an intermediate account system hash h(614$_{si}$). It generates this hash after it has completed the transaction with account 604 (and swaps the intermediate transaction hashes h(614$_i$) and h(616$_i$)), adds it to its record, and then exchanges this for the intermediate system hash h(612$_i$). It then adds this and h(608) to its record and generates the account hash h(614).

At step 616, Tereon exchanges the hash, h(604), with the system account 606. It adds the hash h(608) from the system account to its record, generates an intermediate account system hash h(616$_{si}$). It generates this after it has completed the transaction with account 602 (and swaps the intermediate transaction hashes h(614$_i$) and h(616$_i$)), adds the hash to its record, and then exchanges this for the intermediate system hash h(612$_i$). It then adds this and h(608) to its record and generates the account hash h(616).

At step 612, one option is for the system to send the intermediate system hash h(614$_{si}$) to account 604, and the intermediate system hash h(616$_{si}$) to account 602. This would mean that the final record hashes for those accounts, h(614) and h(616) would contain records of the three intermediate system hashes, h(614$_{si}$), h(614$_{si}$), and h(612$_i$) and so provide an extra layer of certainty.

The system hash chain now contains hashes of both sides of each individual transaction, as well as the transactions as a whole, thus strengthening the hash chain considerably.

If Tereon manages a transaction between accounts on a different system, then the process is as for steps 608 and 610 on each of those systems.

License Server Hashes

The hashes above relate to those generated on and between separate Tereon systems. As these systems interact with each other, so they will eventually join the hash tree that contains information that will validate the transactions on all of those systems. This will, however, only grow at the rate that these systems interact with each other. The system can go even further and build another layer that will ensure that each server will immediately join the global hash tree. This distinguishes the hash chain completely from the blockchain.

Where a blockchain operator sets up a private blockchain, then that blockchain operates in isolation of all others. What it gains in overall processing speed it loses in any security that it might otherwise offer, as a user cannot rely on large network of blockchains to validate a transaction. One of the blockchain's claims to security is that an attacker would need to compromise a number of the blockchain network's nodes to compromise its security (compromising between 25-33% or so of the nodes could be sufficient to compromise the blockchain). A single private blockchain reduces that number, by definition, to one.

With the hash chain, even a private Tereon server or network can benefit from the hash chains generated by the public Tereon servers and networks. Operating a private Tereon server or network does not mean that the operator must compromise on the authentication strength of the Tereon system because that system will still be a member of the global hash chain. It is simply that its transactions, other than those that relate to the license server, will remain completely private to that system.

To achieve this, every server must interact with the license server, regardless of whether or not it interacts with other Tereon servers. If a Tereon server operates in a closed-loop system then it will only interact with other Tereon servers within that loop, and then only if that loop comprises more than one server.

By adding a license server hash, every server will join the global server hash chain as soon as it interacts with the license server, which it must do on a daily basis. The license server hashes are essentially generated by a two-party transaction between a Tereon server and the license server. The license server transactions do not affect any underlying data transactions between Tereon servers, other than the fact that the system hashes for each server will now also contain information derived from the license server hashes, and vice versa.

Figure 7:
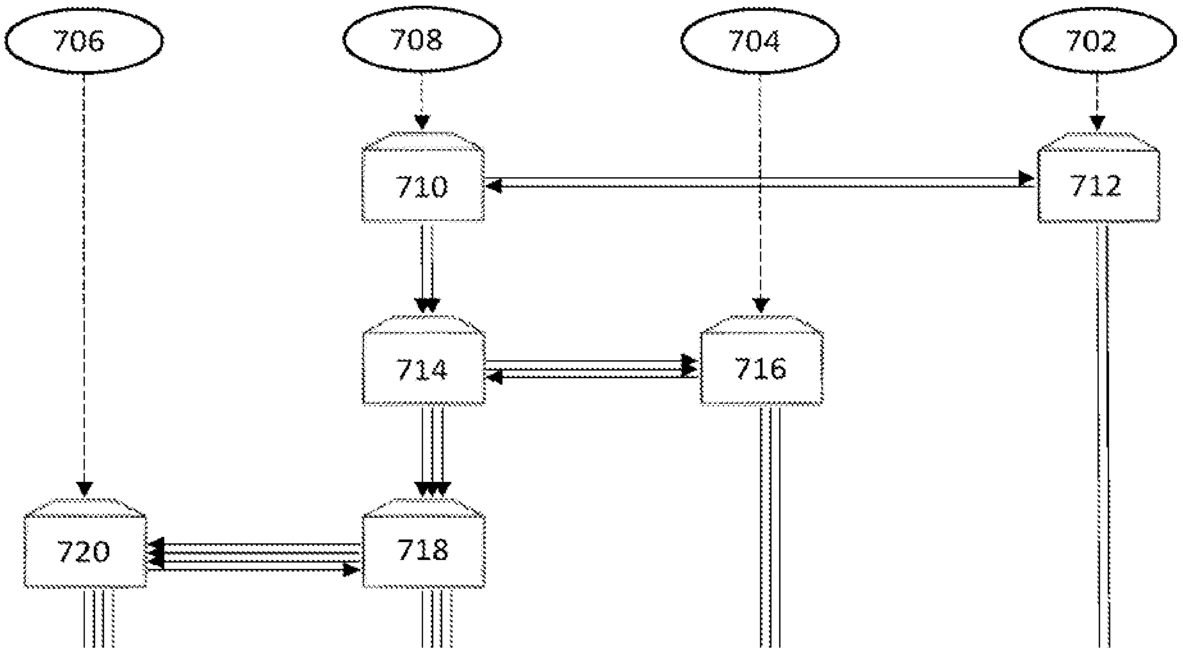
FIG. 7 illustrates the dendritic nature of license hashes.

FIG. 7 illustrates the dendritic nature of the license hashes. In this simple example, system server 702 is a closed loop system, with which systems servers 704 and 706 will interconnect. All three must interact with the license server 708 on a periodic basis.

On its very first interrogation with the license server 708, each server generates its first hash from its public key, the date and time that the server first became licensed, and a random set of data.

At step 710, Tereon uses its hash, h(708), to generate an intermediate license hash h($\mathbf{710}_i$), adds this to its record, and exchanges it for the intermediate system hash h($\mathbf{712}_i$) from server 702. It then adds this hash to its record and then generates the license hash h(710) which it adds to its record.

At step 712, Tereon uses its hash, h(702), to generate an intermediate system hash h($\mathbf{712}_i$), adds this to its record, and exchanges it for the intermediate license hash h($\mathbf{710}_i$) from the License server 708. It then adds this hash to its record and generates the system hash h(712), which it adds to its record.

At step 714, Tereon uses its hash, h(710) generated at step 710, to generate an intermediate license hash h($\mathbf{714}_i$), adds this to its record, and exchanges it for the intermediate system hash h($\mathbf{716}_i$) from server 704. It then adds this hash to its record and generates the license hash h(714), which it adds to its record.

At step 716, Tereon uses its hash, h(704), to generate an intermediate system hash h($\mathbf{716}_i$), adds this to its record, and exchanges it for the intermediate license hash h($\mathbf{714}_i$) from the License server 708. It then adds this hash to its record and generates the system hash h(716), which it adds to its record.

At step 718, Tereon generate an intermediate license hash h($\mathbf{718}_i$), adds this to its record, and exchanges it for the intermediate system hash h($\mathbf{720}_i$) from server 706. It then adds this hash to its record and generates the license hash h(718), which it adds to its record.

At step 720, Tereon uses its hash, h(706), to generate an intermediate system hash h($\mathbf{720}_i$), adds this to its record, and exchanges it for the intermediate license hash h($\mathbf{718}_i$) from the License server 708. It then adds this hash to its record and generates the system hash h(720), which it adds to its record.

These three License server to Tereon server transactions have resulted in the following results:

The hash h(712) generated at step 712 contains information that validates the state of:
- the License server 708's hash chain up to the intermediate hash h($\mathbf{710}_i$); and
- server 702's hash chain up to the hash h(712).

The hash h(716) generated at step 716 contains information that validates the state of:
- the License server 708's hash chain up to the intermediate hash h($\mathbf{714}_i$);
- server 702's hash chain up to the intermediate hash h($k_{702i}^{i}$); and
- server 704's hash chain up to the hash h(716).

The hash h(720) generated at step 720 contains information that validates the state of:
- the License server 708's hash chain up to the intermediate hash h($\mathbf{718}_i$);
- server 702's hash chain up to the intermediate hash h($k_{702i}^{i}$);
- server 704's hash chain up to the intermediate hash h($\mathbf{716}_i$); and
- server 706's hash chain up to the hash h(720).

The hash h(718) generated at step 718 contains information that validates the state of:
- License server 708's hash chain up to the hash h(718);
- server 702's hash chain up to the intermediate hash h($k_{702i}^{i}$);
- server 704's hash chain up to the hash h($k_{704}^{i}$); and
- server 706's hash chain up to the hash h(720).

The license and system hashes therefore contain information that enables them to verify the transactions on every server in the network, regardless of whether or not those servers are interconnected or operate as a closed loop.

Tereon can implement a similar layer with the look-up directory service that will operate in a similar way to the hash chain created by the licensing service.

Off-Line Transactions

Using this approach, off-line transactions can now have the same validity as on-line transactions, as the need to have constant communications links between devices and their servers is removed. Thus devices, such as sensors, portable payments terminals, and so forth, could communicate between themselves and then connect with their servers at predetermined intervals to download and upload data. The system would operate seamlessly between connected and unconnected environments.

The hash chain allows the devices to validate and audit the transactions between themselves whilst they cannot communicate with their respective servers, using business rules to determine whether or not they can engage in the off-line transactions. The devices would simply reconcile those audit and transaction records with their servers when they connect to those servers once more.

Figure 8:
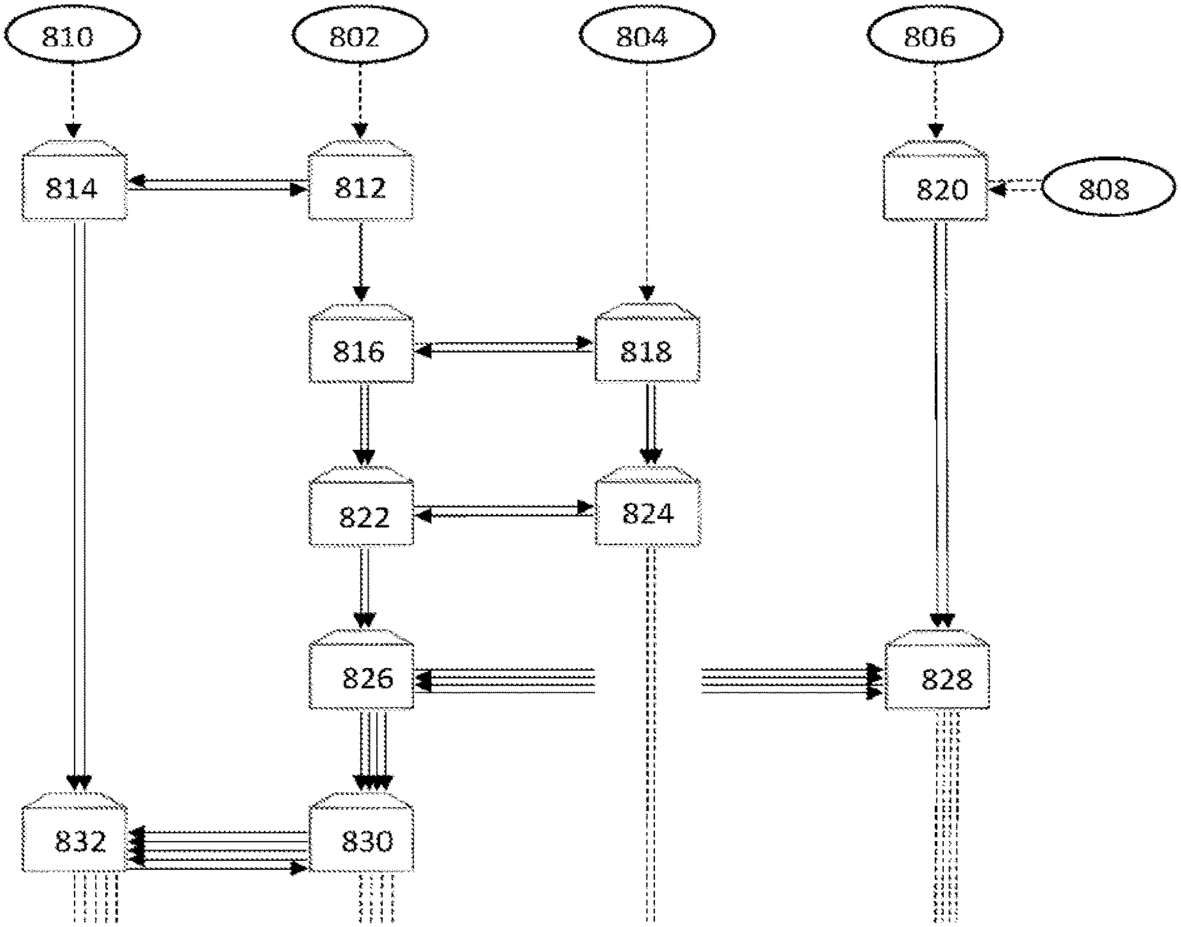
FIG. 8 illustrates a hash chain that involves four devices that go off-line for a time.

FIG. 8 illustrates an example of a hash chain that involves four devices that go off-line from their respective Tereon servers for a time. Three of these, 802, 804 and 806, are visible (the fourth, device 808, interacts with the chain at step 828).

To support off-line transactions between devices, the devices themselves will generate a hash of each transaction that they take part in. When the device is back on-line and communicates with its server, that device will send the hash for that transaction to its server.

Where the device that initiates a transaction is off-line, it will generate a hash for its transaction, and store that hash. It will also send that hash to its counterparty device (the device that it is transacting with), and that counterparty device will send its hash to the first device. This is achieved in the same way as the hash chains described above. The devices can communicate between themselves via any two-way channel, such as Bluetooth, NFC, local Wi-Fi, and so on. They could even publish barcodes for each transaction stage on their screens for the other to read. Each device will also send a signed, encrypted copy of its transaction record to the other device, where the signature will also contain the destination server for that record. Only the destination server will be able to decrypt that record.

Once a device regains communications with its Tereon server, that device will send to the server the encrypted records of its off-line transactions and their associated hashes. It will also send that server the copies of other transactions that it holds, such as the records from its counterparties, and the server will then transmit those records and their associated hashes to the servers with which those counterparty devices are registered. Each device will create its own unique internal transaction number (such as one generated by a monotonic counter, for example) that will identify its part in a transaction. If the transaction is on-line, then the server to which the device is connected will also generate a unique transaction number that both the device and server will use.

Devices can combine their unique internal transaction numbers with time and date stamps, information about the devices clock skew, and other information to preserve the causality of each transaction. When their respective servers receive the transaction information, they will be able to reconstruct the order of the transactions and so preserve the causality of both on-line and off-line transactions for all devices.

Returning to FIG. 8, at step 812, the device 802 hashes the record of the transaction, which includes hash h(802), the previous record hash, and hash h(810) from server 810 to generate h(812). It then passes this hash to server 810, where that hash forms part of the record used to calculate h(814) at step 814. The device 802 is on-line at this point, meaning it is connected to its Tereon server 810. At step 814, Tereon uses h(810), the previous hash for server 810, adds this and h(812) to the record, and then calculates h(814). The record contains h(810), h(812), and h(814).

If the operator has configured Tereon to include the system hash then it will add this to the record before it calculates the hash h(814), as described above. The record would then contain h(812), h(810), the intermediate system hash if relevant, and h(814).

At step 816, the device 802 is now off-line as it cannot connect to the server 810. It transacts with device 804, which is also off-line from its respective Tereon server. Devices 802 and 804 follow the hashing procedure outlined above to generate an intermediate hash h(816) from device 802, an intermediate hash h(818) from device 804, the hash h(816) from device 802 and the hash h(818) from device 804 at step 818. Devices 802 and 804 now sign their hashes with their off-line public keys and pass this to the other device, together with an encrypted copy of the record for that transaction. This is device 802's first off-line transaction since it lost contact with server 810 and device 804's first off-line transaction since it lost contact with its server. The administrator can configure the system so that the application will transfer up to its last n transactions to each unique device that it transacts with off-line.

This procedure is repeated for the further transactions in the chain between device 802 and device 804 and between device 804 and device 806. In these transactions, devices 802 and 804 do not need to exchange their hash and record for previous transactions as they each already hold a copy.

Device 802 will continue to operate this way until it re-establishes contact with its server 810 at step 830. Device 802 now uploads all of the encrypted records of its off-line transactions and their associated hashes, in this example h(816), h(822), and h(826), generated at steps 816, 822 and 826 respectively. It also uploads the encrypted transaction records and hashes that it holds for devices 804, 806 and 808. The server stores these and uploads them respectively to the servers corresponding to devices 804, 806 and 808. Server 810 registers this upload as a transaction and generates the hash h(832) at step 832. Device 802 clears its record of the hashes from devices 804, 806 and 808, and the respective transaction records, and generates the hash h(830) at step 830.

Device 802 holds the hash and encrypted record for the transaction between devices 806 and 808, which resulted in the hash h(820) at step 820 and h(808). In this example h(808) is used to refer to the hash for device 808 generated for that transaction here as it is not known how many off-line transactions have occurred.

The server 810 will reconcile the off-line records that it receives from device 802, with those that it receives from devices 804, 806 and 808, and any other server that contains those transactions. Server 810 will know which servers it will receive records from as these will correspond to the servers that it sent records to for the transactions that involved device 802. Device 802 will not expect to receive records from device 808, as device 802 did not transact with device 808. If devices 804 or 806 transacted with off-line devices attached to other servers, then server 810 may receive additional records from those other servers.

The server 810 will use the time and date stamps on the transaction records and the signatures to order and number those transactions, and mark them as off-line transactions.

The off-line mode presents several variations. The first is to do without the intermediate off-line hashes, and simply use the hashes for each device's previous transaction. This will work just as well, though it loses a layer of certainty. The second is to generate device hashes only for off-line transactions. This simplifies the on-line transactions slightly, but again loses a layer of certainty. The third variation is not to sign the records for off-line transactions with a specific off-line public key, but to simply sign every record with the device's key. Both the server and the device will know which transactions are on-line and which are off-line, as these will be recorded in the account audit trail. However, by running a separate key and series of transaction numbers for the device, it becomes trivial to show the off-line versus on-line transactions.

A fourth variation is for each server, when it receives records of off-line transactions from its connected devices, to notify all of the servers to which those records apply to expect records from those servers. For example, in the off-line diagram shown in FIG. 8, it is assumed that device 804 connected to its server later, and that device 806 transacted with another device (not shown). Once device 804 connects with its server, that server will send the records pertaining to device 802 to server 810. Device 804 did not transact off-line with any other device and holds no off-line records for any other device. Server 810, on the other hand, sends its records for device 804 to the server corresponding to device 804, and notifies that server that it can expect to receive copies of the same records from device 806 (device 802 passed these on to device 806 during the transaction at steps 826 and 828). Likewise, once device 806 connects to its server, that server will send its records for device 802 to server 810, for device 804, to the server corresponding to device 804, for device 808, to the server corresponding to device 808, and for the other device to its respective server. It will also inform both the servers corresponding to device 802 (server 810) and 804 to expect records from the server corresponding to the other device.

Using a hash chain does not impose an ever increasing burden on Tereon. An action will rarely involve more than two parties, and where it does, then that action will usually be a one-to-many transfer, which itself will simply be a collection of one-to-one transfers. A many-to-one transfer will also usually be a series of one-to-one transfers, which is simply a collection of two-party actions.

Amending Records

If a user amends a record, then Tereon will not overwrite the original record. Instead, Tereon will simply create a new record that contains the amended record, and this will be the version that Tereon refers to until such time as that record is amended again; the amendment is an action. This is what will happen with all financial and transaction records, where the result of a transaction, such as a payment, effectively amends the result of the previous transaction; it will also occur where an operator uses a subset of Tereon to manage other record types, such as emails, medical records, and so on. By doing this, Tereon will retain a copy of each version of a record.

There may be circumstances where a court of law, or the general operation of law, requires an operator to expunge a record entirely, or to amend the original record. In these circumstances, Tereon will delete or amend the contents of the original record, and perhaps the contents of the associated records. Tereon can achieve this without rendering the subsequent hashes invalid.

If Tereon must delete or amend a historical record, then it will:

- regenerate the hash of that record to confirm that the record has not been amended or changed before Tereon deleted or amends the record, and record that regenerated hash
- record in a new field in the original record that the contents of the record were deleted or amended, and the reasons for the deletion or amendment
- delete or amend the relevant fields in the record, and add the date and time of that deletion or amendment
- generate a new hash for that record; and
- record the new hash.

By following this procedure, Tereon will not need to amend the hash chain in any way. All of the hashes for valid records that were generated from the original hash of the deleted or amended record will remain valid. The system hash will include the new hash of the deleted or amended record as that deletion or amendment is an action. In this way, fraudulent activity can be easily recognised by finding any recorded hashes that do not match the recalculated hashes.

Hash Chain with Zero Knowledge Proofs

The hash chain provides an added layer that enables both sides of a transaction to prove to the other that they have hashed the records that the hashes pertain to. This is done by including a key exchange algorithm within the hash chain, which allows one party to prove to a second party (the verifier) that the hash of the record is the true hash of that record.

Any algorithm that allows two parties to negotiate a common key can be used here, and there is no need to use a zero knowledge proof. However, the PAKE (password authenticated key exchange) algorithms that use zero knowledge proofs are the most efficient to use here. Using the correct PAKE protocol and zero knowledge proof at the intermediate stage removes the need to exchange hashes, as the parties will generate the same intermediate hashes.

With an algorithm such as a PAKE algorithm that allows both sides to generate the same hash using the zero knowledge proof the parties can go further. By using a zero knowledge proof that can include and use the information that comprises the transaction to generate the 'proof', the parties can both generate an identical intermediate hash. This removes the need to swap their intermediate hashes with each other. It also means that the steps that generate the record and the information or outcome that arises from those steps become components of the hash chain process. If more than two parties are involved, then Tereon can use a group variant of a protocol and zero knowledge proof to enable all of the parties to generate a common hash.

The PAKE algorithms that enable the parties to generate the same hash will usually take two or three passes of information between the parties before they can generate the intermediate hash. If a transaction only requires two stages to complete (for example a request and an acceptance/verification), then the parties will only generate one intermediate hash. If a transaction requires three stages, and the algorithm generates a hash in two passes, then the parties will exchange four sets of information, repeating the third stage twice, and generate two hashes, the first hash after the first two steps in the transaction, then the second hash after the repeat of the third step.

An example of such a zero knowledge proof is the Schnorr NIZK Proof. This zero knowledge proof can be extended simply by adding additional information to both the information that is sent as part of the proof, and the information that is used to generate the hash that is part of the proof, as shown in the specification document for the Schnorr NIZK Proof.

Another method, such as adapting the method of generating the common key in the SPEKE (simple password exponential key exchange) protocol can also be used, and the way to do so is trivial given the above.

It is also a trivial exercise to extend key exchange protocols to enable parties to generate a common key based on the transaction data. Again, these are not illustrated here simply for the purposes of brevity.

To generate the common hash, the parties simply generate a hash of the common key. The hash will contain information that can validate the transaction information, because that information was used in the process to generate the common key, and thus the hash.

Transaction in Two Stages

An example that illustrates how this works will refer again to FIG. 5, which illustrates the dendritic nature of a hash chain that involves four accounts, 502, 504, 506 and 508. The accounts may be on the same system, or they may be on separate systems. Where the accounts reside is irrelevant. This transaction at steps 512 and 514 takes two stages.

Two Pass PAKE

In the first pass at step 512, account 502 takes h(510), the previous hash for this account generated at step 510, adds this to the first stage of transactional information, constructs the first zero knowledge proof, and passes this to account 504. The zero knowledge proof accompanies the information that makes up the first stage of the transactional information and the hash h(510).

In the second pass, account 504 takes h(504), the previous hash for that account, adds this to the second stage of transactional information, constructs the second zero knowledge proof, and passes this to account 502. The second zero knowledge proof accompanies the information that makes up the second stage of the transactional information and the hash h(504).

Accounts 502 and 504 now construct independently the hash h(512$_i$514$_i$), which is the intermediate hash for both accounts. Both accounts 502 and 504 add this hash to their records. Account 502 generates the hash h(512) of its record of the transaction at step 512, and account 504 generates the hash h(514) of its record of the transaction at step 514.

Three Pass PAKE

In this example, the transaction at steps 512 and 514 takes two stages, with a PAKE algorithm that allows the parties to construct a common hash after three passes.

The first pass and the second pass are performed as above. In a third pass, account 502 takes the information that account 504 sent in the second pass, constructs the third zero knowledge proof with that information, and sends this to account 504. The third zero knowledge proof also accompanies the information that makes up the second stage of the transactional information and the hash h(504).

Accounts 502 and 504 now construct independently the hash h(**512*i*514*i*). Both accounts 502 and 504 add this hash to their records. Account 502 generates the hash h(512) of its record of the transaction at step 512 and account 504 generates the hash h(514) of its record of the transaction at step 514**, as in the two pass PAKE approach.

In both cases, the chain now contains information that validates the chain of hashes in account 502 up to step 512 and for account 504 up to step 514. Both accounts 502 and 504 hold the intermediate hash h(512$_i$514$_i$), as well as their hashes for their records. The intermediate hash here, however, is subtly different to that of the intermediate hashes that were exchanged between the systems in the previous examples that do not use zero-knowledge proofs. Here the intermediate hash is the hash of the transaction between accounts 502 and 504, and so is common to both accounts 502 and 504. The hash is the hash of the transaction and was generated as part of the transaction. It is contemporaneous to the transaction. Hash h(512) is account 502's hash of its record of the transaction, which will include information that is private to it, while account 504's hash, h(514), is its hash of its record of the transaction. Thus accounts 502 and 504 can prove both the actual steps in the transaction between them, and their records of that transaction.

Transaction in Three Stages

As another example using FIG. 5, suppose that the transaction at steps 528 and 530 involves three separate stages rather than two.

Two Pass PAKE

In the first pass, account 502 takes h(522), the previous hash for this account generated at step 522, adds this to the first stage of transactional information, constructs the first zero knowledge proof, and passes this to account 506. The zero knowledge proof accompanies the information that makes up the first stage of the transactional information and the hash h(522).

In the second pass, account 506 takes h(524), the previous hash for that account generated at step 524, adds this to the second stage of transactional information, constructs the second zero knowledge proof, and passes this to account 502. The second zero knowledge proof accompanies the information that makes up the second stage of the transactional information and the hash h(524).

Accounts 502 and 506 can now construct independently the hash h(528$_i$530$_i$), as the PAKE algorithm allows the parties to construct a common hash after two passes. However, the transaction still has a third stage to perform.

In this example, the system simply runs through a second set of passes with the PAKE algorithm, beginning with the third stage of the transaction. The second pass of this second set of passes could simply use random data. Alternatively, it could repeat the last stage, which is similar to using a three pass PAKE with a two-stage transaction.

In the latter case, a third pass (the first pass of the new PAKE algorithm) is performed, where account 502 takes h(528$_i$530$_i$), which it has signed, adds this to the third stage of transactional information, constructs the third zero knowledge proof with the information, and sends this to account 506. A fourth pass (the second pass of new PAKE algorithm) is performed, where account 506 takes h(528$_i$530$_i$), which it has signed, adds this to the third stage of transactional information that account 502 sent, constructs the fourth zero knowledge proof with the information, and sends this to account 502. Accounts 502 and 506 can now construct independently the hash h(528$_{i2}$530$_{i2}$). This is the second common hash generated in this transaction, and is now the hash of the transaction between accounts 502 and 506 as it contains all three stages of the transaction. Both accounts 502 and 506 add this hash to their records. Account 502 generates the hash h(528) of its record of the transaction at step 528 and account 506 generates the hash h(530) of its record of the transaction at step 530.

This procedure is carried out for further transactions between accounts 502, 504, 506 and 508 in order to generate hashes for each transaction in exactly the same way as set out above.

Three Pass PAKE

The first pass and the second pass are performed as above. In the third pass, account 502 constructs the third zero knowledge proof with the information that makes up the third stage of the transactional information, and sends this to account 506. The zero knowledge proof accompanies the information that make up the third stage of the transactional information.

Accounts 502 and 506 now construct independently the hash h(528$_i$530$_i$). Both accounts 502 and 506 add this hash to their records. Account 502 generates the hash h(528) of its record of the transaction at step 528 and account 506 generates the hash h(530) of its record of the transaction at step 530.

In the above examples relating to FIG. 5, where the system uses zero knowledge proofs to generate the intermediate or transaction hashes, the hash h(530) contains information that validates all of account 502's hashes to h($\mathbf{528}_i$), all of account 504's hashes to h($\mathbf{526}_i$), all of account 508's hashes up to the account 508's intermediate or transaction hash that was created when account 506 created h(524), and all of account 506's hashes to h(530). However, though it validates all of the hashes in its transaction network, account 506 only holds the transaction records for the transactions that it has entered into with other accounts, systems, or servers. It knows nothing about the content of the transactional records for the transactions between accounts 502 and 504, even though its hash contains information that account 502 or account 504 could use to verify the hashes for those transactions.

What is important is that the algorithm that both parties use to generate independently the same intermediate hash uses the steps that the parties exchange to give effect to the transaction. Thus, the transaction that generates the record becomes a component of the hash chain process, and the process that generates the hash chain entry is the same as the process that gives effect to the transaction. Another way of looking at it is that the transaction generates the hash as part of the transaction, and that hash and its accompanying information become the audit of the transaction. They become one and the same. With the blockchain, the initiator of a transaction completes the transaction and sends its record to blockchain for later auditing, which adds another step to the process, instead of being integrated in the transaction.

As the transaction itself becomes a contemporaneous component of the audit trail that the hash chain provides, it becomes impossible to have a transaction whose details are not captured and validated by the audit trail. Most audit trails are 'after the event' in that the completed transaction record is passed to the audit system usually after the transaction completes. In those circumstances, there is a possibility that the record received by the audit is not the same as the record that was generated by the transaction. Thus, computer records are usually regarded as hearsay. Integrating a zero knowledge proof with the correct PAKE or similar protocol means that the audit trail is generated by the transaction, and that the transaction and its records become part of the audit trail. This has profound implications for real-time transactions, as they are now audited and thus reported in real-time.

The process of constructing the hash using zero knowledge proofs can apply to any of the scenarios that generate hashes in the hash chain. It can be used for system hashes, license server hashes, and even the off-line hashes represented by FIG. 8. All that matters is that the hash involves a transaction between two or more entities, regardless of whether those entities are parties, devices, or systems. The process does not exclude using standard hashes either. Thus one system might use the hashes generated with zero knowledge proofs for transactions between accounts, regardless of whether devices are on or off-line, but use the standard hashes for system hashes and licensing hashes. A second system might use zero knowledge proofs for all hashes, while a third system might use standard hashes only.

Multiple Pass PAKEs with Multiple Transaction Stages

Though the examples above are of how to use transactions that involve two or three stages with PAKEs that require two or three passes to enable both sides of a transaction to create a common key, the system is not restricted to those examples. The reality is that the same method will work for a system to support transactions that involve a plurality of stages to use PAKEs that require a different plurality of passes. The system simply uses however many PAKEs runs it requires to cover all of the stages of a transaction. It repeats the final stage any number of times to generate the required PAKE passes to generate the final common key, and so generate the transaction hash.

System Hash Chain with Zero Knowledge Proofs

Returning to FIG. 6, a hash chain that can use both hashes generated with zero knowledge proofs and classic hashes is shown. The figure shows two accounts 602 and 604, on the same system 606, together with the system hashes, h(606), h(608), h(612), etc. The system creates a new hash of a record for every action that results in a record, irrespective of where that record resides. The transactions between the accounts would use zero knowledge proofs to generate the intermediate or transaction hashes for each of the accounts, as set out above. The system hash would comprise the system's hash of each record as it generates that record.

Suppose that the transaction between accounts 602 and 604 at steps 614 and 616 involves three separate stages, with a PAKE algorithm that allows the parties to construct a common hash after three passes.

In the first step of the transaction, account 602 exchanges the hash, h(610), which is the hash of its previous record, with the system account 606 for the system hash h(608) generated at step 608. It adds this system hash and its hash h(610) to the first stage of transactional information generated at step 610, constructs the first zero knowledge proof, and passes this to account 604. The zero knowledge proof accompanies the information that makes up the first stage of the transactional information, the hash h(610), and the hash h(608).

In the second step of the transaction, account 604 exchanges the hash, h(604), with the system account for the system hash h(608) generated at step 608. It adds this system hash and its hash h(604), which is the hash of its previous record to the first stage of transactional information, constructs the second zero knowledge proof, and passes this to 602. The zero knowledge proof accompanies the information that makes up the second stage of the transactional information, the hash h(604), and the hash h(608).

In the third step of the transaction, system account 606 adds h(610) and h(604) to its record and generates an intermediate system hash h($\mathbf{612}_i$).

In the fourth step account 602 constructs the third zero knowledge proof with the information that make up the third stage of the transactional information, and sends this to account 604. The third zero knowledge proof accompanies the information that makes up the third stage of the transactional information.

In the fifth step, accounts 602 and 604 construct independently the hash h($\mathbf{614}_i\mathbf{616}_i$). Both accounts 602 and 604 add this hash to their records. Hash h($\mathbf{614}_i\mathbf{616}_i$) is the hash of the transaction.

In the sixth step account 602 exchanges h($\mathbf{614}_i\mathbf{616}_i$) with system account 606 for h($\mathbf{612}_i$), adds h($\mathbf{612}_i$) to its records, and generates the hash h(614) of its record of the transaction at step 614. Account 604 exchanges h($\mathbf{614}_i\mathbf{616}_i$) with system account 606 for h($\mathbf{612}_i$), adds h($\mathbf{612}_i$) to its records, and generates the hash h(616) of its record of the transaction at step 616, and system account 606 adds the two copies of h($\mathbf{614}_i\mathbf{616}_i$) to its record, and generates the new system hash h(612) at step 612.

Account 602's record for the transaction at step 614 contains the hash h(610), the hash h(604), the system hash h(608), the transaction hash h($614_i 616_i$), the intermediate system hash h($612_i$), the three stages of the transactional information, its record of the transaction, the account ID, and the hash h(614).

Account 604's record of the transaction at step 616 contains the hash h(610), the hash h(604), the system hash h(608), the transaction hash h($614_i 616_i$), the intermediate system hash h($612_i$), the three stages of the transactional information, its record of the transaction, the account ID, and the hash h(616).

(Account 602's records of the transaction will differ from that of account 604's, as each began and ended the transaction in different states, and each is a different account with different account details and IDs.)

The system hash h(612) contains hashes of both sides of each individual transaction, as well as the transaction as a whole, thus strengthening the hash chain considerably.

If Tereon manages a transaction between accounts on a different system, then the process is slightly different, as here, each system will exchange its system hash and intermediate system hash with the account that it manages. Otherwise, the method described above in relation to FIG. 6 is the same except that, instead of having accounts 602 and 604 and system 606, the figure would show system 606 with associated account 602, and a second system 605 with associated account 604. With the transaction that will take place at steps 614 and 616, the system hashes that will result will represent the system transaction at step 612 and the equivalent transaction on the second system 605 corresponding to account 604. In reality, in a system that contains several accounts that can transact concurrently, the system will generate hashes for each interaction that generates a record.

Figure 6A:
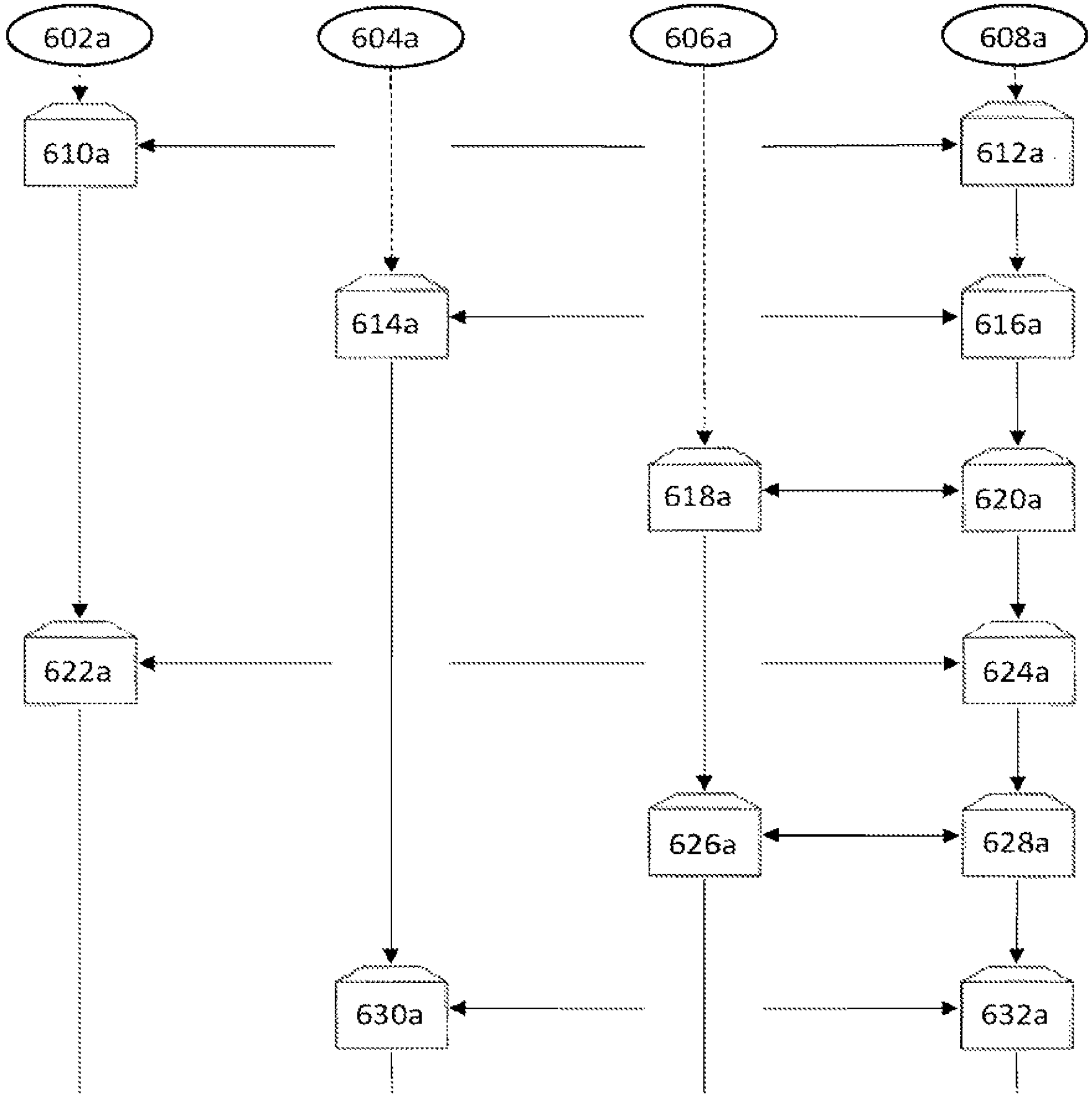
FIG. 6*a* illustrates a hash chain that involves three accounts on the same system where the transaction stages interleave.

Though FIG. 6 shows sequential hashes and intermediate hashes the reality will be different. FIG. 6*a* shows three accounts, 602*a*, 604*a*, and 606*a*, all of which are interacting with accounts on outside servers, together with the system account 608*a*. The stages of the transactions interleave to illustrate what can occur when transactions take place concurrently on a system. For simplicity, these are all shown on the same server.

In the above examples, at step 612*a* account 602*a* will swap its hash h(602*a*) with the system 608*a* to get h(612*a*). The system 608*a* will now generate what the above examples show as the intermediate hash h($616a_i$). This subscript "i" is used for clarity to indicate that each transaction would involve three system hashes, the original hash before the transaction, a system hash during a particular stage of a transaction (the intermediate hash), and the system hash at the end of the transaction. The subscript "i" indicated the intermediate hash. The final system hash would be h(616*a*) with the above reasoning. With multiple concurrent or interleaved transactions, this labelling no longer makes it clear what is going on. Instead, each system hash, regardless of whether or not it is generated during or after a transaction, is a system hash, albeit an increment on the previous hash. If the three transactions take place so that account 602*a* starts, then account 604*a* starts, account 606*a* starts, account 602*a* finishes, and that account 606*a* finishes before account 604*a* finishes, the order of hashes might look something like the following, provided that no other transactions or actions took place on these or any other accounts on the server, and the diagram, as a result, is subtly different from the previous figures.

Account 602*a* will swap its hash h(610*a*) with the system to get h(612*a*). The system now uses that hash h(610*a*) to generate the next system hash h(616*a*) (this would have originally been labelled h($628a_i$), as hash h(628*a*) is the final system hash for that transaction once the transaction for account 602*a* completes).

Account 604*a* will swap its hash h(614*a*) with the system to get h(616*a*). The system now uses that hash h(614*a*) to generate the next system hash h(620*a*).

Account 606*a* will swap its hash h(618*a*) with the system to get h(620*a*). The system now uses that hash h(618*a*) to generate the next system hash h(624*a*).

Once account 602*a* has created its intermediate or transaction hash, it will swap that hash h(622*a*) for the system hash h(624*a*). The system now uses that hash h(622*a*) to generate the next system hash h(628*a*).

Once account 606*a* has created its intermediate or transaction hash, it will swap that hash h(626*a*) for the system hash h(628*a*). The system now uses that hash h(626*a*) to generate the next system hash h(632*a*).

Once account 604*a* has created its intermediate or transaction hash, it will swap that hash h(630*a*) for the system hash h(632*a*). The system now uses that hash h(630*a*) to generate the next system hash h(636*a*) (not shown).

The hash chain enables a system to process a transaction, audit that transaction, and authenticate the data transmitted or generated by that transaction at the same time. These steps now become contemporaneous.

There is no need to assume that a device honestly reports a transaction to an audit system. The transaction creates the audit and the audit creates the transaction.

This changes both the nature of a transaction carried out by a programmed device. Any programmed device, including an IoT device can now validate and rely on transactions and data transmitted between it and any other device, as the transaction, and its audit and authentication are contemporaneous.

There is no need to assume that a device will send an accurate record of the transaction to an audit system, as that transaction and the audit are generated as part of the same process, and this contemporaneous nature changes the quality of the evidential value of that audit trail. Each device can rely on the information transmitted by the other without making assumptions as to the honesty of that other device. The data transmitted and received is the data that is transacted and the data that is authenticated and audited.

When combined with the look-up service, devices that have not interacted before can now authenticate each other, determine the services or functions that each performs, and then communicate between each other and rely on that communication to carry our tasks as programmed, without requiring any human intervention to do so.

The hash chain allows programmed devices, including IoT devices to operate both on-line and off-line. If when off-line the devices include time stamps, information on that device's clock skew, the device's unique transaction ID (generated, for example by an internal monotonic counter) and other synchronization information in the transactional information, then they enable their servers to reconstruct accurate timelines that preserve the causality for each transaction when those servers finally receive records of the off-line transactions from the devices or from third party servers. The hash chain, both in its on-line and in off-line modes, allows the servers to rely on the content of the transactional records.

When combined with the communications security model that protect inter-device communications, the devices and the servers can communicate in a manner that is impervious to man-in-the-middle attacks. Tereon enables IoT and other programmed devices to communicate securely and to rely on the data transmitted between those devices.

One such example might be a network of IoT and other programmed devices that operate as a set of industrial sensors and controls. The security model allows these devices to communicate amongst themselves securely, and by using the look-up directory service, enables those devices to interact with new devices as these are added to the original collection. Tereon removes the need to reconfigure the devices to enable them to recognize new devices and to trust those new devices. The hash-chain enables the devices to trust the content and timings of the communications between them, and allows the operator to be able to rely on the data generated and transmitted, without needing any human evaluation as to the veracity of the data as transmitted. A third party cannot interfere with that data, whose audit and authentication chains are contemporaneous with its transmission.

The look-up service, when combined with the security model and the look-up service, enables devices to create ad hoc interconnections that they can trust and authenticate without any need for human intervention. Once a device is authorised and its details added to the look-up service, other devices can connect to that device as the need to do so arises. If that device is compromised in any way, then all access to it can be disabled via that same look-up service.

The system provides an additional benefit that arises from its hash chain and its look-up service. As all devices are individually authorised and audited, the system can instruct particular devices to download updates to those devices' software as the need arises, the devices can do so only from secure, trusted sources. The look-up service will detail the services, interfaces, and data formats (for example) that a particular device offers and uses. Thus if a device wishes to connect to another device to access a particular survive and does not have the necessary software to support the required interface or format, then either it or the device that it is connecting, or both devices if necessary, can communicate with a system server to download the necessary software or configuration to enable the two devices to communicate with each other. Whether the devices retain the software after the inter-device communication finishes will be determined by the services that the device or devices perform, and the capacity of those devices. The hash-chain means that even if they remove that software (they may reinstall it when they come to communicate again), the two devices will retain a complete audit and record of the inter-device communications that they can later upload to another device or server if necessary. This facility extends to any type of device, from a fully autonomous IoT device through to any other device as programmed, such as a payments device.

Distributed Records of the Hash Chain

To provide a distributed replication of the entire hash chain, the Tereon systems may upload their hash chains to a central set of servers, such as the license server, look-up servers or some other set of servers, for all transactions that occurred between the last connection to that server and the current connection. The same Tereon system can then download the corresponding hash chains for the other Tereon systems. This provides a distributed ledger of the hash chains for all transactions for all Tereon systems, but without the overhead of needing to recalculate each hash chain for each transaction. It does, however, impose an additional storage burden on the Tereon systems. The central servers can be global, such as those for the license and look-up servers, or they can be specific to an industry, regions, or some other constraint. By constraining the reach of the copies of the hash chains, the computational and storage burden of this variation can be reduced.

Instead of limiting the reach of the central servers, the systems that can download the hash chains that were uploaded by other systems can be limited. Thus, the hash chains from a bank may only be downloadable by another bank, constrained by whether that bank in in the same region as the uploading bank, or whether it has transacted with that other bank. Similarly, a hospital's system may only download the hash chains that were uploaded by a hospital in the same region. The flexibility is unconstrained.

The hash chain used in Tereon has a property that is invaluable. It provides local ledgers but with distributed authentication. It keeps the transactional information private to the users and services involved in the transaction, but it distributes the authentication provided by the hashes across all servers, services, and devices. The hashes generated with the zero knowledge proofs illustrate this. Only the systems involved in a particular transaction hold the transactional information. However, all of the systems and devices that then interact with those systems generate hashes that contain information about those systems' earlier hashes.

The distributed authentication is key as it provides a computationally impossible barrier to a potential fraudster who wishes to hide a tampered record.

With the blockchain, the fraudster only has to control between 25 to 33% of the servers to hide a tampered record and change the blockchain to record the tamper as a valid record. Once done, the process is virtually impossible to reverse.

With the Tereon hash chain, a fraudster would need to control every Tereon server, every Tereon service, and every Tereon device, and recalculate every hash in the chain on every one of those servers and devices. This is computationally infeasible.

The hash chain will deliver at least the same level of financial savings and economic efficiencies that the blockchain's proponents are predicting for the latter. The difference is that the Tereon hash chain is actually capable of doing so; the blockchain, due to its design and the limitations inherent in that design, just cannot do so.

The advantage of this system is that a fraudster will be unable to delete or amend a record from a database without also recalculating all of the hashes, and the linked hashes associated with that record. Though this might theoretically be possible if Tereon operates on a single server without any system hashes and without any connection to a license server, if any of the linked chains involves a transaction with a party on another server or device, then the fraudster will also need to recalculate all of the hashes on the other server or device. The difficulty of doing so increases exponentially with each additional server or device that interacts with the hash chain after the date and time of the original record.

The hash chain enables an organization to be able to guarantee the veracity of data collected, generated, or managed by any device, to guarantee the original content and integrity of a record, and to guarantee the integrity and content of any transaction that was based on an earlier record. This can apply to any device or transaction, from a payment device, through to a medical device, a traffic sensor, a weather sensor, a water flow detector, etc.

This has clear governance benefits as each local ledger is the responsibility of each individual organization, yet they learn from and lean on those of other organizations in a way that provides shared strength with clearly delineated responsibility and accountability. The hash chain creates a technical tool to enforce and support information and transaction governance.

Furthermore, when the hash chain is used as a component of a payments system, as Tereon processes fiat money, its architecture is aligned with the way that payments work today and it delivers benefits that equate or are superior to cryptocurrencies like Bitcoin. It offers established payment service providers and central banks a 'Bitcoin beater'.

The hash chains are a particularly exciting part of the Tereon system since they enable the very fast authentication that is very secure.

One of Tereon's unique capabilities is its ability to create comprehensive, real-time logs and audit trails. Tereon transaction records contain every keystroke (apart from the actual authentication credentials, such as a PIN and password) that a transaction requires, together with all of the data and metadata relating to that transaction for as long as they are required to meet regulatory and business requirements. It is important to render those records tamper evident, and the sequence of transactions up to and after the transaction in question tamper-evident, when they are stored across multiple service providers.

The blockchain cannot do this. It can only accept a record of a transaction after that record has been generated, but before it is authorised. The blockchain accretes a number of records, creates a block and then adds that to the blockchain. It relies on the fact that the blockchain contains blocks that themselves contain information pertaining to all previous transactions. As the blockchain adds additional blocks, so it relies on the existence of these blocks to validate the records and all previous records within the blockchain. This causes scaling issues as file sizes grow and, if there is an inconsistency, the whole branch loses authentication.

Rather than use the blockchain, or a derivative of it, Tereon's hash chain uses a hashing strategy that isolates any suspect record for investigation without undermining the authentication of subsequent transactions. It also avoids the scaling problem by having a design that is tailored for any record type, whether for static records or for real-time transactions.

The hashes, including the intermediate hashes, can provide the information necessary for an administrator to traverse the hash chain quickly to ascertain and verify hashes and their respective records. So too can the records themselves.

If any transaction or action takes place, then that means that the previous hashes were reconciled and thus the user and system can trust the output of the new transaction. Thus Tereon can trust the running totals in each account before it carries out a transaction. The validity of the hash chain confirms that the running totals are correct.

It is this ability to isolate the effect of an amended, deleted, or tampered record that sets the hash chain apart from the blockchain and its derivatives. By definition, any amended or tampered record that is successfully hidden in the blockchain will effect an entire recalculation of that blockchain. There is no method to detect and amend a tampered or false record other than by a democratic decision of the entire blockchain community as every blockchain must be amended. It was this feature that was identified by security researchers as a major flaw within the design of the blockchain. That design cannot be changed.

With the hash chain, a tampered record cannot affect the remainder of the hash chain unless the attacker is able to recalculate all of the subsequent hashes. As the hashes prior to any tampering were, and remain, valid, any transaction based on those hashes and the values related to those hashes will remain valid.

The dendritic hash chain for off-line transactions means that a server can register off-line transactions carried out by an off-line device even if that device gets lost or damaged before it can reconnect to the server.

The hash chain provides full support to validate off-line transactions, which is something that the blockchain and its derivatives just cannot achieve. The nodes that operate their copies of the blockchain must be on-line to validate the blocks. Though a bitcoin wallet can create a transaction off-line, it cannot validate that transaction until it goes on-line and pushes the record of that transaction to the nodes. Even then the transaction is not validated until one of the nodes wins the competition to generate the next block in the blockchain and adds the record to that block.

Directory Service

Existing systems, such as transportation systems, payment networks such as EMV (Europay, MasterCard, Visa), and other legacy systems use a hub and spoke architecture such that all transactions go through a central utility that represents a potential single point of failure or vulnerability and which is expensive to scale.

The Tereon system is peer-to-peer, where one server communicates directly with another, which is why the hash chains for security are so important, since the hash chain verification occurs across all elements of the peer-to-peer network.

As discussed, the Tereon system has a directory service 216 that is a directory of the credentials and information in the system that identify which server a user or a device 218 is registered to, or which server offers a particular service or function, and enables multiple methods of authentication of a user 218 to take place, since it stores a number of different types of credentials relating to a particular user. For example, a user 218 may be authenticated using their mobile number, email address, geographic location, PANs (primary account numbers), etc. and caches everything so it is not necessary to authenticate each time.

The directory service 216 provides a layer of abstraction that separates the user's authentication ID from the underlying services, servers, and actual user accounts. This provides abstraction between the credentials that a user 218 or merchant may use to access a service and the information that Tereon requires to perform the service itself. For example, in a payments service the directory service 216 would link an authentication ID, such as a mobile number, and perhaps a currency code with a server address. There is absolutely no way to determine whether the user 218 has a bank account, or what bank that user 218 banks with.

The directory service 216 acts as an intermediary between various services such that service providers are not able to see one another and thus the security of user data is provided. Each service will define a set of fields (variables) and values that are specific to that service. However, each service will have a specific field and value that identifies the service.

When a transaction is to be completed with a party that is not known by it, a Tereon server associated with a user 218 sends a URN (uniform resource name) to the directory service 216, which returns an IP address for the Tereon server of the payment service provider for a service that is requested by the user 218. This allows the transaction to be completed directly between the user 218 and the service provider on a peer-to-peer basis. Additionally, the Tereon server retains the IP address in cache so that any subsequent transactions do not need to use the directory service 216.

This abstraction provides security and privacy for the users and their service details, the flexibility to add and amend underlying services without affecting the public user credentials, and the ability to segment and support multiple services, each of which can be kept isolated from the others if required. None of the fields in the data service contain data necessary to initiate a transaction, and no user data, other than the user's authentication ID is stored in the directory service 216.

The Tereon directory service 216 is, however, much more than this. It supports multiple credentials. Thus a user 218 can use any number of credentials as a payment ID. Examples include mobile phone numbers, PANs, email addresses, etc. As long as the credential is unique, Tereon will support it.

The directory service 216 can support multiple services. This is where the concept of a multifaceted credential—or 'psychic paper'—comes into being. When a service provider checks a credential on the directory service 216 it can only see whether that credential is registered for its service, and the Tereon server that services that credential. The service provider cannot see any details of any other service that the user 218 might be entitled to or registered for.

For example, a mobile phone or card could become a library card credential in a library, a transport ticket on a bus or train, a secure key to access a room or facility, an in-house payment device in a firm's canteen, a theatre ticket, and a standard payment device in a supermarket. It could also become a driving license, a health care card, or an ID card to prove entitlement to a service, which could bring up photo ID on the merchant's device if the service required that, etc. There are few, if any, limits to the type of credential that a device can become.

Though it would be difficult to disguise the original external appearance of a card (this could be done once cards incorporate OLED covers or colour e-paper covers, for example, where the service could instruct the card to display the get-up and information that a particular credential or service requires), the appearance of the phone applications is changed by Tereon to reflect the nature of the credential and service.

A reverse look-up function can be implemented for each server. That function will allow a server to check whether the server communicating with it is licensed and authenticated. That function is not needed as every communication between Tereon devices, be they cards, terminal, mobiles, or servers, must be signed. There may, however, be circumstances where an operator needs or wants the added security that a reverse look-up will bring.

Here the directory service 216 will contain a number of fields, such as service, Tereon server domain address, Tereon server number, Tereon server operator, time to live, terminal authentication ID, etc. The service tag here will refer to the server reverse look-up, rather than a transaction service.

Figure 9:
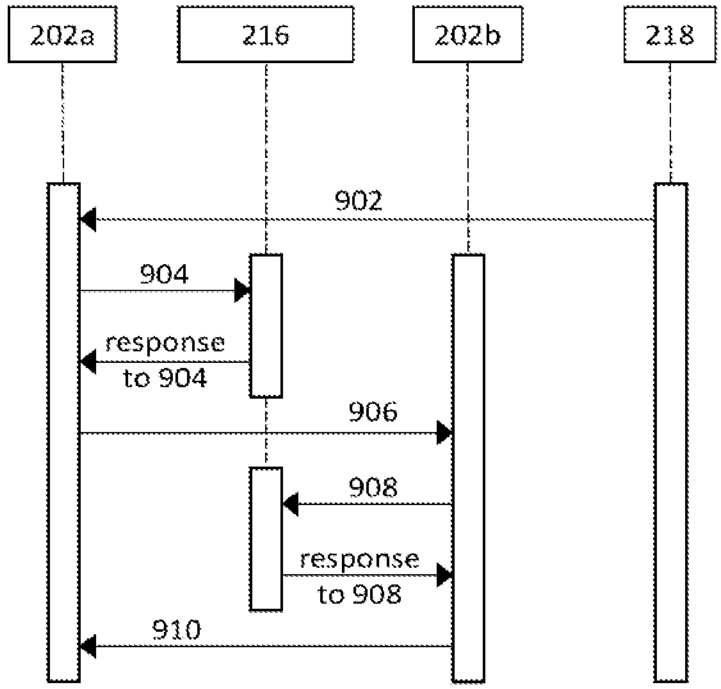
FIG. 9 illustrates a reverse look-up function implemented for two servers.

FIG. 9 shows an example with two servers, server 202*a* and server 202*b*. A user 218, is registered with server 202*b*, and accesses a service via a terminal that is connected to server 202*a*.

At step 902, a user 218 identifies himself to the terminal with his own device, which automatically identifies itself to the terminal. The terminal also passes its identification to the user's device if he uses a smart device. (If the user 218 uses a card, then the terminal could only pass its identification to the user's device if that device is a micro-processor card. In this case, the card would communicate with server 202*b*, the server to which he is registered, via an encrypted tunnel through the terminal to pass the terminal's ID to server 202*b*.)

At step 904, server 202*a* takes the identification provided by the user's device and checks that ID against the list that it maintains. It does not hold that ID and so has never dealt with the user 218 before. Server 202*a* now contacts the directory service 216. The directory service 216 checks the signature on server 202*a*'s communication and sees that it is valid. The directory service 216 looks up the ID against the service tag for the requested service (server 202*a*'s signature confirms that the server is authorised to make a request for that service) and responds with the information that identifies server 202*b*, together with the cache time to live information.

At step 906, server 202*a* now contacts server 202*b* to confirm that the user's device is registered with server 202*b* for the service. Server 202*a* also passes on the terminal's ID to server 202*b*.

At step 908, server 202*b*, if it has not already done so, can make a similar request to the directory service 216 to look up the server to which the terminal is registered. It can also confirm that the terminal is registered for the requested service with server 202*a*. The directory service 216 responds with the information that identifies server 202*a*, together with the cache time to live information.

At step 910, server 202*a* and server 202*b* now communicate directly with each other in order to carry out the required transaction. This can be anything from making a payment to opening a door.

The Tereon servers themselves contain the information necessary to initiate a transaction, and they will only communicate with other licensed and authenticated servers or devices.

Once the servers have communicated with the directory service 216 and with each other, they will cache the data until the data expires in their own mini directory services.

Figure 10:
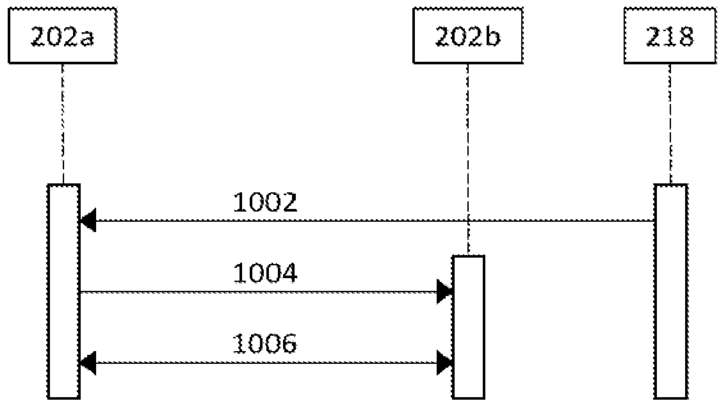
FIG. 10 illustrates the establishment of communications between Tereon servers.

In this case, the communications to establish the connection between Tereon server 202*a* and 202*b* are obvious and simple. This is shown in FIG. 10.

At step 1002, the user 218 identifies himself to the terminal connected to server 202*a* with his own device, which automatically identifies itself to the terminal. The terminal also passes its identification to the user's device if he uses a smart device.

At step 1004, server 202*a* takes the identification provided by the user's device and checks that ID against the list that it maintains. The data it holds is valid and so server 202*a* contacts server 202*b* to confirm that the device is still registered with it for the requested service. Server 202*a* also passes on the terminal's ID to server 202*b*. Server 202*b* confirms that the device is registered with it. Server 202*a*'s cache contains valid data on the terminal's ID and so it contacts server 202*b* to confirm that the terminal is still registered with it. Server 202*b* confirms this.

At step 1006, server 202*a* and server 202*b* now communicate directly with each other in order to carry out the required transaction.

Figure 11:
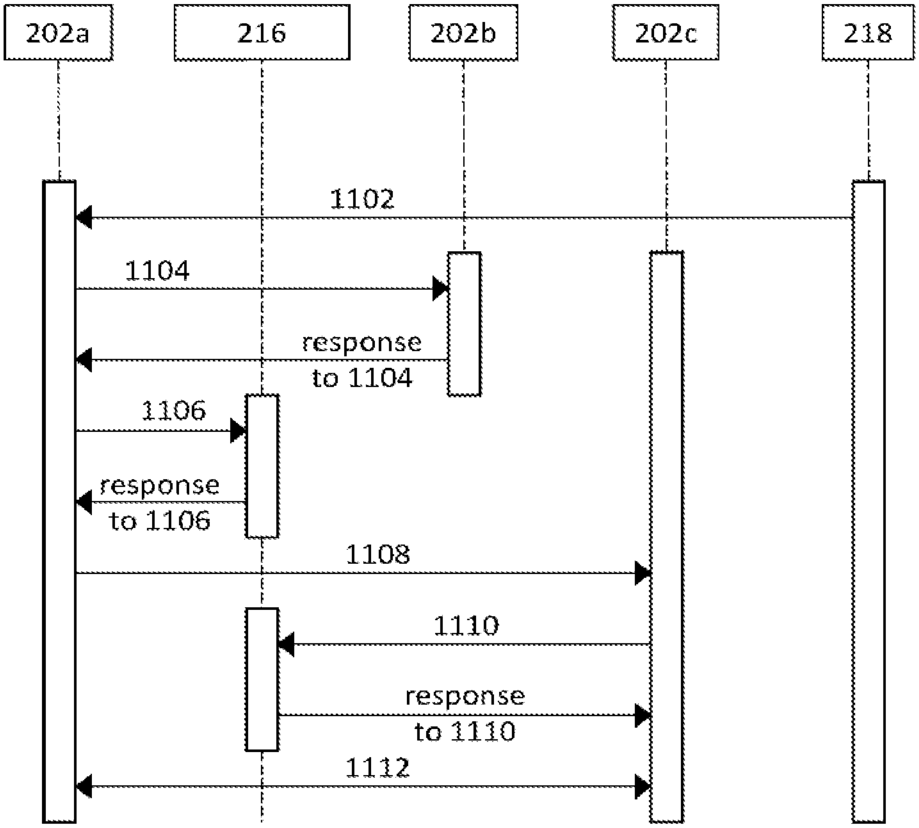
FIG. 11 illustrates communications where a user has migrated to another server.

If the cached data expires on a server, then that server simply contacts the directory service 216 as before. If a user 218 has migrated to another server then the communications differ slightly. FIG. 11 illustrates this case. The difference is that the first communication with server 202*b*, based on the now out-of-date cached information, will force server 202*a* to look-up the new data in the directory service 216.

At step 1102, the user 218 identifies himself to the terminal connected to server 202*a* with his own device, which automatically identifies itself to the terminal. The terminal also passes its identification to the user's device if he uses a smart device. Server 202*a* takes the identification provided by the user's device and checks that ID against the list that it maintains. It holds that ID and sees that the cached data shows that the ID is registered with server 202*b*.

At step 1104, server 202*a* now contacts server 202*b* to confirm that the user's device is registered with server 202*b* for the service. Server 202*a* also passes on the terminal's ID to server 202*b*. Server 202*b* responds that the ID is no longer registered with it.

At step 1106, server 202*a* now contacts the directory service 216. The directory service 216 checks the signature on server 202*a*'s communication and sees that it is valid. The directory service 216 looks up the ID against the service tag for the requested service and responds with the information that identifies server 202*c*, together with the cache time to live information.

At step 1108, server 202*a* now contacts server 202*c* to confirm that the user's device is registered with server 202*c* for the same service, which it does. Server 202*a* also passes on the terminal's ID to server 202*c*, and updates its cache with the new details for the ID from the user's device.

At step 1110, server 202*c*, if it has not already done so, can make a similar request to the directory service 216 to look up the server to which the terminal is registered. It can also confirm that the terminal is registered for the requested service with server 202*a*. The directory service 216 responds with the information that identifies server 202*a*, together with the cache time to live information.

At step 1112, server 202*a* and server 202*c* now communicate directly with each other in order to carry out the required transaction.

The directory service 216 will always retain a complete trail of the user ID's that a user 218 has registered, both old and new, together with the dates that these were assigned to the user 218.

Server 202*c* only retains the information that relates to the registered ID from the date that the ID was registered with it. Server 202*b* will retain the data relating to the period that it serviced that ID.

The abstraction layer provided by the directory service 216 goes further as it segments the services. Thus in the example above, server 202*a* can only request the information that identifies the server that has registered the user's device for the required service.

Server 202*a* must sign each communication that it makes with a device, and that signature will identify the service that the communication is involved in. If a server can offer more than one service then it will have a private key for each of those services, and it will use that key to sign the relevant communications.

The Tereon servers themselves, in the case above these are servers 202*a* and 202*b*, contain the look-up information that identifies the user's account data from the tags or information provided. Thus only server 202*b* contains the data that maps the user's device's ID to the user's account; the information in the directory service 216 is simply a pointer to server 202*b*. The user's device can easily be registered on different servers for different services. What enables the Tereon servers to find the correct server is the combination of the user's device ID and the credentials that define the service.

Once the server 202*a* communicates with server 202*b*, and passes the service tag, the user ID, and any other relevant transactional data (e.g., age, currency, amount, etc.), server 202*b* looks up the relevant user's data and performs its side of the transaction. Server 202*a* never sees the user's data. All it sees is the user's authentication ID and the transactional data passed to it by server 202*b*.

Likewise, server 202*b* never sees the information that identifies the account to which the terminal is connected. It simply sees the terminal ID and the transactional data passed to it by server 202*a*.

Psychic Paper—The Multifaceted Credential

One of the more intriguing effects of the directory service's structure it its ability to create ad hoc multifaceted credentials that are tailored to particular services, as and when those credentials are required. The services do not need to have been envisaged at the time that the directory service is created for the directory service to be able to provide those credentials. This is known as 'psychic paper'.

The ad hoc multifaceted credential means that the user's device becomes the credential that a particular service may require, and no more. It delivers exactly the information required to authenticate, authorize, or otherwise benefit from a service, and that is all that the service provider sees.

As an example, the user 218 has registered for a number of different services, such as a payments service from his bank and a library borrowing service at his local library. Because he had to provide his birthdate when he registered for Tereon, he automatically has access to an age verification service.

Figure 12:
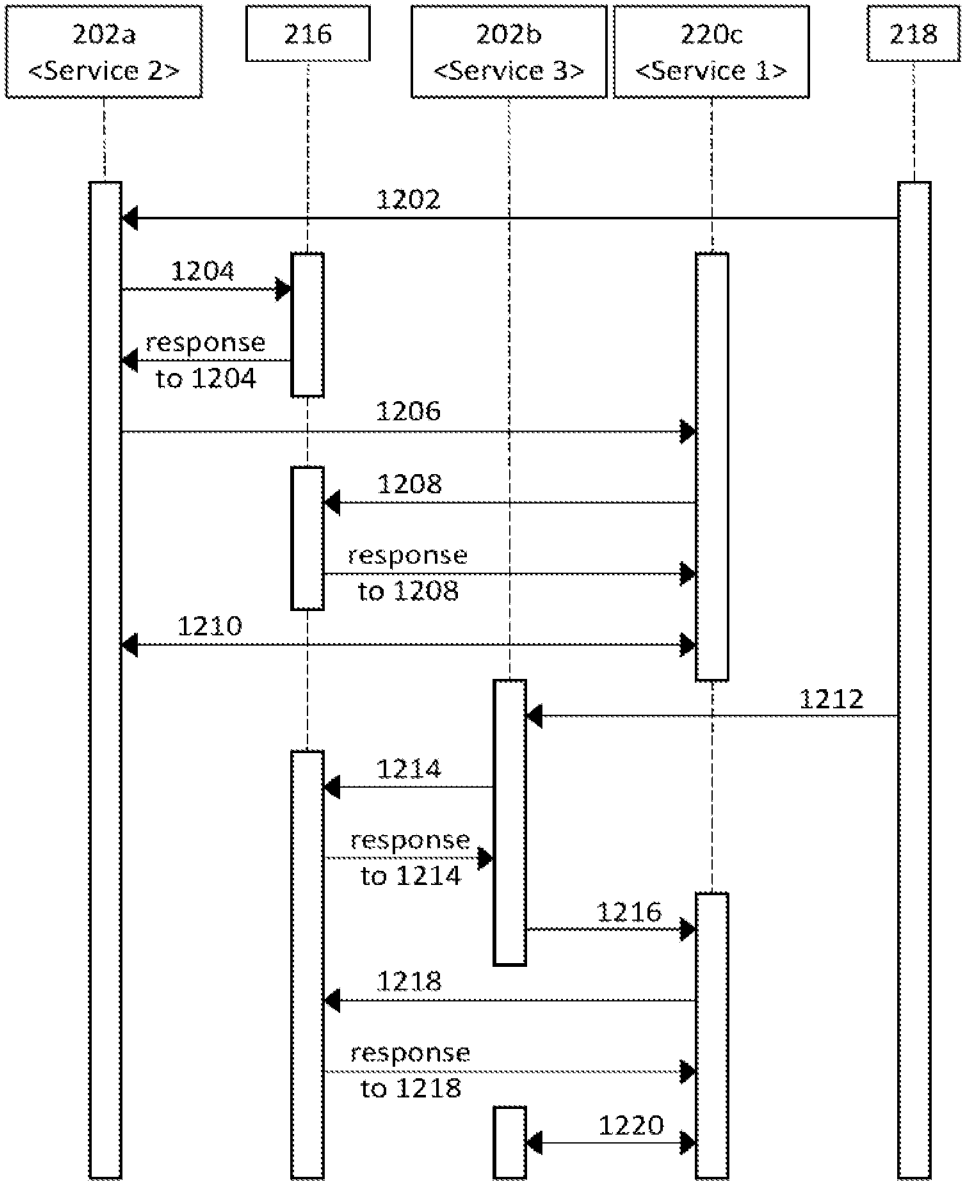
FIG. 12 illustrates how the directory service can direct a requesting server to two different servers.

FIG. 12 illustrates how the directory service 216 can direct a requesting server (server 202*a*) to two different servers (servers 202*b* and 202*c*), depending on the service that the user 218 has requested. Two or more separate directory services for separate services could also be used if necessary. What is important is that the transactional data is part of an abstract and separated from the underlying account data.

The user 218 needs to verify his age, for example to purchase an alcoholic drink at a bar (service 2). In this instance, steps 1202 to 1210 are performed as steps 902 to 910 in FIG. 9, although between servers 202*a* and 202*c*, rather than servers 202*a* and 202*b*. Accordingly, at step 1210, server 202*a* and server 202*c* communicate directly with each other. In this case server 202*a* wants to verify that the user 218 is over the age of 21. Server 202*c* simply confirms that he is over 21.

If the operator requires additional confirmation due to legal or regulatory requirements, server 202*c* could send a passport-type image of the user 218 to display on the terminal so that the operator can see that he or she is really talking to the user 218. The server could also send a question for the user 218 to answer in order to provide additional confirmation that it is the correct user, though there is little need to do so as the user 218 has already identified himself to server 202*a*. The operator never gets to see the user's actual age or any personal information that is not required, as that is not needed. All that the operator needs to know is that the user 218 is old enough to buy an alcoholic drink. If the user 218 uses his device to pay for his drink then the terminal connected to server 202*a* will contact server 202*c* again, but this time for a payment service (service 1).

The user 218 now goes to his local library and wants to borrow a book (service 3). At step 1212, the user 218 identifies himself to the terminal in the library with his own device, which automatically identifies itself to the terminal. The terminal in the library is connected to server 202*b*. The terminal also passes its identification to the user's device if he uses a smart device.

At step 1214, server 202*b* takes the identification provided by the user's device and checks that ID against the list that it maintains. It holds that ID but the cache is out of date. Server 202*b* now contacts the directory service 216. The directory service 216 checks the signature on server 202*b*'s communication and sees that it is valid. The directory service 216 looks up the ID against the service tag for the requested service and responds with the information that identifies server 202*c*, together with the cache time to live information.

At step 1216, server 202*b* now contacts server 202*c* to confirm that the user's device is registered with server 202*c* for the service, which it does. Server 202*b* also passes on the terminal's ID to server 202*c*, and updates its cache with the new details for the ID from the user's device.

At step 1218, server 202*c*, if it has not already done so, can make a similar request to the directory service 216 to look up the server to which the terminal is registered. It can also confirm that the terminal is registered for the requested service with server 202*b*. The directory service 216 responds with the credentials that identify server 202*b*.

At step 1220, server 202*b* and server 202*c* now communicate directly with each other in order to carry out the required transaction. Server 202*b* wants to know if the user 218 may borrow a book (service 3), and server 202*c* confirms that the user 218 is registered with the library service to borrow books (this is a service that the Tereon operator provides for libraries). If the user 218 needs to use his device to pay a fee to borrow a book then the terminal will contact server 202*c* again, but this time for a payment service (service 1).

Server 202*c* need not provide any service to the library. The user 218 could easily have registered with another server, say server 202*d* (not shown), in which case server 202*d* would confirm to server 202*b* that the user 218 could borrow books. What is important is that in the first case, server 202*a* only confirmed that the user 218 was over 21. It does not know that he can borrow books, and does not know that the user 218 can pay by Tereon. Likewise, server 202*b* knows that the user 218 can borrow books, but has no idea that he is over a certain age or that he can pay by Tereon.

A requesting server can also make multiple requests to separate servers if it needs to assemble a set of credentials for a particular transaction. For example, suppose that the user 218 wants to borrow a film that is age restricted. In this case the requesting server would make two separate requests, one to verify the user's age, and one to verify that he is registered to borrow films from the library. Tereon will assemble the individual, verified credentials to construct the set of credentials that the library requires.

The structure of the directory service 216 allows the servers that deliver the individual credentials to be separated. Thus a requesting server can interrogate any number of servers in order to obtain the individual credentials that it requires to construct the set of credentials necessary to ascertain whether or not it can deliver a particular service to a user 218.

Figure 13:
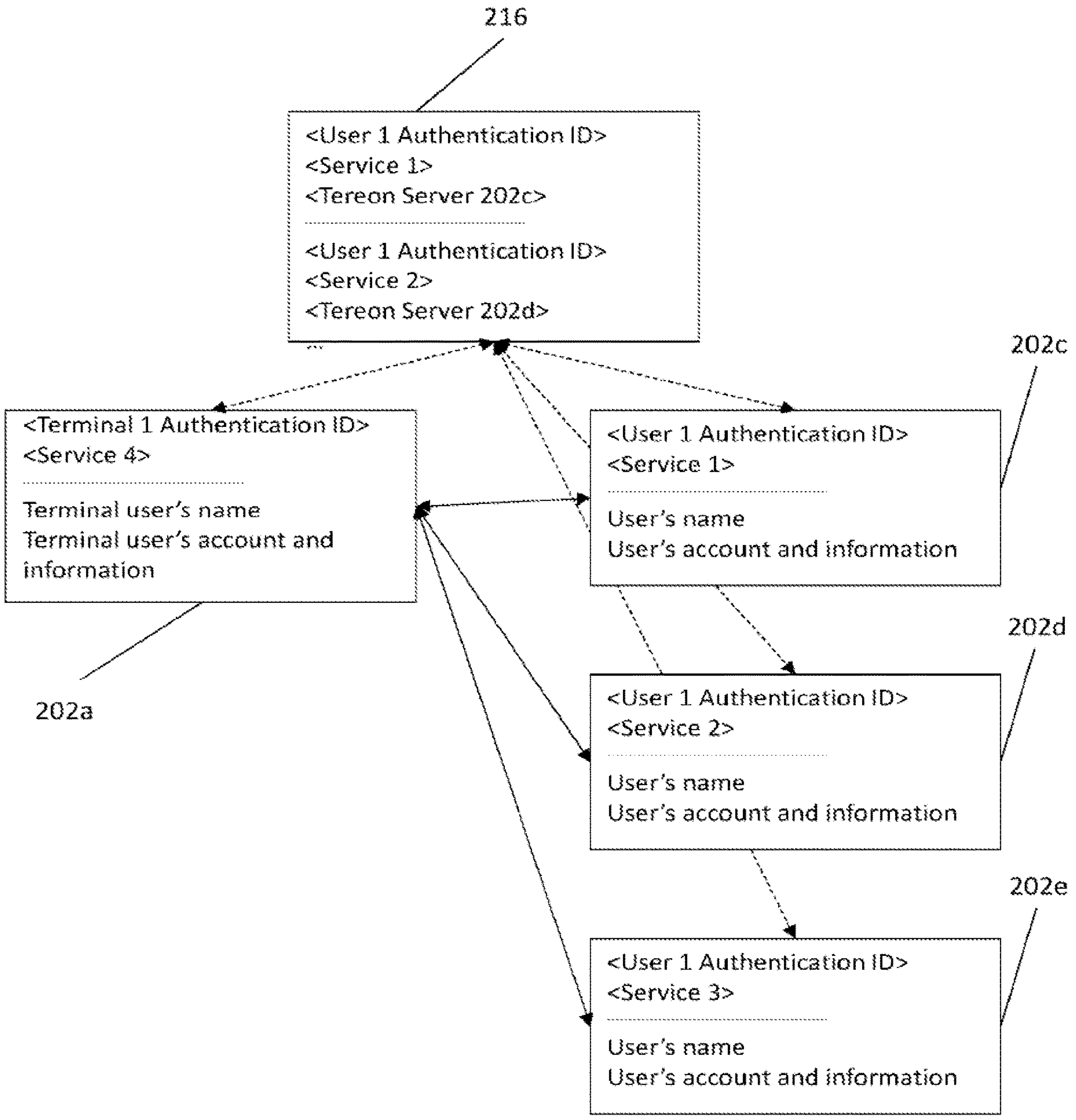
FIG. 13 illustrates the case where a server needs to obtain credentials from three servers in order to construct a multifaceted credential.

FIG. 13 illustrates the case where server 202*a* needs to obtain credentials from three servers 202*c*, 202*d*, and 202*e* in order to construct a multifaceted credential to offer a service to a user 218. For example, service 2 on server 202*d* may be a service to rent a film, which would require age verification as a first credential from server 202*c*, a membership credential from server 202*d* and a sufficient funds credential from server 202*e*.

The relationship is not necessarily one-to-one, that is one where each of the three servers holds one and only one credential. Any of the three servers may each deliver more than one credential to server 202*a*. They may only deliver one credential to server 202*a*. The number of credentials is irrelevant. What matters is that server 202*a* can contact more than one external server to obtain the credentials it requires to enable a user 218 to access a service.

It may be that server 202*a*, at which the user 218 access a terminal, already holds some credentials that it needs in order to deliver some services to the user 218. However, for the purposes of data protection, the user 218 does not want to provide certain details to server 202*a* (for example, his age, and so forth). If all server 202*a* needs to do is verify that the user 218 is over a certain age, or is allowed to order certain goods, then it can simply contact those servers that will confirm or deny those questions. This is extremely useful for e-commerce websites—they can confirm certain facts or parameters without knowing the exact details. Essentially, the directory service 216 can act as a zero-knowledge proof provider or a confidential notary. Tereon can prove or disprove a fact or parameter to server 202*a* without disclosing what that fact is.

Thus the credential for a particular service could comprise credentials from 202*a*, 202*c*, 202*d*, 202*e* and other servers. The credentials can be on one server or they can be distributed across multiple servers.

This is extremely powerful as it allows individuals and organizations to prove that they are entitled to a service without needing to disclose information that need not be disclosed. Again, taking the example of the e-commerce website, the user 218 may register his name and address on the website. However, his bank holds his payment credentials, a government server registers the fact that he is authorised to purchase restricted items, his local railway company holds his travel authorisation, and his health authority's server can confirm his age.

The method of assembling an ad hoc set of credentials for a service does not apply only to users and their devices. It can apply just as well to autonomous sensors, devices, and services, such as, for example, IoT devices that need to connect to different services at different times. They can simply assemble the credentials need for those services as and when those sets of credentials are required.

Account Switching

A major issue that often delays the adoption of new systems is the perceived difficulty of transferring data from legacy systems to those new systems without loss or service interruption. The same issue affects system upgrades, where operators often choose to remain with the initial hardware and software configurations rather than upgrade and update due to their perception of the dangers of losing data in any upgrade or update.

The directory service 216 counters these issues by providing a mechanism to move data, accounts, and configuration information seamlessly from one server or data store to another. One of the blocks to supporting real-time transfers of accounts between institutions is the question of how to catch and deal with in-the-air payments. This industry currently has an accounts transfer system that takes 18-months in total (7 days for the initial switch and then 18 months to catch any payments or transfers). This could also be applied to switching a set of data from one data store to another.

The directory service 216 provides an abstraction layer that separates the user's authentication ID from the underlying services, servers, and actual user accounts. Thus a user 218 can maintain his or her authentication ID while changing the services and the underlying servers to which his or her device is registered.

Figure 14:
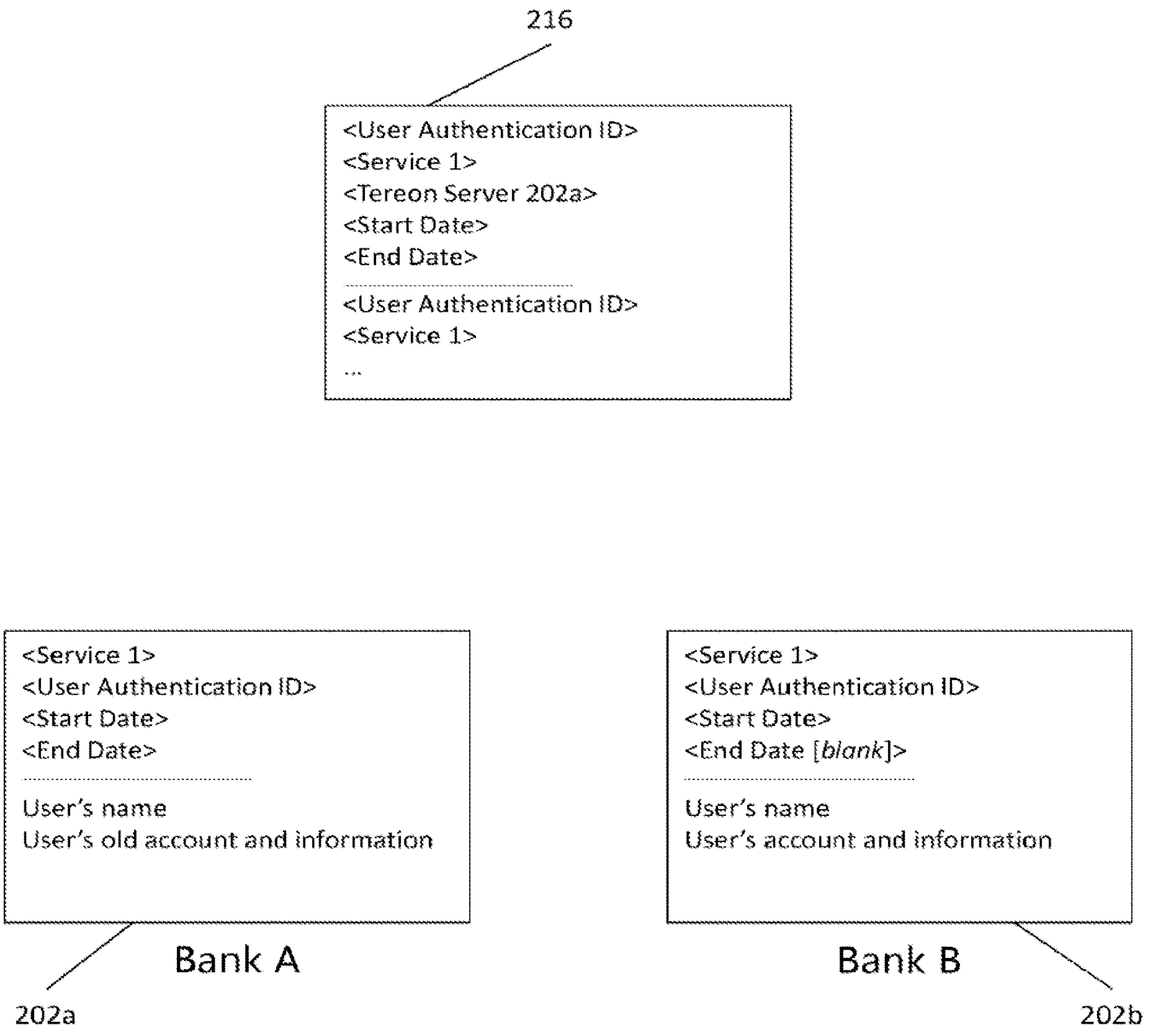
FIG. 14 illustrates a user's relationship with a bank.

The account switching process is best described with an example. In this example, the user 218 banks with Bank A. FIG. 14 illustrates the user's relationship with bank A and its Tereon server 202*a*. Bank B also supports Tereon on server 202*b*, though the user 218 is not yet a customer. The user 218 decides to move his account from bank A to bank B.

Figure 15:
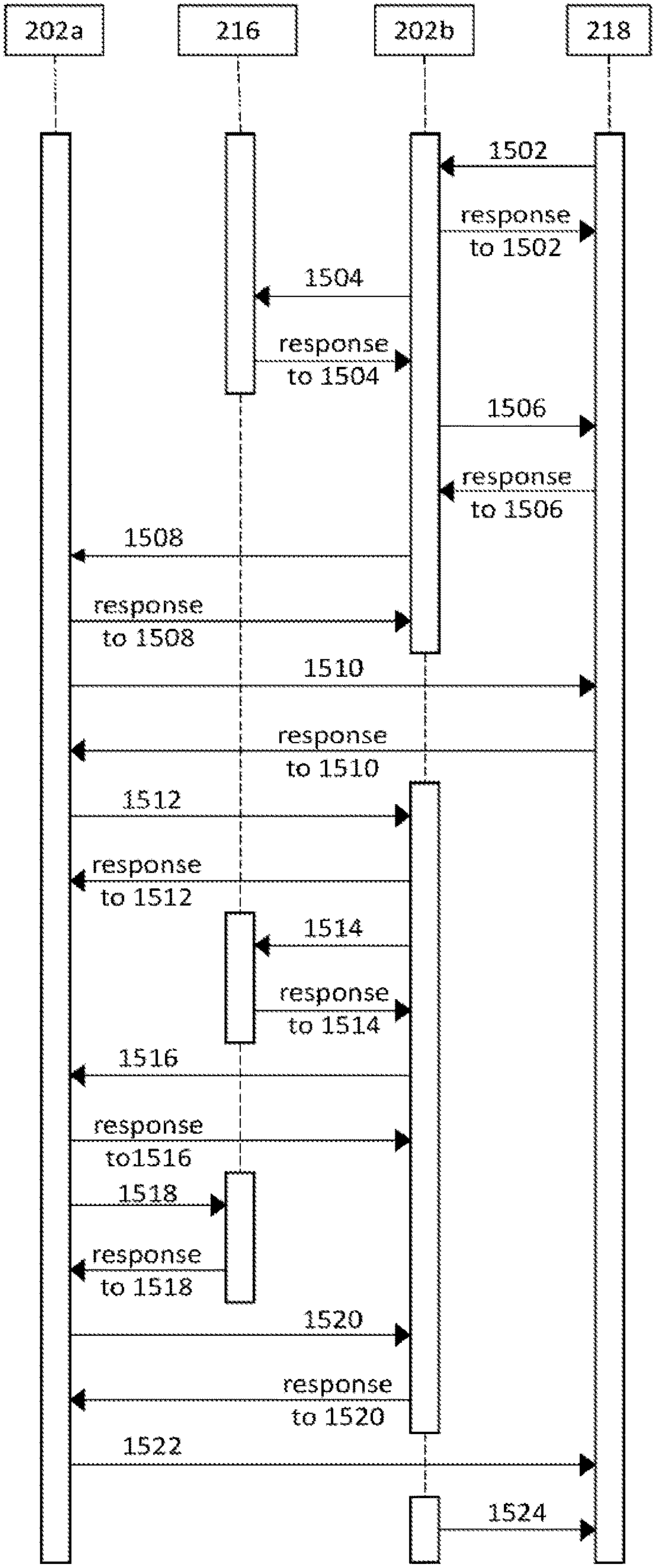
FIG. 15 illustrates the process undertaken to transfer an account.

FIG. 15 illustrates the process that the user 218 undertakes to transfer his account from bank A to bank B. For this example, the user 218 is not overdrawn and has no loans from bank A.

At step 1502, the user 218 opens an account with Bank B and registers his card and his mobile phone with that bank and its Tereon server 202*b*.

At step 1504, bank B's Tereon server 202*b* looks up the user's mobile number and his card's PAN on the Tereon directory service 216 and detects that both are registered to bank A.

At step 1506, bank B's Tereon server 202*b* now contacts the user 218 to confirm that he wants to move his registration to bank B and the user 218 confirms this by entering an additional authentication code sent to him specifically for this purpose.

At step 1508, bank B's Tereon server 202*b* now contacts bank A's server 202*a* and informs it that the user 218 has requested to move his accounts and IDs to bank B, and has confirmed this.

At step 1510, bank A's Tereon server 202*a* now sends the user 218 a request to confirm that he wants to move his account and the user 218 confirms his move.

At step 1512, bank A's Tereon server 202*a* now confirms this with bank B's Tereon server 202*b*, and informs bank B's server 202*b* of the user's account registrations, balances, configurations, payment instructions and so forth. Bank B's server 202*b* sets these accounts up in exactly the same manner as those on bank A, or as close as it can do to provide the services that it is authorised to provide.

For example, the user 218 has three separate currency accounts with bank A that allows him to hold GBP, USD, and EUR. Unfortunately bank B only provides GBP and USD accounts, though he can pay and receive EUR from and to any account. Bank B's server 202*b* informs the user 218 of this when the user opens the account, and he decides to convert the EUR to GBP. Bank B would then instruct bank A to send the EUR as GBP.

At step 1514, bank B's Tereon server 202*b* now informs the directory service 216 that the user's IDs are now registered with its server 202*b*.

At step 1516, bank B's Tereon server 202*b* informs bank A's server 202*a* that it has registered the user's IDs in the directory service 216 and instructs bank A to transfer the balances to it.

At step 1518, bank A confirms with the directory service 216 that it no longer manages the user's IDs. The directory service 216 sets a start date and time against the new ID registration to bank B, and sets an end date and time in the field against the old registration to bank A. Bank A now sets its directory service to inform any server that attempts to pay the user 218 that it no longer holds the user's accounts and to instruct that server to look up the user's details in the directory service 216. It does this by entering the date and time in its end date field. Bank B will now receive all payments made to the user 218 that were initially directed to bank A.

The directory service 216 can now catch in-the-air payments, which are payments made to the user's old account after the user 218 has switched to a new account. In a similar way, Tereon can also catch deferred payments that are due to come out of the old account. These will now come out of the new account once the balances have been transferred, a task that takes minutes rather than days, weeks, or months.

At step 1520, bank A transfers the balances to bank B. Bank B informs Bank A that it has received the funds.

At step 1522, bank A closes the user's accounts, and informs the user 218 that it has done so and transferred his balances to his new bank.

At step 1524, bank B informs the user 218 that he has now received his balances from bank A.

If the user 218 was overdrawn in one or more of his accounts at bank A, and bank B agreed to accept his business, then bank B would transfer balances to bank A in steps 516 and 520, and the user's corresponding accounts at bank B would be overdrawn. The user 218 might also decide to transfer funds between his accounts in bank A in order to clear any overdraft before he transferred his accounts to bank B.

For payments, the Tereon numbering system distinguishes between user, organization, account, service type, and transaction. They all have separate numbering systems. These features allow the directory server to manage the process by which a user 218 moves his account to a new service provider in real-time. The structure of the directory service 216, together with the ability to process transactions in real-time, allows users to change accounts in minutes, rather than days.

The directory service 216, as described above, together with the real-time processing of all transaction, removes the issue of in-the-air transactions, such as in-the-air payments. With Tereon, transactions simply cannot enter an in-the-air state. They either complete or they are cancelled.

Tereon also supports the notion of account portability, such as bank account portability, a feature that would increase competition in the market, and yet one that the banks and regulators believe it is impossible to implement. Because Tereon does not use account details directly but uses a separate credential to identify each payer and payee, it inserts an abstraction between the user 218 and the user's bank account details. It is this abstraction, which the directory service 216 provides, that facilitates account switching and portability.

Changing Credentials

The directory service 216 allows operators and users to replace existing ID credentials with new credentials, and to reuse past credentials without confusing transactions with previous users of the ID. The abstraction layer provided by the directory service 216 allows Tereon to do this.

If a user 218 transfers his or her account to another server then that user 218 may be able to retain a particular credential, such as a PAN, or the server may issue the user 218 with a new credential. In the latter case, the original server can reuse the credential almost immediately. Because each credential has a time and date stamp that reflects when it is issued to a user 218, a new user 218 of a particular credential would be able to use that credential almost immediately.

Each credential has a time and date stamp for when it is issued to a particular user at a particular server. As each transaction also retains a time and date stamp, each Tereon server retains the credential used for each transaction, Tereon simply uses these components to route transactions to the correct destination. For example, a user 218 may purchase something from a merchant with credential A (for example, a mobile phone number) and then a few days later move to another bank when he or she needs to use another credential B (for example, a new mobile phone number).

Later the user 218 takes the item back to the merchant as it is defective. The merchant simply locates the transaction and pressed refund. Though the original transaction used credential A, the server for credential A reports a time and date stamp that indicates a change in the credential. The merchant's server looks up credential A and discovers that the user 218 who used credential A at the time of the transaction now uses credential B. The server now contacts the server for credential B, which confirms that the user 218 for credential B used credential A at the time of the transaction, and the servers then begin the process of making the refund.

User A can be sure that the user of B is not fraudulent as Tereon's security model requires all communications to be signed. Server 202*b* will only be able to sign its communications if it has a valid license from the license server, and user B's device will only be able to sign its communications if server 202*b* is valid, as it will have issued and will check the device's license. User B will not be able to complete a transaction unless that user knows the correct credentials to authorize a transaction, or to access the application on the device.

In another example, a user may have entered a contact's mobile phone number in his or her phone directory and now wants to make a surprise P2P transfer to that contact. Tereon searches the records for that number and discovers, as above, that the contact has changed mobile numbers (if the contact is a Tereon user). It confirms with the correct server that the user who uses the new number used to use the old number registered with the previous server. Tereon also supports the function where a contact may set his or her account to allow the directory server to update that user's mobile number or other Tereon credential when certain approved contacts attempt to make a transaction with them via an old credential. In this example, the aunt's niece has set her account to update all family members, and so the next time her aunt accesses her contact list, she will see her niece's new mobile number.

Figure 16:
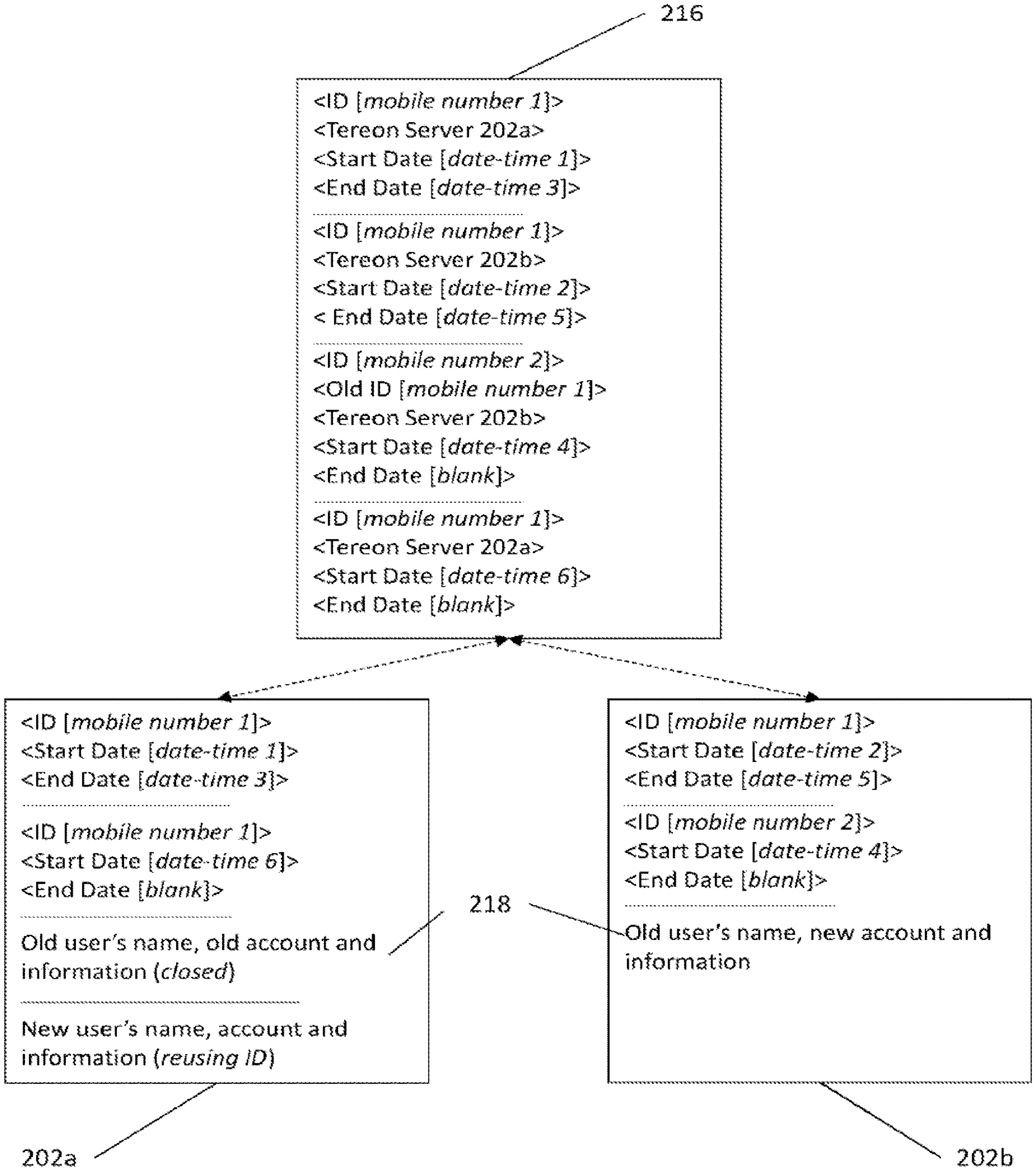
FIG. 16 illustrates the process undertaken to change a registered mobile number.

FIG. 16 illustrates an example for server 202*a*, server 202*b*, and the directory service 216. Here the old user has migrated his accounts from server 202*a* to server 202*b*. 202*a* is bank A's server, and 202*b* is bank B's server.

The old user initially used mobile number 1 as his ID. After migrating his accounts, he continued to use mobile number 1 for a time. The communications between the user 218, the directory service 216, and servers 202*a* and 202*b* proceeded as described above and set out in FIG. 15. The entries in the directory service show that user 218 used server 202*a* from date-time 1 to date-time 3, and that the user used server 202*b* from date-time 2. The slight overlap is to ensure that all in-air payments are caught and that there is no time gap where the user does not have a server that his ID is registered to. (It is possible to avoid overlapping date-time entries by ensuring that the server to which the account migrates controls all of the date-time and ID entries for that migration, and this is how a system migration could operate.)

At some point in time, the user 218 decides to change mobile numbers. He registers his new mobile number 2 as his ID with server 202*b* and deregisters mobile number 1. server 202*b* notifies the directory service 216 of the change, which now shows that the user started using mobile number 2 as his ID at date-time 4 and that mobile number 1 ceased to be an ID to server 202*b* on date-time 5.

Later a new user creates an account with server 202*a* and registers mobile number 1 as his ID at date-time 6. The new user may have been given the old users old mobile, or that number may have been released for reuse by the mobile operator. server 202*a* notifies the directory service 216 that it has registered the ID (after checking that the ID is available), and so the directory service now shows that mobile number 1 is registered to server 202*a* as of date-time 6.

In the example shown in FIG. 16, if the old user used a card issued by bank A 202*a*, then once the user 218 has transferred his accounts to bank B 202*b*, the bank can issue a new card to the user 218 with a credential, such as a PAN, that is registered to it. The user 218 activates that card once he receives it and bank B's server 202*b* informs bank A's server 202*a* that the user's original credential is no longer in use. Bank B registers the new credential with the Tereon directory service 216. The user 218 could have requested to keep the original credential, in which case he might have been charged a small fee by bank A for doing so if bank A agreed to the request. Thus Tereon supports card number or PAN portability.

The user could, at some time in the future, decide to stop using the card originally issued by bank A, and thus release that credential. Bank A may not be able to reuse that PAN credential for six full calendar months after bank B releases it or after the user has transferred his accounts to bank B; the exact time will depend on what the bank's regulators will allow. After that time, it can use the credential because the directory service 216 does not just contain a list of mobile numbers, PANs, or other credentials; it also contains a list of the dates when those credentials were registered and the dates that they expired or were released on a user by user basis.

The account switching method allows the system to capture in-the-air payments. It also provides an extremely flexible and robust way to direct transactions that follow on from previous transactions, based on the credentials used for those previous transactions. Refunds for earlier transactions are one real-world example of this. A merchant, who makes a refund against an old ID will be able to refund the correct account as the directory service 216 will direct his server to pay the correct ID, even if the original ID was subsequently reused. EMV and current mobile look-up technologies assume that numbers are never reused. Unfortunately, they sometimes are.

FIG. 16 illustrates this. Suppose at some time between date-time 1 and date-time 2 the old user purchases an item from a merchant using a device with mobile number 1 as its ID. Later that item proves to be faulty and the user wants a refund.

If that user 218 then goes to the merchant between date-time 1 and date-time 2 for a refund, then the Tereon system will direct the merchant's system to make the refund payment to the user's account on system 202*a* (as the user has not yet closed his account).

If that user 218 the goes to the merchant between date-time 2 and date-time 4 for a refund, then the Tereon system will direct the merchant's system to make the refund payment to the user's account on server 202*b*, even though the payment for the item originally came from server 202*a*.

The account switching method will also account for the user's new ID. If that user 218 then goes to the merchant after date-time 4 for a refund, and used his mobile number 2 as his ID, then the Tereon system will direct the merchant's system to make the refund payment to the user's account on server 202*b*, even though the payment for the item originally came from server 202*a* and even though the user originally used mobile number 1 as his payment ID.

The same will hold for records of PANs, email addresses, and any other reusable credentials. (Biometric credentials cannot be reused for obvious reasons.)

The system allows credentials to be segmented to any level of granularity. One example of this in payments involves currencies or currency codes, where a user can use different IDs for different currencies on the same, or on separate servers.

Figure 17:
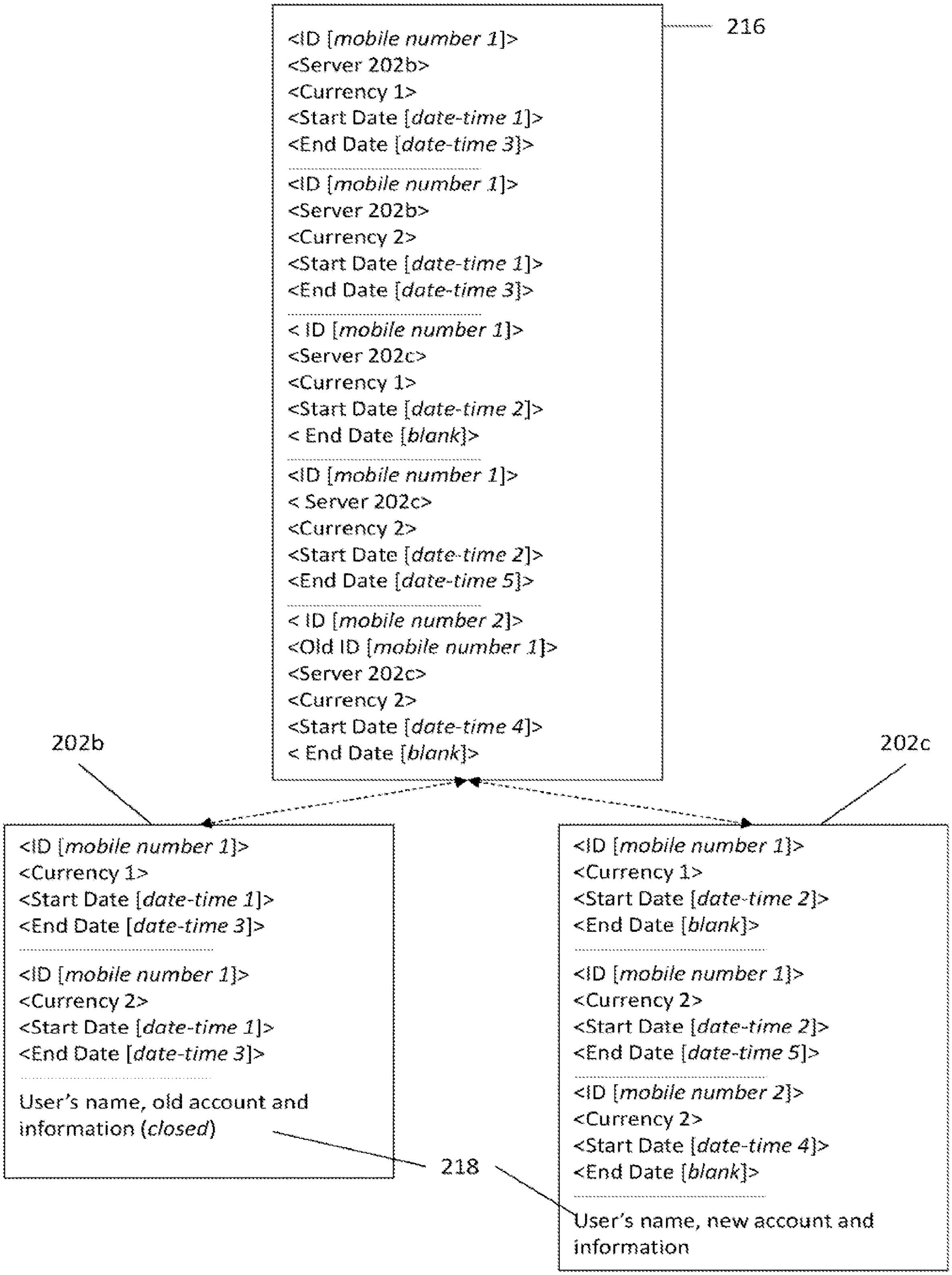
FIG. 17 illustrates the maintenance of a previously registered mobile number to access to two currencies.

FIG. 17 illustrates an example for server 202*b*, server 202*c*, and the directory service 216. The user 218 has already migrated his accounts from server 202*b* to server 202*c* in a similar way to that illustrated in FIG. 16, and with the inter-server communications managed as illustrated in FIG. 15.

The user 218 initially uses mobile number 1 as his ID. After migrating his accounts, he continues to use mobile number 1 for a time for transactions in both currency 1 and currency 2. The entries in the directory service 216 show that user 218 used server 202*b* from date-time 1 to date-time 3, and that the user used server 202*c* from date-time 2. The slight overlap is to ensure that all in-air payments are caught and that there is no time gap where the user does not have a server that his ID is registered to.

At some point in time, the user 218 decided to use a new mobile for transactions in currency 2. He registered his new mobile number 2 as his ID with server 202*c* for transactions in currency 2. Server 202*c* notified the directory service 216 of the change, which now shows that the user started using mobile number 2 as his ID for all transactions in currency 2 at date-time 4 and that mobile number 1 ceased to be an ID for any transaction in currency 2 to on date-time 5.

Figure 17A:
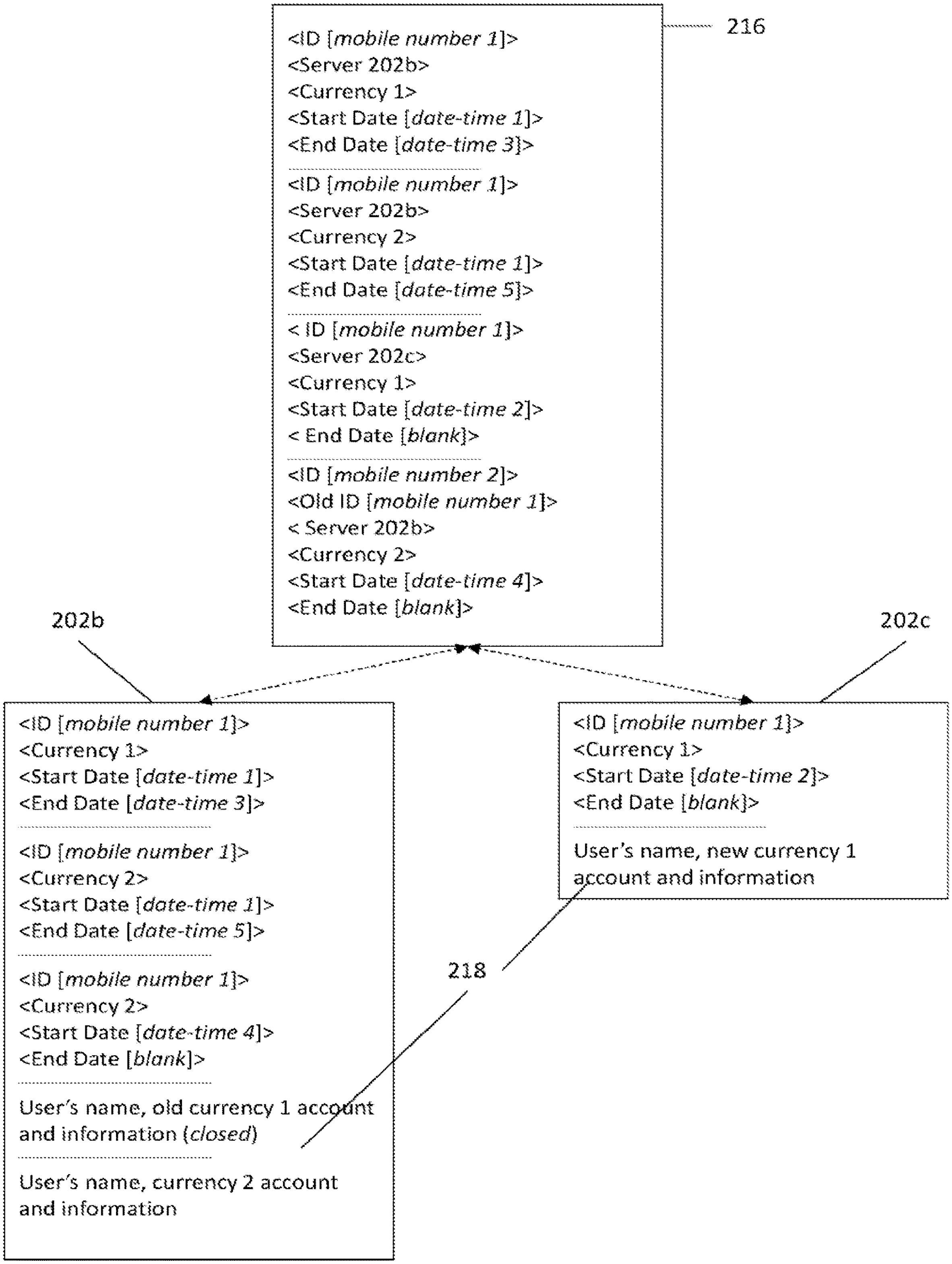
FIG. 17*a* illustrates the maintenance of a previously registered mobile number to access to two currencies, with each currency on a separate server.

FIG. 17*a* illustrates another example for server 202*b*, server 202*c*, and the directory service 216. In the figure, the user 218 has already migrated his currency 1 account from server 202*b* to server 202*c* in a similar way to that illustrated in FIG. 16, and with the inter-server communications managed as illustrated in FIG. 15.

After migrating his account, the user continued for a time to use mobile number 1 for a time for transactions in both currency 1 and currency 2. The entries in the directory service 216 show that user 218 used server 202*b* from date-time 1 to date-time 3 for transactions in both currencies, and that from date-time 2 he used use mobile number 1 as his ID with server 202*c* for transactions in currency 1. The directory service entries also show that the user continued to use mobile number 1 as his ID with server 202*b* for transactions in currency 2.

At some point in time, the user 218 decided to use a new mobile for transactions in currency 2. He registered his new mobile number 2 as his ID with server 202*b* for transactions in currency 2. Server 202*b* notified the directory service 216 of the change, which now shows that the user started using mobile number 2 as his ID for all transactions in currency 2 at date-time 4 and that mobile number 1 ceased to be an ID for any transaction in currency 2 to on date-time 5.

Prior to date-time 4, the user 218 used his mobile number 1 as the ID for all his transactions. The directory service 216 simply directed the transactions to server 202*b* if those transactions were in currency 2, and to server 202*c* if those transactions were in currency 1. The fact that the user had registered the same ID on two servers is irrelevant, as it is the complete set of credentials that governs which server a transaction is directed to. A merchant's system transacting in currency 1 with the user for the first time after date-time 2 would never know that the user had previously used server 202*b* for transactions in that currency. Likewise, that merchant's system would not know that the user used the same ID for transactions in currency 2 at server 202*b* unless that system entered into a transaction with that user in currency 2.

Tereon does more than simply switch a user 218 from one network to another. As already mentioned, the usual methods of switching users fail to deal with in-the-air payments. The most advanced account switching system currently available, as claimed by its originators, requires an 18-month manual process to catch such payments before the user is left to fend for themselves. During the 18-month period, both the banks and the user must work to ensure that they transfer all of the existing payments instructions from the old account to the new account. Tereon does away with this requirement entirely.

Currently banks cannot reuse any payment credentials. Tereon's account switching mechanism removes this limitation, and banks can reissue PANs and account numbers after a certain period of time has elapsed if regulators wish to permit them to do so.

Though the method is referred to as an account switching function, in reality it has many applications over and above basic account switching. For example, it can provide failover to a back-up service provider in the event that bank core systems fail, so providing a way of migrating data from one system to another by translating from one data format to another without any loss of information.

Another example is to streamline number portability in mobile systems. Currently, if a user switched his or her mobile number from one provider to another, then the first provider must reroute all calls to the new provider. If the user then switched to a third provider, then the first provider must route the call to the second provider, who must then route the call to the third provider. This is extremely inefficient and costly to do and yet the operators must support number portability. Tereon avoids the need to reroute calls multiple times.

If operators were to use Tereon to support number portability, then they would not need to support multiple hops. Once a user decides to port his or her number from the first operator to the second operator, the second operator would simply need to inform a directory server that it now supported that mobile number. The first operator would divert calls for that number to the directory server, which would route the call to the second operator. Whenever the user ported his or her number again, then the new operator would inform the directory server of the change, and the directory server would simply route the calls to the operator who served that number. (If users have bank accounts, such as IBANs, that are globally unique, then Tereon will support bank account portability in the same way that it supports mobile number portability.)

A similar example is one where an operator migrates IoT services and devices from one server to another in order to upgrade the Tereon system where a simple migration of, for example, a physical machine, a logical machine, a virtual machine, a container, or any other commonly used mechanism for containing executable code, will not suffice.

Another example is to operate as a system migration tool. This would be, for example, where an operator wants to migrate a service, together with the accounts to which devices are registered, from one version of the Tereon system to an upgraded version. The operator would simply set the old server to transfer the device registrations, accounts, and system configurations, to the new server and the system would carry out the transfer. Each account would be transferred across, together with its data and audit logs, and the servers would update the directory service 216 as the transfers progress. Now, when the devices in the field, be they payment devices, traffic sensors, IoT devices, or so on, wish to communicate with their server, the directory service 216 will simply redirect them to their old or their new server, depending on whether they contacted their server before or after their accounts were transferred.

The examples above demonstrate how Tereon facilitates credential portability and supports ad hoc multifaceted credentials. This has far-reaching applications, and takes Tereon into virtually any network arena where that network needs to manage credentials.

Extensible Framework

The workflows for existing transaction processing systems are all too often static in nature. Once implemented, they are very difficult to change, and the services or operations that the systems support remain inflexible.

Up until now, if a payment provider launched a service, then the payment pattern for that service became static. The provider could only amend the service by launching a replacement or amended service and issuing new cards or applications to support that service. This is one of the reasons why, despite the universal knowledge of the severe weaknesses of EMV, it is impossible to fix the system, as that would mean recalling every EMV card in existence, reprogramming and launching the EMV payments infrastructure, and then issuing new cards. This would require thousands of issuers and acquirers to cooperate.

Tereon puts all the functionality on to the back end using the SDASF and the back-end can guide the merchant device in real-time through the process. This enables the service provider to create new services that can be as granular as the individual user.

The extensible framework is a framework that sits within the Tereon system and enables the addition of new services without necessarily needing to reconfigure the Tereon system. The extensible framework works with the directory service 216 to provide a number of advantages to the Tereon system.

Flexible Message Structure

The extensible framework is partly provided by a flexible message structure in which any data or record type may be provided with a variable length field such that the Tereon system can modify the length of the field to operate with legacy or otherwise incompatible systems.

The extensible framework allows the addition of an additional layer of security to the communications infrastructure by changing the standard order of processes. In many industries, payments being just an example, the communications use fixed message structures. This leads to a weakness that criminals can exploit even if the communications are encrypted. Structured messages are vulnerable to an attack in depth. Though organizations and others can still protect the integrity of a message by using a hash message authentication code (HMAC), the HMAC does not retain the absolute secrecy that the message should attract.

The extensible framework designs away the problem of static systems for any transaction processing system. It provides the flexibility to operate alongside existing systems and services, and allows providers to update existing services, and build new services without needing to relaunch an infrastructure or issue new end-point devices, such as cards. The framework is flexible enough to enable providers to build services that they can customize to individual users. This will be explained below.

Obfuscation

One of the theoretical risks that any system with structured message formats faces is that a repeated use of a message format will provide ample material for a hacker to use in a brute force attack. This is true for systems that do not implement encryption algorithms correctly with some form of random seeding. Nevertheless, it is a risk that should be overcome.

The extensible framework enables operators and users to break from the need to send a structured message between devices and servers. Instead, the message can be obfuscated.

Each of the transaction communications in Tereon will comprise two or more fields together with the labels for those fields. Instead of following a fixed order of fields for every communication the order can be altered in a random manner. As each field will always be accompanied by its identifying tag, it must be ensured that the devices at each end of a communication will first decrypt and then order the fields before they process them.

For example, using an excerpt from the example provided by the JavaScript Object Notation (JSON) documentation (although other formats can of course be and are used in the system), the following three renditions would be the same:

{"version": 1, "firstName": "John", "lastName": "Smith", "isAlive": true, "age": 25}

{"version": 1, "firstName": "John", "isAlive": true, "lastName": "Smith", "age": 25}

{"age": 25, "firstName": "John", "isAlive": true, "lastName": "Smith", "version": 1}

An attacker would not know which, if any, cypher texts that he has contains information that is known and in the same order. The exact mode of obfuscation would depend on the format used and serialization protocol used, if any, but the principle remains the same.

The mode of obfuscation has an additional advantage. The contents of predefined communications can be extended without breaking the communications protocol. If a device receives fields that it cannot process, then it will simply discard those fields and their values. Thus, one or more random field and value pairs could be included that the system discards, but which add additional uncertainty to the communications.

The following three communications would be the same:

{"version": 1, "firstName": "John", "nonce": 5780534, "lastName": "Smith", "isAlive": true, "age": 25}

{"whoknows": "698gtHGF", "version": 1, "firstName": "John", "isAlive": true, "lastName": "Smith", "age": 25}

{"age": 25, "firstName": "John", "isAlive": true, "lastName": "Smith", "whatis this": "Jor90% hr," "version": 1}

In each of the above communications, the devices would discard the unknown field and value pair.

The field names could be further obfuscated by mixing cases in a random fashion for each communication. The devices will process these fields to their canonical form.

Thus the following three communications would be the same:

{"veRsioN": 1, "firstName": "John", "nOnce": 5780534, "laStnAMe": "Smith", "isAlive": true, "Age": 25}

{"whoknows": "698gtHGF", "vErsion": 1, "fiRStname": "John", "iSaLive": true, "lastName": "Smith", "age": 25}

{"aGE": 25, "firstname": "John", "isAlive": true, "lasTName": "Smith", "whatis this": "Jor90% hr," "verslOn": 1}

If a version 2 message is sent that might contain additional fields, then any device that only understood version 1 would either reject the message or, if backwards compatibility is ensured, process the fields that it understands and discard the remainder. This could be further enhanced by providing a field that signified which versions were backwards compatible with some of the fields.

This removes the vulnerability to an attack in depth. The structure of the message can also be retained, but with variable length fields. Again this achieves a similar result. By also using an HMAC, both the integrity of the message and its secrecy are protected. If the end organization's core systems require messages in a structured format then Tereon will simply restructure the messages once they have reached a server, and reformat them in the form required by the organization's core systems. The extensible framework thus enables the security issues with legacy systems to be overcome, and yet still operate with such systems.

The extensible framework supports any data or record type, with exactly the same level of security and flexibility as mentioned above.

Abstracted Workflow Components

In existing solutions, a payments process would be defined in software, implemented, tested, and then released. That payment transaction structure would now be fixed, and could not be changed without significant effort to recall and replace or reprogram devices, terminals, and servers.

Tereon does not do this. Instead, it constructs the payments process from individual components, each of which interacts with its connected components. Those components essentially lay out the workflow of the process. Each component can be updated, and have functions added without affecting the payment process itself. This abstracts the process components from the device, so that a transaction, once defined, can apply to any number of devices, be they cards and card terminals, mobile phones, or web portals.

Each component passes instructions and information to the next component, depending on the result of the instruction that it received. The instructions can be transactional, or they can include controls, such as how the next component should operate (for example, request a PIN if that is optional, offer a set of choices, display a particular message, and the expected or allowed responses).

This provides the ability to alter existing payment services and construct new services without needing to reprogram or replace the existing end points. At the moment, once a payment service provider implements a payment system the payment service provider cannot easily change the system without replacing the end points. The existing systems are essentially static. This replaces them with a dynamic system.

The extensible framework enables the operator to plan out the workflow for a particular transaction using these components. It enables workflows, including decision trees and the like to be constructed. An operator could amend an existing workflow, simply by rearranging the existing components, by adding new components that provide new functions, or by removing components. To do this in an existing system, the servers and the terminals would need to be reprogrammed, and the cards themselves may need to be replaced.

Figure 18:
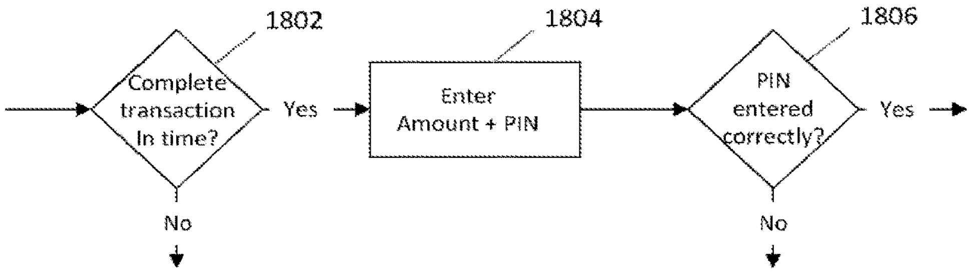
FIG. 18 illustrates a workflow.
Figure 19:
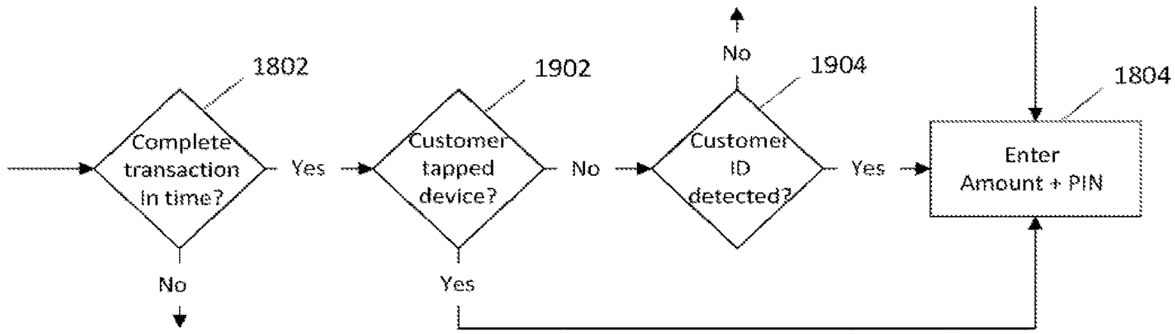
FIG. 19 illustrates an alternative workflow.
Figure 20:
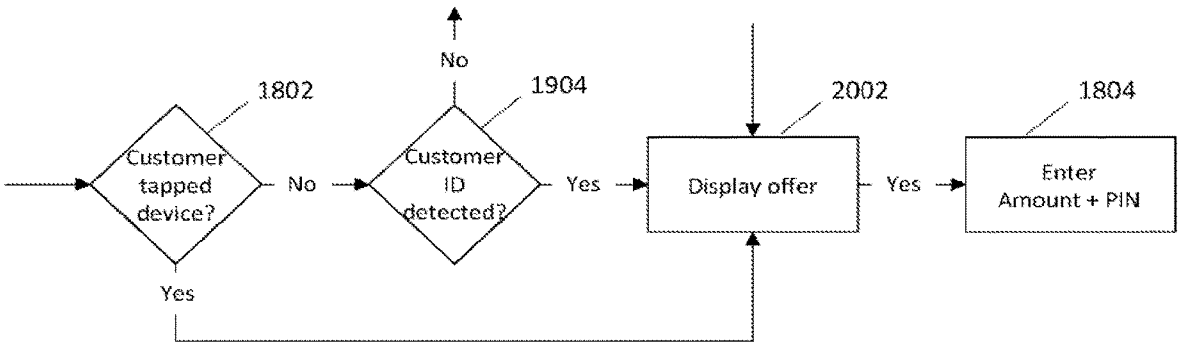
FIG. 20 illustrates an alternative workflow.

An example of this is shown in FIGS. 18 to 20. The components themselves are represented as blocks by a terminal screen to make it easy to visualize what each component does. However, the components apply equally to mobile transactions, web portal transactions, and to card terminal transactions. To change an existing workflow, the order and connection of the components would simply be altered. To create a new workflow, the required components would simply be connected together in the desired order.

Normal payment processes would create separate payments processes for contact-less, contact, and mobile payments. Component 1804 would thus normally appear to the left in the chain, just after the 'complete transaction in time' component 1802 as shown in FIG. 18.

However, by moving this component further along the right, as shown in FIG. 19, and inserting two further decision components 1902 and 1904 into the chain, the operator can create a single payments process that can manage contact, contact-less, and mobile payments in one single payments process.

The operator could go further. Perhaps it would like to add a special seasonal offer to the process once the system has identified the customer. As shown in FIG. 20, it could at any time move component 1804 further to the right and insert in its original position a new component 2002 that automatically makes the customer an offer before the merchant needs to enter the amount and PIN. The operator could configure that component to operate in the 24 days leading to Christmas, for example, and provide a different component for the days thereafter leading up to New Year. This would dynamically alter the payment process for the Christmas and New Year season, without requiring an operator to recall and reprogram and devices. The components would simply instruct the display device, be that a mobile phone or a card terminal, to display the offer to the customer. The operator could easily disable the PIN requirement by configuring component 1804 to disable the PIN requirement. Likewise, if the component did not have a function to require a PIN, then the operator could update the component to include that function.

The operator could go even further and build a whole decision tree to enable the customer to choose from among a range of offers if it wanted to do so.

Once the offer season comes to an end, the operator would simply remove the new components and the process would resume its original structure.

What is important to note is that at no point does the operator ever need to recall the devices to change the process. It simply reconfigures the process at the back end and then implements that change at a time and date of its choosing.

The framework to give the internal management and operation of the Tereon servers can be configured in exactly the same way, where the framework components interact with the context of the access to govern how and what information the users and administrators can access and what tasks they can perform.

Dynamic Services

The extensible framework enables an organization to create and implement new services quickly. The operator simply defines these services by linking together the blocks that are required, and defining any relevant messages. Instead of needing to employ programmers to write the code for a service, the framework allows the marketing and IT departments to implement the services by writing a definition file to define the workflow, by using a graphical system to 'draw the workflow', or by any other workflow defining process. Once it has checked the workflow, the operator simply implements the workflow by linking defined steps or blocks together and Tereon makes the service available to all qualifying users.

For example, an operator would need to use a block to accept a payment of any value with a subsequent block to request a PIN. However, if an operator wants to offer an access control system, then that same operator may create a block to allow PIN-less access to one set of rooms whilst using a block to request a PIN to access another set of rooms.

This means that, unlike existing systems, the system allows organizations to design and implement new services, or amend or remove existing services, even after that organization has launched the transaction processing system, without needing to replace the devices issued to users. If a device understands and can operate any of the defined steps, then that device will support any service that the organization defines using those steps. Once an organization defines a service, the system will make that service immediately available to the targeted user or users.

Abstracted Devices

The extensible framework takes the principle of abstraction further and abstracts the devices themselves. The framework defines process components for each class of device that relate to the functions of those devices. The process components will interact with those functional components. Depending on the available functions, the process components will instruct the functional components to perform tasks, such as what to output, and what to input.

Granularity

Tereon can identify each device, user, and account individually, and can access the context within which a user is using a device to access a service. Therefore, the operator can configure components, and options within those components, to trigger an action based on the context within which an individual user accesses the service. Tereon effectively allows the operator to tailor services to each user, to each user's device, and to the context within which the user uses that device to access the services.

For example, one user might see a choice of three offers in a transaction, a different user may only see one offer that he or she would receive automatically, whilst a third may not see an offer at all.

If the process relates to accessing records, for example, patient records, then a user may be able to access his or her records and administer access rights if the user accesses those records in a medical facility or in a home domain. However, if the user (or someone else) accesses those records away from those domains, then the user may only see a subset of those records, or not be able to access those records at all (depending on the context settings for that service).

If the user accesses the service using a card terminal, then the components will instruct the card terminal to display the relevant information. If the user accesses the same service using a mobile phone or other screen device, then the components will instruct that screen to display the relevant information. In this way, the abstraction layer of the extensible framework becomes device agnostic. It can use any suitable display and access point to control the user-system interaction.

The same applies to services that are provided. Each user's account will have the provider's default level of services. Where an operator adds new services, or modifies existing services for one or more users, then those user's accounts will have those services. The key to the service will be a combination of its providers tag, the user's account number, and the user's device registration tag. This creates a short dendritic path to the service definitions and rules for that user.

For example, the sender may use a mobile phone, on which he has set his rules to allow interactive or automatic transfers. The recipient may have set his device to accept automatic transfers. In this case, the sender's device will simply go through the steps to make an automatic transfer. The service tag does not include any information about whether or not the transfer is interactive; that is left to the information on the service stored in the sender's and recipient's servers.

If the recipient has set his device to accept interactive or automatic transfers, then the sender's device will ask the sender which mode to use. The recipient may have set his device to accept automatic transfers between certain times, and interactive transfers at other times. Here the recipient's Tereon server will simply inform the sender's server of the mode of transfer to use, depending on the recipient's time of day.

If the sender's or the recipient's device will only accept interactive transfers, then if the recipient and sender are on-line at the same time, they will go through the steps to carry out the transfer. If the recipient only has a card, then the recipient will need to go to a merchant's terminal to perform his side of the transaction. If the recipient is off-line, then the sender will go through his steps, but the recipient must then go through his steps in the transaction, such as accept the transfer and enter his PIN, before Tereon completes that transfer. Until then, Tereon will hold the transfer in an escrow facility, similar to the way that it deals with transfers to non-Tereon users.

Dynamic Interfaces

The extensible framework leads to context dependent services e.g. offers, help a user find his or her seat at an event, merchant specific processes etc. It allows an organization to customize the services and experiences that each user will have as that user interacts with Tereon, the degree to which services are available depending on the context, which buttons may appear, what options may be available, and so on.

The number of services that each user and each merchant can interact with depends entirely on the overlap between the services that the individual user can access and the services that the merchant can offer.

For example, where a merchant can offer payments, deposits, and withdrawals, and if a user comes to that merchant, and that user can only access payments at a merchant, then the user and merchant will only see the functions related to a payment, namely payment and refund. If a user comes to that same merchant, and that user can access payments, deposits, and withdrawals, then that user will see all of those functions. If that merchant now no longer has sufficient funds to support deposits or withdrawals, then when the full-service user comes to that merchant, the user will only see the payment functions on his or her device or the merchant's terminal. That merchant will also no longer appear on any search for merchants that offer deposits or withdrawals until the merchant. It may be that a user cannot access certain services at some merchants, but can access those services at another merchant. The framework will handle these cases.

The dynamic interface supplements the use of a multi-faceted credential, and enables the device and its associated applications to become something akin to 'psychic paper', as discussed above. In this case, the device provides only the services available, and the interface is tailored to just those services, irrespective of the plurality of services that the user might be registered for. It may look like a payment device to one service, a transport ticket to another, a door key to another, and so forth. Service providers do not need to issue separate devices to access their services, and as such this reduces both the complexity and cost of offering services, and of upgrading those services.

The extensible framework enables the device to change its appearance, and the present the credentials and services required by the context within which and for which the device is used. Thus, for example, it can tailor the screen of an independent ATM, such as one in a grocery store, to take on the look and feel of the user's operator when the user accesses that ATM, and present only those services that the user has subscribed to.

Interaction with Other Layers

The ability of the extensible framework to interact with other components within the Tereon system is a fundamental feature of the extensible framework. Aside from the contextual security, which itself incorporates the wider security model, the extensible framework instructions can be embedded within the transactional information transmitted via the hash-chain (as disclosed in relation to the hash chain with zero knowledge proofs).

Off-Line Mode

Tereon offers three off-line modes; user off-line, merchant off-line and both off-line.

In the first two cases, Tereon completes a real-time transaction by going the other way round the square; i.e. the user communicates with his Tereon server via the merchant terminal and the merchant's Tereon server. Neither the merchant nor the user will experience service deterioration. Tereon uses a PAKE protocol, or a protocol with similar functions, to create the secure pathway through the three sides of the square for the relevant device.

In the third case, where both devices are off-line, the immediate impression would be that Tereon would not be able to check in real-time whether or not the user or merchant had sufficient funds to support a transaction and so create the very credit risk exposure that Tereon was designed to over-come. This is not the case.

By using features of the extensible framework and a version of the hash chain, Tereon can ensure that the system can still check for funds. Both the user and the merchant will be able to carry out all of their functions. The user will need to use either a mobile or a microprocessor card, but neither the user nor the merchant will see a deterioration in the service that they experience. Both the merchant's device and the user's device will store the encrypted details of the transaction between them, and a random sample of previous off-line transactions that the merchant has made. The merchant's device sets the maximum number of copies of each transaction that it will pass to a user's card or phone.

Tereon would use a combination of business logic and its security models and hash chains to prevent any user from using a combination of off-line devices and on-line devices to withdraw more than exists within an account. An account may only support off-line devices if that account provides a credit function. The off-line logic does not require credit, though a permit to offer credit may be required by a service provider's regulators.

If a device is not authorised to operate off-line then it will be unable to transact with any other device when it is off-line. Its security and authentication model will prevent it from doing so, as its signature will identify it as only supporting on-line transactions, and the device will be incapable of processing any transaction that will affect the value of any account it is registered to.

If a device can support off-line transactions, then the service provider will limit this to a certain amount (either a credit limit, or a fraction of the account balance, which is always updated with the device is on-line), which is the off-line allowance. The device will only be able to authorize transfers or payments of funds from the account to the total value or that off-line allowance. The service provider can, of course, authorize the device to accept transfers or funds, and it can limit the value of those acceptances (the off-line acceptance allowance). If the user accesses the account whilst the first device is off-line, either directly via a portal or with another on-line device, then the user will only be able to authorize transfers or payments out of the account up to the value of the account balance less the off-line allowance.

Tereon reconciles all of the off-line transactions once one of the devices that contains the relevant records goes back on line. It will, as a matter of course, receive multiple copies of some transactions, but it can use these to confirm the previous reconciliations.

If, therefore, the server receives records from third-party servers of off-line transactions that relate to the payments or transfers made to the off-line device, then it will, once it has received sufficient copies of those transactions, process those transactions and add those funds to the account balance. Likewise, if the server receives records from third-party servers of off-line transactions that relate to the payments or transfers made from the off-line device, then it will, once it has received sufficient copies of those transactions, process those transactions and subtract those funds from the account balance and the remaining off-line allowance.

Though the illustrations given above refer to payment, as these are easy to visualize, the same modes of operation can apply to any type of transactional system. One example would be the interaction between IoT devices or other industrial components. By creating workflows that comprise modules that can be rearranged, inserted, or removed, operators can reconfigure the devices to operate in new ways without needing to recall, re-programme, and reinstall them.

Operators can repurpose devices in the field, change the way that they operate, or even let devices control other devices and modify their work flows depending on any changes that those devices detect to the environment within which those devices operate.

IoT devices can also modify each other's work flows by modifying the assembly of modules that make up the work flows as and when required to do so. The security model that governs the inter-device communications will render that communication resistant to man-in-the-middle attacks, while the look-up service will enable devices to identify and authenticate each other.

The off-line mode allows such devices to operate autonomously or semi-autonomously and interoperate with each other, to validate and verify any transactions between those devices, and to interact with an operator's systems only as and when required.

The contextual security model explained below extends to any type of device, such as an IoT device. So long as a device is authorised to operate, and so long as that device's services are listed in a relevant look-up service, any device can communicate with any other device, and each will use the hash chain to enable it to trust and validate the transaction and data communication between the devices, including instructions to modify the devices work flows, upgrade a device's systems, or simply to pass or collate data between those systems. Each device will retain a complete audit of its transactions.

Security

The Tereon system uses a number of unique security models that overcome the flaws and restrictions that exist in the current security models and protocols used in legacy transaction processing systems. The security models, for example, remove the need to store data on a device. This is a major issue with existing systems.

Securing USSD

USSD (unstructured supplementary service data) is commonly used as the communications channel for numerous transaction types, including payments to and from feature phones. Tereon allows USSD to be used securely.

Most implementations require the user to enter a USSD code or choose an action from a numbered menu. A series of unencrypted messages go back and forward. This leads to issues of cost, poor security and poor user experience.

Instead of sending messages as either 7 or 8-bit text, which is where the security concerns arise, Tereon uses USSD and similar communications channels in a new way. Tereon simply views it as a session-based short-burst communications channel.

Tereon does not tailor a message to fit USSD, which is what existing systems do. Instead, for each encrypted communication in a transaction session, Tereon encrypts the communication as it would do for a communication over TCP/IP (i.e., GPRS, 3G, 4G, WiFi, etc.) to generate a cypher text, and then encodes the cypher text as a base64 7-bit character string. Tereon then checks the length of the cypher text. If it is longer than the allowed space in the USSD messages, it cuts the cypher text into two or more parts, and transmits these individually using USSD. At the other end, Tereon reassembles the parts into the whole character string, converts it back to the cypher text, and then decrypts it.

Tereon can use this method to first use TLS (transport layer security) to identify and authenticate the parties. This will generate the first session key. Tereon can then use this session key to encrypt the PAKE protocol negotiation that generates the second session key that the parties will use to encrypt all further communications in the session.

Some feature phones support WAP (wireless application protocol). Where these implementations use WAP over USSD, then Tereon will simply use the WAP protocol stack as a way of communicating across USSD. This will provide the wireless transport layer security (WTLS) layer, which will simply act as an additional level of authentication (it is weaker than the TLS and advanced encryption standard 256 (AES256) encryption that Tereon uses as the default, and so Tereon will use AES256 to encrypt the communications in any event).

This is also how Tereon can secure other communications channels that are perceived to lack security (e.g., NFC, Bluetooth, etc.). By constructing a messaging session carefully, the nature of USSD and other 'unsecured' channels can be changed completely.

Security Model for Active Devices (and the Internet of Things)

The security model for active devices, such as mobile phones, card terminals, etc., operates in a similar way to the security model for cards (see below). The SIM is not used as the security algorithms were cracked some time ago.

Instead, a registration key is used, which is encrypted and stored on the device, together with a unique key that the network generates. On mobile devices, Tereon can use that key to perform a look-up to check that the IMSI (international mobile subscriber identity) reported by the mobile is genuine.

When a user first runs an application (users can have multiple applications if they wish), the application will request a one-time authentication code that the Tereon server generates for the user's account, together with the mobile number or serial number of the device (if the application cannot first ascertain that number). The user can also register his or her application with multiple Tereon servers, where each server will generate a unique one-time activation code for each account or service that the server operates for the user.

Once the user enters the one-time activation code, the application uses that code as the shared secret between it and the server to generate the first PAKE session (after the application and the Tereon server have validated each other using TLS or a similar protocol, if necessary). Once they have established the first PAKE session, the Tereon server will send an encrypted and signed registration key to the application, together with a new, shared secret. Both the server and the application will use the one-time activation code, the registration key, and the shared secret to generate a new, shared secret by creating a hash of all three.

Each time the server and the application communicate, they will create a shared secret by hashing the previous shared secret with a hash of the previous messages that they communicated between themselves in on-line communications. Every time the application and server communicate with each other, they will generate a hash of the contents of the transaction, the transaction hash, which they have exchanged with the hash of the previous exchanges. They both use this transaction hash to generate the new, shared secret.

If a user loses his or her device, or if he or she needs to reregister an application or change devices, then the Tereon server will generate a new one-time authentication code and registration key. The new, shared secret that the server will pass to the application will be generated from the hash of the previous messages exchanged between that server and the application.

This key forwarding enables the application and Tereon server to always have a fresh, shared secret for each PAKE session. Thus, if an attacker were able to break the TLS session (which would be extremely difficult as both the server and the application would sign their messages) the attacker would still need to break the underlying PAKE session key. If the party managed that feat, then that would give the party the key for that session and for that session only. The process of generating a new key for each communication means that the party would need to repeat that feat for each communication, a task that is virtually impossible computationally.

Because the application authenticates against a particular service in any session, the user's application will interact with that service only. The server will not have any knowledge of any of the other services that the user's application is registered to. In effect, the applications become something akin to 'psychic paper', an identification device that provides only the credentials required by a service, irrespective of the plurality of services that the user might be registered for. It may look like a payment device to one service, a transport ticket to another, a door key to another, and so forth. Service providers do not need to issue separate devices to access their services, and as such this reduces both the complexity and cost of offering services, and of upgrading those services.

The security model has an added benefit. If a user loses his or her device, then the user can obtain a new device with exactly the same number. The old device with its applications will not work, whilst the new device, once that is registered, will work, as it will have the secret key and the registration code that are valid. Though there may be a gap in time between losing and reporting a lost device, no-one will be able to make any transaction, as no-one will have the necessary password and PIN, or any other authentication token.

The user, or the Tereon system administrator, can also configure the application to require a password before the user can access the application. This password is checked with the Tereon server. If it is valid, then the Tereon server will instruct the application to operate (with communication that is always signed and encrypted). If the password is invalid, then the Tereon server will instruct the application to request a new password for a limited number of attempts. Thereafter, the Tereon server will lock out the user's application, and the user will need to contact the administrator to unlock the application and re-register the device.

Each credential is timed. That means that one user may have a particular credential assigned to him or her during a defined period of time, and all transactions that take place with that credential during that time period are linked to that user. If that user then changes credential, then the original credential can be assigned to another user. However, the look-up server will continue to link transactions and credentials based on the combination of the credentials and the time periods registered against those credentials.

The same model can be adapted to secure communications between devices in the 'Internet of Things'. Here a certificate or a hard-wired serial number can be used to identify each device. That will become the first shared secret that each device will swap on first contact, when that is hashed with the date of the transaction, or with the previous messages sent between the devices. Two numbers would be used, an open serial number that would identify the device, and act in place of a PKI (public key infrastructure) certificate, and a cryptographically protected serial number that would act as the shared secret. Alternatively, a single serial number could be used as the ID and the first shared secret, and a new secret key would be uploaded via the secure communications channel (see the discussion on the communication layers in the systems architecture).

Tereon's mobile security model has another advantage. An operator can use it to set access rights to individual services, and configure the level of access depending on the device and network over which a particular use is attempting to success that service. This means, for instance, that a provider can specify that an administrator might be able to view system logs over a secured public network, but only access the system administration functions over an internal network, and then only via a fixed, as opposed to a mobile device.

Though this ability has some application in payments (it secures access to the system administration functions to defined networks and devices), it comes into its own for other services where limited access to sensitive or privileged content is required, so that users can control exactly who can see certain data, which data these third parties can see, and from which location they can do so.

The security model enables an organization to be able to guarantee the privacy and security of any data collected, generated, or transmitted by any device. This can apply to any device or transaction, from a payment, through to a medical device, a traffic sensor, a weather sensor, a water flow detector, etc.

Card Security Model

EMV cards and mobile phones using host card emulation store a PIN on the chip or in a secure element on the phone. Contactless cards, and mobiles that emulate those cards, also store most of the card details in the clear, or in a form that is easy to read. The card terminals check the PIN that the user enters against the PIN stored on the card. This is where many of the weakness in the EMV system come to light, and renders the EMV process open to a number of well-documented attacks.

Tereon stores only an authentication key on the card and checks the value entered against a value stored on the Tereon service (in a secure area of the database closed to administrators who see only that the values match not the actual value). It authenticates against both the service and the particular function, resource, facility, or transaction type, or other type of service provided by that service. Tereon uses two security models, one of which is a subset of the other.

Most cards will display a PAN (the long number). Tereon does not use this number to identify the account. Rather, it uses the PAN in the same way as a mobile number; it is simply an access credential. Each card has an encrypted PAN. The card also has an encrypted registration key that identifies the card as valid for each service to which it is registered, much in the same way that the registration key on a mobile authenticates that device. The encrypted code will have a prefix that simply points to the country look-up directory service that the merchant's Tereon service will need to request, if it does not already have the address details relating to that encrypted PAN string registered on its Tereon service.

When the user presents the card to the terminal, the terminal will read the encrypted PAN, and use that and the encrypted registration key to validate the card with the card's registered terminal. Once the user's Tereon service has validated and authenticated both the card and the merchant's Tereon service, the user's service will send the merchant's Tereon service the PAN, in its unencrypted form so that it can register this, along-side the encrypted form, in its cache. Thus if the user later enters the PAN in the clear, such as via an ecommerce portal or a merchant's terminal, then the service will know which other service to contact.

If the card reader cannot read the card for any reason, then the user or merchant can type in the PAN and the merchant's Tereon service will use that PAN to obtain the address of the user's Tereon service. The user could alternatively enter his or her email address, mobile telephone number, or any other unique credential so long as that credential is registered to that user's account. The card's PAN is simply one of many credentials that the user can use.

Once the merchant's Tereon service has validated the card, the merchant's terminal will set up a TLS and then a PAKE session with its Tereon service, using its hashed key to do so (each time the terminal communicates with its service it hashes its previous key with its registration key to generate the new shared secret for the PAKE session). The merchant process will proceed until the merchant's terminal needs to request a PIN (if the user's Tereon service requires a PIN for that transaction, as determined by the payment service provider and enshrined in the Tereon service's business rules engine). The user's Tereon service will generate a PAKE session with the merchant's service and then send a one-time key to the merchant's service, and an encrypted message to the terminal via another PAKE session created using TLS first.

The merchant's terminal will receive the key and decrypt the message to display a text selected by the user that shows that the terminal is authorised by the merchant's service. The user enters his or her PIN, which is communicated via the terminal's PAKE session with the user's service. This process only happens where the user has to enter his or her PIN at a merchant terminal. The merchant's terminal never sees the PIN in the clear as this is entered in a secure app that the merchant's terminal accesses from the user's Tereon service and encrypted with a second one-time key that the user's service transmits to the terminal in a secure, signed key exchange. All communications would normally go via the merchant's service, direct communications between the terminal and the user's Tereon service can also be established where the Terminal can support that functionality.

If the card is a micro-processor card (Chip & PIN, contactless, or both), then the card can also have a shared secret that was initially generated when it was issued.

A micro-processor card would also use PAKE to establish a session with its registered Tereon Service (or the service for the service). This session would be alongside the session established by the card terminal (which might be a mobile tablet or a PoS card terminal) with its Tereon service. This immediately removes the key vulnerability that existing terminals and Chip & PIN cards exhibit, which is the vulnerability of the existing infrastructure to interfere with and subvert the PIN verification process via a number of 'man-in-the-middle' or 'wedge' at-tacks.

The card will use this channel to generate a key that it will transmit to its service, and which its service in turn will transmit to the merchant's terminal to encrypt the PIN. It will also use this channel to facilitate off-line transactions, when the card will store the balance of the last on-line transaction, the key that it will use as a seed to generate the series of keys that it will use for off-line transactions, and the records of a number of third-party off-line transactions.

If a card is lost or stolen, Tereon's security model means that the issuer does not need to issue a new PAN.

Context Based Security

Most security protocols use a few credentials, and build on underlying assumptions. It is these assumptions that can lead to errors and so a loss of security. The Tereon system does not rely on any underlying assumption other than the assumptions that the communications network, without this system, may be insecure and cannot be trusted, and that the environment within which a device operates may also be insecure.

The Tereon system goes several stages further and looks at both a set of credentials and the context within which those credentials are presented. This provides both additional security and secures one of the means by which organizations can enable their employees or members to use their own devices (sometimes referred to as BYOD) in some or all circumstances.

Tereon may not only use the user's passwords, PINs, or other direct authentication credentials; it will also use details of the device, the application on that device, the network by which that device is accessing Tereon, the geographic location of that device at the time of, and during, the session, and the service or information that the user is accessing with that device.

Tereon takes the credentials and, based on the context set by and against those credentials, will control access to the information, granting a level of access appropriate to the credential.

For example, an administrator attempting to access the deep administration services on a private device that has not been approved by Tereon will be blocked from those services, irrespective of whether or not that administrator is in the workplace and on the workplace's network. However, that same administrator may be entitled to view some of the system logs on that same device.

A second example would be where the context security model governs the services that a secondary user may see. A user has a phone or card that provides multiple functions such as deposits, withdrawals, and payments without set limits (up to any credit limit or available funds of course). That user has frequented a café on a number of occasions and has always bought a coffee and almond croissant. Today, the user has given his card to his son and set a total spending limit of £40 for the card. The user has also set up a second PIN for his son's use, who takes the card to the same café to buy a coffee. The Tereon system would normally have offered a free almond croissant to the user today, as he has already bought 6 in the past, and the café uses Tereon to push offers to its customers. However, when the user's son enters his PIN, the Tereon system detects that it is the user's son who is making the payment (he does not know his father's PIN), and blocks the offer for today as he has a nut allergy, and his father has linked his son's PIN to his son's profile. The merchant does not see any notice of the offer of a free croissant and Tereon knows that the user's son cannot eat nuts. All that the merchant can see is a payment for a coffee.

The user has also allowed his son to withdraw cash of up to £10, but not to deposit funds. Thus, when the user's son goes into a merchant that can offer a withdrawal of up to £10, he will see the option on the merchant's terminal.

The context-based security goes further than access control. Depending on the context within which a user presents or uses a device, that device will present only the credentials necessary for that context; it becomes 'psychic paper'. In this way, the directory service 216 provides functionality that can support the context-based security.

The context-based security does away with the need for separate credentials and devices for particular contexts. Now a single device can become a library card credential in a library, a transport ticket on a bus or train, a secure key to access a room or facility, an in-house payment device in a firm's canteen, a theatre ticket, standard payment device in a supermarket, a driving license, an NHS card, an ID card to prove entitlement to a service, which could bring up photo ID on the merchant's device if the service required that, etc.

Because Tereon provides dynamic, real-time, transaction processing and settlement, an administrator or user can amend, add to, or even cancel an allowed context or credential in real-time. The amendment is immediately reflected in the Tereon server that provides a service, or in the look-up directory service 216, or both. Lost devices need no longer pose the risk of a period of financial or ID exposure until the current systems deactivate the device. Once a user or administrator cancels or amends a credential or context, that change will become active immediately.

One Touch Transaction

Tereon implements a one-button transaction authorisation and access method that eliminates the security flaws in the existing systems. For example, current PIN-less or NFC payments are extremely dangerous as they provide no authentication for a payment. Until a card issuer cancels a phone or card credential on the contactless EMV system, a user remains liable for all payments. Even if the device is cancelled by the issuer, the consumer still has to try to prove that he did not activate the payment. How can he do so if the payment never required a PIN to authenticate it? This leaves a huge hole that allows anyone to pick up a contactless card or phone and simply tap and go to make payments. Until it is cancelled, the device remains valid.

Tereon supports tap-and-go in one of three modes, each of which depends on its context to operate. One of these provides a one-touch transaction that uses an approach to identifying an individual. Where both the user and the service provider agree that the level of authentication provided is satisfactory, the system will provide a one-touch authentication method whereby the device will display a large button, or configure a large area on the screen for the user to touch. The other modes are a completely touchless mode, such as the existing contactless transaction where the user enters no credentials, and one, where the user enters his or her standard payment credentials after the devices have identified themselves to each other.

The button or area itself provides the authentication via the touch screen. Every individual presses a screen in a unique way, both in terms of where that individual presses, and the pressure pattern that they use. If an individual intends to use this function, then Tereon will ask that individual to press the button or area a number of times until it has learned that individual's signature press. The screen is logically divided into a number of discrete cells, and Tereon will look at the proximity and pattern of the cells that the user touches during the training period, and where possible with the pressure pattern and any device movement that occurs when the user presses the screen. It will use and monitor that data to build the profile that it uses to authenticate the user.

Figure 21:
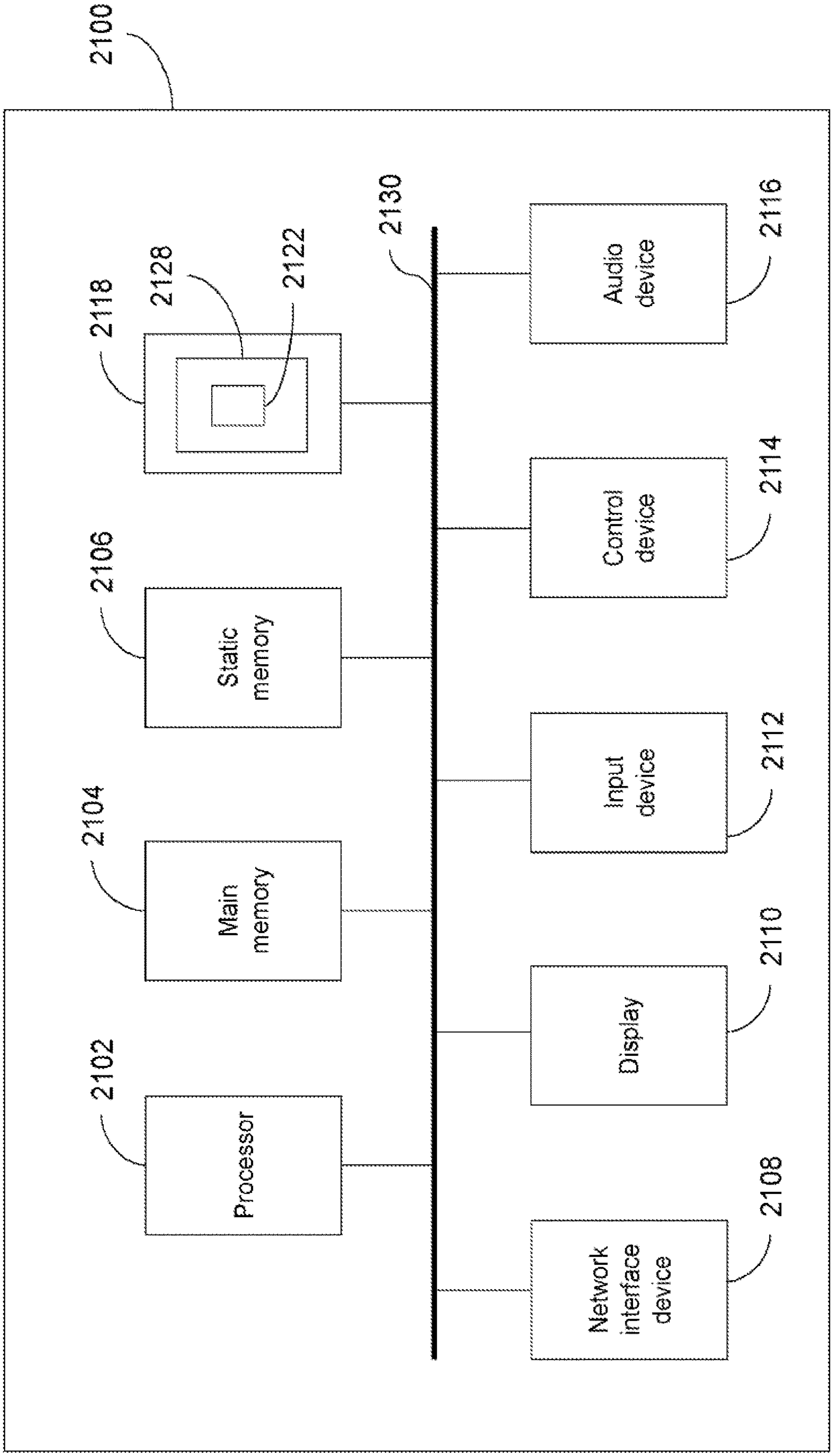
FIG. 21 illustrates an exemplary computing system.

FIG. 21 illustrates a block diagram of one implementation of a computing device 2100 within which a set of instructions, for causing the computing device to perform any one or more of the methodologies discussed herein, may be executed. In alternative implementations, the computing device may be connected (e.g., networked) to other machines in a Local Area Network (LAN), an intranet, an extranet, or the Internet. The computing device may operate in the capacity of a server or a client machine in a client-server network environment, or as a peer machine in a peer-to-peer (or distributed) network environment. The computing device may be a personal computer (PC), a tablet computer, a set-top box (STB), a Personal Digital Assistant (PDA), a cellular telephone, a web appliance, a server, a network router, switch or bridge, a processor, or any machine capable of executing a set of instructions (sequential or otherwise) that specify actions to be taken by that machine. Further, while only a single computing device is illustrated, the term "computing device" shall also be taken to include any collection of machines (e.g., computers) that individually or jointly execute a set (or multiple sets) of instructions to perform any one or more of the methodologies discussed herein.

The example computing device 2100 includes a processing device 2102, a main memory 2104 (e.g., read-only memory (ROM), flash memory, dynamic random access memory (DRAM) such as synchronous DRAM (SDRAM) or Rambus DRAM (RDRAM), etc.), a static memory 2106 (e.g., flash memory, static random access memory (SRAM), etc.), and a secondary memory (e.g., a data storage device 2118), which communicate with each other via a bus 2130.

Processing device 2102 represents one or more general-purpose processors such as a microprocessor, central processing unit, or the like. More particularly, the processing device 2102 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 2102 may also be one or more special-purpose processing devices such as an application specific integrated circuit (ASIC), a field programmable gate array (FPGA), a digital signal processor (DSP), network processor, or the like. Processing device 2102 is configured to execute the processing logic (instructions 2122) for performing the operations and steps discussed herein.

The computing device 2100 may further include a network interface device 2108. The computing device 2100 also may include a video display unit 2110 (e.g., a liquid crystal display (LCD) or a cathode ray tube (CRT)), an alphanumeric input device 2112 (e.g., a keyboard or touchscreen), a cursor control device 2114 (e.g., a mouse or touchscreen), and an audio device 2116 (e.g., a speaker).

The data storage device 2118 may include one or more machine-readable storage media (or more specifically one or more non-transitory computer-readable storage media) 2128 on which is stored one or more sets of instructions 2122 embodying any one or more of the methodologies or functions described herein. The instructions 2122 may also reside, completely or at least partially, within the main memory 2104 and/or within the processing device 2102 during execution thereof by the computer system 2100, the main memory 2104 and the processing device 2102 also constituting computer-readable storage media.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

In an implementation, the modules, components and other features described herein can be implemented as discrete components or integrated in the functionality of hardware components such as ASICS, FPGAs, DSPs or similar devices as part of an individualization server.

A "hardware component" is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may be or include a special-purpose processor, such as a field programmable gate array (FPGA) or an ASIC. A hardware component may also include programmable logic or circuitry that is temporarily configured by software to perform certain operations.

Accordingly, the phrase "hardware component" should be understood to encompass a tangible entity that may be physically constructed, permanently configured (e.g., hardwired), or temporarily configured (e.g., programmed) to operate in a certain manner or to perform certain operations described herein.

A machine may be, for example, a physical machine, a logical machine, a virtual machine, a container, or any other commonly used mechanism for containing executable code. A machine may be a single machine, or it may refer to a plurality of connected or distributed machines, regardless of whether those machines are of the same type or are of a plurality of types of machine.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

Unless specifically stated otherwise, as apparent from the following discussion, it is appreciated that throughout the description, discussions utilizing terms such as “sending”, “receiving”, “determining”, “comparing”, “enabling”, “maintaining”, “identifying”, or the like, refer to the actions and processes of a computer system, or similar electronic computing device, that manipulates and transforms data represented as physical (electronic) quantities within the computer system’s registers and memories into other data similarly represented as physical quantities within the computer system memories or registers or other such information storage, transmission or display devices.

It is to be understood that the above description is intended to be illustrative, and not restrictive. Many other implementations will be apparent to those of skill in the art upon reading and understanding the above description. Although the present disclosure has been described with reference to specific example implementations, it will be recognized that the disclosure is not limited to the implementations described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

All optional features of the various aspects relate to all other aspects mutatis mutandis. Variations of the described embodiments are envisaged, for example, the features of all the disclosed embodiments may be combined in any way.

The invention claimed is:

1. A method of recording a data transaction comprising, at a device associated with a first entity:

determining first seed data, the first seed data being associated with a previous data transaction involving the first entity;

determining, as a first data transaction occurs between the first entity and a second entity, second seed data by combining at least the first seed data and an indication of the first data transaction to generate a record of the first data transaction, the second seed data being associated with an intermediate hash to be added to the record, wherein the record is an audit record;

generating a first hash of the first data transaction and associated with the audit record by hashing the second seed data, the first hash of the first data transaction comprising a history of data transactions involving the first entity, wherein the generating of the first hash of the first data transaction and associated with the audit record occurs at a same time as a completion of the first data transaction; and contemporaneously storing the audit record of the first data transaction as a completed first data transaction and the first hash in a memory, wherein the audit record proves the completion of the first data transaction by the first entity and the second entity and a contemporaneous audit of the completed first data transaction.

2. The method of claim 1, wherein the first seed data comprises a starting hash.

3. The method of claim 2, wherein the starting hash is a result of hashing a record of the previous data transaction involving the first entity.

4. The method of claim 2, wherein the starting hash comprises a random hash.

5. The method of claim 4, wherein the random hash comprises at least one of a signature from the device, a date that the random hash was generated, or a time that the random hash was generated.

6. A method of recording a data transaction comprising, at a device associated with a first entity:

determining first seed data, wherein the first seed data comprises a starting hash;

generating a record of a first data transaction between the first entity and a second entity;

determining second seed data by combining at least the first seed data and the record of the first data transaction based at least in part on combining a first zero-knowledge proof and a second zero-knowledge proof with the first seed data and the record of the first data transaction, wherein:

the first zero-knowledge proof comprises proof that the starting hash comprises a true hash of a previous data transaction involving the first entity; and the second zero-knowledge proof comprises proof that a second hash comprises a true hash of a previous data transaction involving the second entity;

generating a first hash by hashing the second seed data, the first hash comprising a history of data transactions involving the first entity; and storing the first hash against the record of the first data transaction in a memory.

7. The method of claim 6, wherein providing the second seed data further comprises combining a third zero-knowledge proof with the first seed data, the record of the first data transaction, the first zero-knowledge proof and the second zero-knowledge proof.

8. The method of claim 7, wherein the third zero-knowledge proof is generated from random data.

9. The method of claim 7, wherein the third zero-knowledge proof is a repeat of the first zero-knowledge proof or the second zero-knowledge proof.

10. The method of claim 7, wherein the third zero-knowledge proof is constructed using a second record of the first data transaction that corresponds to the second zero-knowledge proof.

11. The method of claim 6, wherein the first data transaction comprises at least a first stage and a second stage and providing the second seed data comprises:

combining the first zero-knowledge proof with a record of the first stage of the first data transaction; and combining the second zero-knowledge proof with a record of the second stage of the first data transaction.

12. The method of claim 11, wherein providing the second seed data comprises:

constructing a third zero-knowledge proof from the record of the second stage of the first data transaction; and combining the second zero-knowledge proof and the third zero-knowledge proof with the record of the second stage of the first data transaction.

13. The method of claim 11, wherein the first data transaction comprises at least a first stage, a second stage, and a third stage, and providing the second seed data further comprises:

combining the first zero-knowledge proof with a record of the third stage of the first data transaction; and combining the second zero-knowledge proof with the record of the third stage of the first data transaction.

14. The method of claim 11, wherein the first data transaction comprises at least a first stage, a second stage, and a third stage, and providing the second seed data further comprises:

combining the first zero-knowledge proof with a record of the third stage of the first data transaction; and combining the second zero-knowledge proof with random data.

15. The method of claim 11, wherein the first data transaction comprises at least a first stage, a second stage, and a third stage, and providing the second seed data further comprises:

combining the first zero-knowledge proof with a record of the third stage of the first data transaction; and combining the second zero-knowledge proof with a record of a fourth stage of the first data transaction;

wherein the fourth stage of the first data transaction is a repeat of the third stage of the first data transaction.

16. The method of claim 11, wherein the first data transaction comprises at least a first stage, a second stage, and a third stage, and providing the second seed data further comprises:

combining a third zero-knowledge proof with a record of the third stage of the first data transaction.

17. The method of claim 6 wherein the first zero-knowledge proof is constructed by the device associated with the first entity and the second zero-knowledge proof is constructed by a device associated with the second entity.

18. The method of claim 17 wherein constructing the first zero-knowledge proof and the second zero-knowledge proof comprises using a key exchange algorithm.

19. The method of claim 18 wherein the key exchange algorithm comprises a password authenticated key exchange (PAKE) protocol.

20. A method of recording a data transaction comprising, at a device associated with a first entity:

determining first seed data;

generating a record of a first data transaction between the first entity and a second entity;

determining second seed data by combining at least the first seed data and the record of the first data transaction;

generating a first hash by hashing the second seed data, the first hash comprising a history of data transactions involving the first entity;

storing the first hash against the record of the first data transaction in a memory;

sending the first hash to a device associated with the second entity;

receiving a second hash from a device associated with the second entity, wherein the second hash comprises a hash of a previous data transaction involving the second entity;

generating a record of a second data transaction between the first entity and the second entity;

determining third seed data by combining the record of the second data transaction with the first hash and the second hash;

generating a third hash by hashing the third seed data, the third hash comprising a history of data transactions involving the first entity and a history of data transactions involving the second entity; and storing the third hash against the record of the second data transaction in the memory.

* * * * *